(12) United States Patent
Haggie et al.

(10) Patent No.: US 12,197,451 B1
(45) Date of Patent: Jan. 14, 2025

(54) APPENDING TIME RANGES TO DISTINCT STATEMENTS OF A DATA PROCESSING PACKAGE

(71) Applicant: Splunk Inc., San Francisco, CA (US)

(72) Inventors: Thomas Haggie, Victoria (CA); Barbara Janczer, San Francisco, CA (US); Justin Lew, Burnaby (CA); Clark Eugene Mullen, San Mateo, CA (US); Ioan Popa, Fremont, CA (US); Jacob Sebastian Stark, San Jose, CA (US); Keng-Ming Sheu, Port Coquitlam (CA)

(73) Assignee: Splunk Inc., San Francisco, CA (US)

( * ) Notice: Subject to any disclaimer, the term of this patent is extended or adjusted under 35 U.S.C. 154(b) by 27 days.

(21) Appl. No.: 17/816,361

(22) Filed: Jul. 29, 2022

Related U.S. Application Data

(60) Provisional application No. 63/366,323, filed on Jun. 13, 2022.

(51) Int. Cl.
  *G06F 16/2458* (2019.01)
  *G06F 16/242* (2019.01)
  *G06F 16/248* (2019.01)

(52) U.S. Cl.
  CPC ...... *G06F 16/2477* (2019.01); *G06F 16/2428* (2019.01); *G06F 16/248* (2019.01)

(58) Field of Classification Search
  CPC . G06F 16/2477; G06F 16/2428; G06F 16/248
  USPC ........................................................ 707/769
  See application file for complete search history.

(56) References Cited

U.S. PATENT DOCUMENTS

| | | | |
|---|---|---|---|
| 6,473,503 B1 | 10/2002 | Karau et al. | |
| 6,707,476 B1 | 3/2004 | Hochstedler | |
| 7,822,707 B1 | 10/2010 | Yehuda et al. | |
| 7,937,344 B2 | 5/2011 | Baum et al. | |
| 7,953,730 B1 * | 5/2011 | Bleckner | G06F 16/951 715/733 |
| 8,112,425 B2 | 2/2012 | Baum et al. | |
| 8,166,071 B1 | 4/2012 | Korablev et al. | |
| 8,364,460 B2 | 1/2013 | Ostermeyer et al. | |
| 8,751,529 B2 | 6/2014 | Zhang et al. | |
| 8,788,525 B2 | 7/2014 | Neels et al. | |

(Continued)

OTHER PUBLICATIONS

Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

(Continued)

*Primary Examiner* — Joshua Bullock
(74) *Attorney, Agent, or Firm* — Knobbe, Martens, Olson & Bear, LLP

(57) ABSTRACT

A system generates a user interface that enables a user to modify time ranges associated with search-related statements of a data processing package. Via one or more user interactions with the user interface, the system may receive a modified time range for the statement. The modified time range may be appended to the data processing package to form an enriched data processing package. The system may (Continued)

communicate the enriched data processing package to a search service for execution. The system may display the results in the user interface.

20 Claims, 44 Drawing Sheets

(56) References Cited

U.S. PATENT DOCUMENTS

| | | | |
|---|---|---|---|
| 9,215,240 B2 | 12/2015 | Merza et al. | |
| 9,286,413 B1 | 3/2016 | Coates et al. | |
| 9,576,007 B1 | 2/2017 | Sivathanu et al. | |
| 9,576,046 B2* | 2/2017 | Bullotta | G06F 16/9538 |
| 9,641,334 B2 | 5/2017 | Faitelson et al. | |
| 9,667,676 B1 | 5/2017 | Lo et al. | |
| 9,690,858 B1 | 6/2017 | Diliberto et al. | |
| 9,916,367 B2 | 3/2018 | Lin et al. | |
| 10,120,914 B2 | 11/2018 | Vogt | |
| 10,127,258 B2 | 11/2018 | Lamas et al. | |
| 10,409,440 B2 | 9/2019 | Blinn et al. | |
| 10,452,650 B1 | 10/2019 | Monaharan et al. | |
| 10,509,794 B2 | 12/2019 | Filippi et al. | |
| 10,776,366 B1 | 9/2020 | Astretsov et al. | |
| 10,871,878 B1 | 12/2020 | Mody et al. | |
| 10,909,130 B1 | 2/2021 | Scott et al. | |
| 10,929,415 B1 | 2/2021 | Shcherbakov et al. | |
| 10,936,585 B1 | 3/2021 | Echeverria et al. | |
| 11,113,294 B1 | 9/2021 | Bourbie et al. | |
| 11,120,087 B2 | 9/2021 | Dhillon et al. | |
| 11,216,511 B1 | 1/2022 | Bigdelu et al. | |
| 11,263,268 B1 | 3/2022 | Bourbie et al. | |
| 11,269,871 B1 | 3/2022 | Bigdelu et al. | |
| 11,386,158 B1 | 7/2022 | Bourbie et al. | |
| 11,409,756 B1 | 8/2022 | Park et al. | |
| 11,500,952 B1 | 11/2022 | Gupta et al. | |
| 11,537,627 B1 | 12/2022 | Baskaran et al. | |
| 11,604,789 B1 | 3/2023 | Cannon et al. | |
| 11,604,799 B1 | 3/2023 | Bigdelu et al. | |
| 11,620,300 B2 | 4/2023 | Burnett et al. | |
| 11,620,303 B1 | 4/2023 | Roy et al. | |
| 11,636,128 B1 | 4/2023 | Bigdelu et al. | |
| 11,644,955 B1 | 5/2023 | Singamneni et al. | |
| 11,676,345 B1 | 6/2023 | Bhushan et al. | |
| 11,695,643 B1 | 7/2023 | Cawley et al. | |
| 11,727,016 B1 | 8/2023 | Agarwal et al. | |
| 11,743,285 B2* | 8/2023 | Luger | H04L 63/1483 726/23 |
| 11,899,670 B1 | 2/2024 | Bhagat et al. | |
| 11,947,528 B1 | 4/2024 | Bhagat et al. | |
| 2001/0055017 A1 | 12/2001 | Ording | |
| 2002/0169764 A1 | 11/2002 | Kincaid et al. | |
| 2003/0058280 A1 | 3/2003 | Molinari et al. | |
| 2004/0030682 A1 | 2/2004 | Porter et al. | |
| 2005/0004911 A1 | 1/2005 | Goldberg et al. | |
| 2005/0015361 A1 | 1/2005 | Payton et al. | |
| 2005/0015368 A1 | 1/2005 | Payton et al. | |
| 2005/0022207 A1 | 1/2005 | Grabarnik et al. | |
| 2005/0076305 A1 | 4/2005 | Hintermeister et al. | |
| 2005/0228788 A1* | 10/2005 | Dahn | G06F 16/9538 |
| 2006/0004707 A1 | 1/2006 | Dettinger | |
| 2006/0064674 A1 | 3/2006 | Olson, Jr. et al. | |
| 2006/0218479 A1 | 9/2006 | Torres | |
| 2007/0022125 A1 | 1/2007 | Salam et al. | |
| 2007/0043702 A1 | 2/2007 | Lakshminarayanan et al. | |
| 2007/0088723 A1 | 4/2007 | Fish | |
| 2007/0118491 A1 | 5/2007 | Baum et al. | |
| 2007/0174188 A1 | 7/2007 | Fish | |
| 2007/0282797 A1 | 12/2007 | Wang et al. | |
| 2008/0025616 A1 | 1/2008 | Bryll | |
| 2008/0114730 A1 | 5/2008 | Larimore et al. | |
| 2008/0195649 A1 | 8/2008 | Lefebvre | |
| 2008/0215546 A1* | 9/2008 | Baum | G06F 16/2322 |
| 2008/0243784 A1 | 10/2008 | Stading | |
| 2008/0243807 A1 | 10/2008 | Caucas et al. | |
| 2009/0019020 A1 | 1/2009 | Dhillon et al. | |
| 2009/0228464 A1 | 9/2009 | Jones et al. | |
| 2009/0276421 A1 | 11/2009 | Qiu | |
| 2009/0319518 A1 | 12/2009 | Koudas et al. | |
| 2009/0327240 A1 | 12/2009 | Meehan et al. | |
| 2010/0049692 A1 | 2/2010 | Astito et al. | |
| 2010/0135582 A1 | 6/2010 | Gokturk et al. | |
| 2010/0299458 A1 | 11/2010 | Marking et al. | |
| 2010/0306590 A1 | 12/2010 | Anand et al. | |
| 2011/0066629 A1 | 3/2011 | Escalante et al. | |
| 2011/0078055 A1 | 3/2011 | Faribault et al. | |
| 2011/0126232 A1 | 5/2011 | Lee et al. | |
| 2011/0179024 A1 | 7/2011 | Stiver et al. | |
| 2012/0005044 A1 | 1/2012 | Coleman | |
| 2012/0023429 A1 | 1/2012 | Medhi | |
| 2012/0102024 A1* | 4/2012 | Campbell | G06F 16/958 707/E17.107 |
| 2012/0110474 A1 | 5/2012 | Chen et al. | |
| 2012/0221553 A1 | 8/2012 | Wittmer et al. | |
| 2012/0246165 A1 | 9/2012 | Batraski et al. | |
| 2012/0246173 A1 | 9/2012 | Wittmer et al. | |
| 2012/0254805 A1 | 10/2012 | Pic et al. | |
| 2012/0271741 A1 | 10/2012 | Leonard | |
| 2012/0284713 A1 | 11/2012 | Ostermeyer et al. | |
| 2013/0073542 A1 | 3/2013 | Zhang et al. | |
| 2013/0080460 A1 | 3/2013 | Tomko et al. | |
| 2013/0086107 A1 | 4/2013 | Genochio et al. | |
| 2013/0124542 A1 | 5/2013 | Lee et al. | |
| 2013/0159832 A1 | 6/2013 | Ingargiola et al. | |
| 2013/0238747 A1 | 9/2013 | Albouze et al. | |
| 2013/0290291 A1 | 10/2013 | Loffbourrow et al. | |
| 2013/0304760 A1 | 11/2013 | Torii | |
| 2013/0326620 A1 | 12/2013 | Merza et al. | |
| 2014/0019909 A1 | 1/2014 | Leonard et al. | |
| 2014/0074887 A1 | 3/2014 | Neels et al. | |
| 2014/0082013 A1 | 3/2014 | Wolf et al. | |
| 2014/0188862 A1 | 7/2014 | Campbell et al. | |
| 2014/0214976 A1 | 7/2014 | Zhou et al. | |
| 2014/0222798 A1 | 8/2014 | Want et al. | |
| 2014/0281868 A1 | 9/2014 | Vogel et al. | |
| 2014/0324825 A1 | 10/2014 | Gopinath et al. | |
| 2014/0344304 A1 | 11/2014 | Topatan et al. | |
| 2015/0120745 A1 | 4/2015 | James | |
| 2015/0212663 A1 | 7/2015 | Papale et al. | |
| 2015/0213127 A1 | 7/2015 | Chang et al. | |
| 2015/0254369 A1 | 9/2015 | Hou et al. | |
| 2015/0302051 A1 | 10/2015 | Baumgartner et al. | |
| 2015/0309689 A1 | 10/2015 | Jin et al. | |
| 2016/0004736 A1 | 1/2016 | Tsuchida et al. | |
| 2016/0004741 A1 | 1/2016 | Johnson et al. | |
| 2016/0012045 A1 | 1/2016 | Franceschini et al. | |
| 2016/0062555 A1 | 3/2016 | Ward et al. | |
| 2016/0085785 A1 | 3/2016 | Hoffmann | |
| 2016/0092485 A1 | 3/2016 | Lamas et al. | |
| 2016/0098464 A1 | 4/2016 | Burke et al. | |
| 2016/0103592 A1 | 4/2016 | Prophete et al. | |
| 2016/0103883 A1 | 4/2016 | Ramani et al. | |
| 2016/0119388 A1 | 4/2016 | Sitrick et al. | |
| 2016/0210300 A1 | 7/2016 | Plakhov et al. | |
| 2016/0216873 A1 | 7/2016 | Filippi et al. | |
| 2016/0224532 A1 | 8/2016 | Miller et al. | |
| 2016/0246840 A1 | 8/2016 | Masiero et al. | |
| 2016/0292285 A1 | 10/2016 | Lee et al. | |
| 2016/0328443 A1 | 11/2016 | Abraham et al. | |
| 2016/0373423 A1 | 12/2016 | Naibo | |
| 2017/0052654 A1 | 2/2017 | Cervelli et al. | |
| 2017/0140011 A1 | 5/2017 | Kuefer et al. | |
| 2017/0228711 A1 | 8/2017 | Chawla et al. | |
| 2017/0235799 A1 | 8/2017 | Miller et al. | |
| 2017/0262754 A1 | 9/2017 | Mizuno et al. | |
| 2017/0308610 A1 | 10/2017 | Mullins et al. | |
| 2017/0315677 A1 | 11/2017 | Rice et al. | |
| 2017/0315749 A1* | 11/2017 | Valine | G06F 3/0631 |
| 2017/0351951 A1 | 12/2017 | Santos et al. | |
| 2017/0352380 A1 | 12/2017 | Douombouya et al. | |
| 2017/0364506 A1 | 12/2017 | Stern et al. | |
| 2018/0004364 A1 | 1/2018 | Wu | |
| 2018/0024701 A1 | 1/2018 | Sanches et al. | |
| 2018/0025041 A1 | 1/2018 | Gray et al. | |

(56) References Cited

U.S. PATENT DOCUMENTS

| | | |
|---|---|---|
| 2018/0039399 A1 | 2/2018 | Kaltegaertner et al. |
| 2018/0113945 A1 | 4/2018 | Dhillon et al. |
| 2018/0124031 A1 | 5/2018 | Krishnaprasad et al. |
| 2018/0157767 A1 | 6/2018 | Balyan |
| 2018/0165310 A1 | 6/2018 | Coll et al. |
| 2018/0173390 A1 | 6/2018 | Dunne et al. |
| 2018/0173477 A1 | 7/2018 | Porwal et al. |
| 2018/0189328 A1 | 7/2018 | Frazier et al. |
| 2018/0232394 A1 | 8/2018 | Danziger et al. |
| 2018/0246983 A1 | 8/2018 | Rathod |
| 2018/0285445 A1 | 10/2018 | Lu |
| 2018/0322169 A1 | 11/2018 | Kaufman et al. |
| 2018/0329965 A1 | 11/2018 | Nishino et al. |
| 2018/0357320 A1 | 12/2018 | Li et al. |
| 2019/0034528 A1 | 1/2019 | Lintz |
| 2019/0065567 A1 | 2/2019 | Griffith et al. |
| 2019/0073610 A1 | 3/2019 | Rousselot |
| 2019/0095508 A1 | 3/2019 | Porath et al. |
| 2019/0098106 A1 | 3/2019 | Mungel et al. |
| 2019/0138640 A1 | 5/2019 | Pal et al. |
| 2019/0146970 A1 | 5/2019 | Chameih et al. |
| 2019/0163756 A1 | 5/2019 | Bull et al. |
| 2019/0272271 A1* | 9/2019 | Bhattacharjee ..... G06F 16/2471 |
| 2019/0303409 A1 | 10/2019 | Nishino et al. |
| 2019/0342380 A1 | 11/2019 | Thota et al. |
| 2019/0370369 A1 | 12/2019 | Kulkarni |
| 2020/0050612 A1 | 2/2020 | Bhattacharjee et al. |
| 2020/0089794 A1 | 3/2020 | Frantz et al. |
| 2020/0110842 A1 | 4/2020 | Teo et al. |
| 2020/0134683 A1 | 4/2020 | Boren et al. |
| 2020/0167433 A1 | 5/2020 | Karayev et al. |
| 2020/0257680 A1 | 8/2020 | Danyi et al. |
| 2020/0387390 A1 | 12/2020 | Pat Ulzii et al. |
| 2021/0089601 A1* | 3/2021 | Osann, Jr. ............ G06F 16/248 |
| 2021/0256019 A1 | 8/2021 | Prophete et al. |
| 2021/0286633 A1* | 9/2021 | Bar-On ................ G06Q 10/107 |
| 2022/0138606 A1 | 5/2022 | Pasour et al. |
| 2022/0188306 A1 | 6/2022 | Bigdelu et al. |
| 2022/0197926 A1 | 6/2022 | Passey et al. |
| 2022/0300711 A1* | 9/2022 | Elisco ..................... G06N 3/08 |
| 2022/0309248 A1 | 9/2022 | Liu et al. |
| 2022/0309411 A1 | 9/2022 | Ramaswamy et al. |
| 2023/0031327 A1 | 2/2023 | Bourbie |
| 2023/0185818 A1 | 6/2023 | Oattes et al. |
| 2023/0297213 A1 | 9/2023 | Coffey et al. |
| 2024/0013271 A1 | 1/2024 | Nunziata |
| 2024/0039802 A1* | 2/2024 | Avetoom ................ H04L 41/22 |

OTHER PUBLICATIONS

Carraso, David, "Exploring Splunk," published by CITO Research, New York, NY, Apr. 2012.
Chitu, Alex, Google Tests New Site Search Box (2014).
Hoque, et al., "Applying Pragmatic Principles for Interaction with Visual Analytics," IEEE Transactions on Visualization and Computer Graphics, vol. 24, No. 1, Jan. 2018.
SLAML 10 Reports, Workshop On Managing Systems via Log Analysis and Machine Learning Techniques. ;login: Feb. 2011—Conference Reports—vol. 36, No. 1, pp. 104-110.
Splunk Enterprise Overview 8.0.0—splunk > turn data into doing—copyright 2020 Splunk Inc.—in 17 pages—retrieved May 20, 2020.
Splunk Cloud User Manual 8.0.2004—splunk> turn data in doing—copyright 2020 Splunk Inc.—in 66 pages—retrieved May 20, 2020.
Splunk Quick Reference Guide, updated 2019, available online at https://www.splunk.com/pdfs/solution-guides/splunk-quick-reference-guide.pdf, retrieved May 20, 2020.
U.S. Appl. No. 16/513,584, filed Jul. 16, 2019.
U.S. Appl. No. 16/513,571, filed Jul. 16, 2019.
U.S. Appl. No. 16/513,556, filed Jul. 16, 2019.
U.S. Appl. No. 16/513,544, filed Jul. 16, 2019.
U.S. Appl. No. 16/657,988, filed Oct. 18, 2019.
U.S. Appl. No. 17/444,152, filed Jul. 30, 2021.
U.S. Appl. No. 17/444,161, filed Jul. 30, 2021.
U.S. Appl. No. 17/589,558, filed Jan. 31, 2022.
U.S. Appl. No. 17/589,677, filed Jan. 31, 2022.
U.S. Appl. No. 17/589,796, filed Jan. 31, 2022.
U.S. Appl. No. 17/652,888, filed Feb. 28, 2022.
U.S. Appl. No. 17/811,821, filed Jul. 11, 2022.
U.S. Appl. No. 17/816,337, filed Jul. 29, 2022.
U.S. Appl. No. 17/816,357, filed Jul. 29, 2022.
U.S. Appl. No. 17/816,359, filed Jul. 29, 2022.
Zhang, et al., "Coupling Browse and Search in Highly Interactive User Interfaces: A Study of the Relation Browser," Published in UNC.Edu; 2004.
U.S. Appl. No. 18/051,440, filed Oct. 31, 2022.
U.S. Appl. No. 18/051,458, filed Oct. 31, 2022.
U.S. Appl. No. 18/162,503, filed Jan. 31, 2023.
U.S. Appl. No. 18/144,094, filed May 5, 2023.
U.S. Appl. No. 18/441,788, filed Feb. 14, 2024.

* cited by examiner

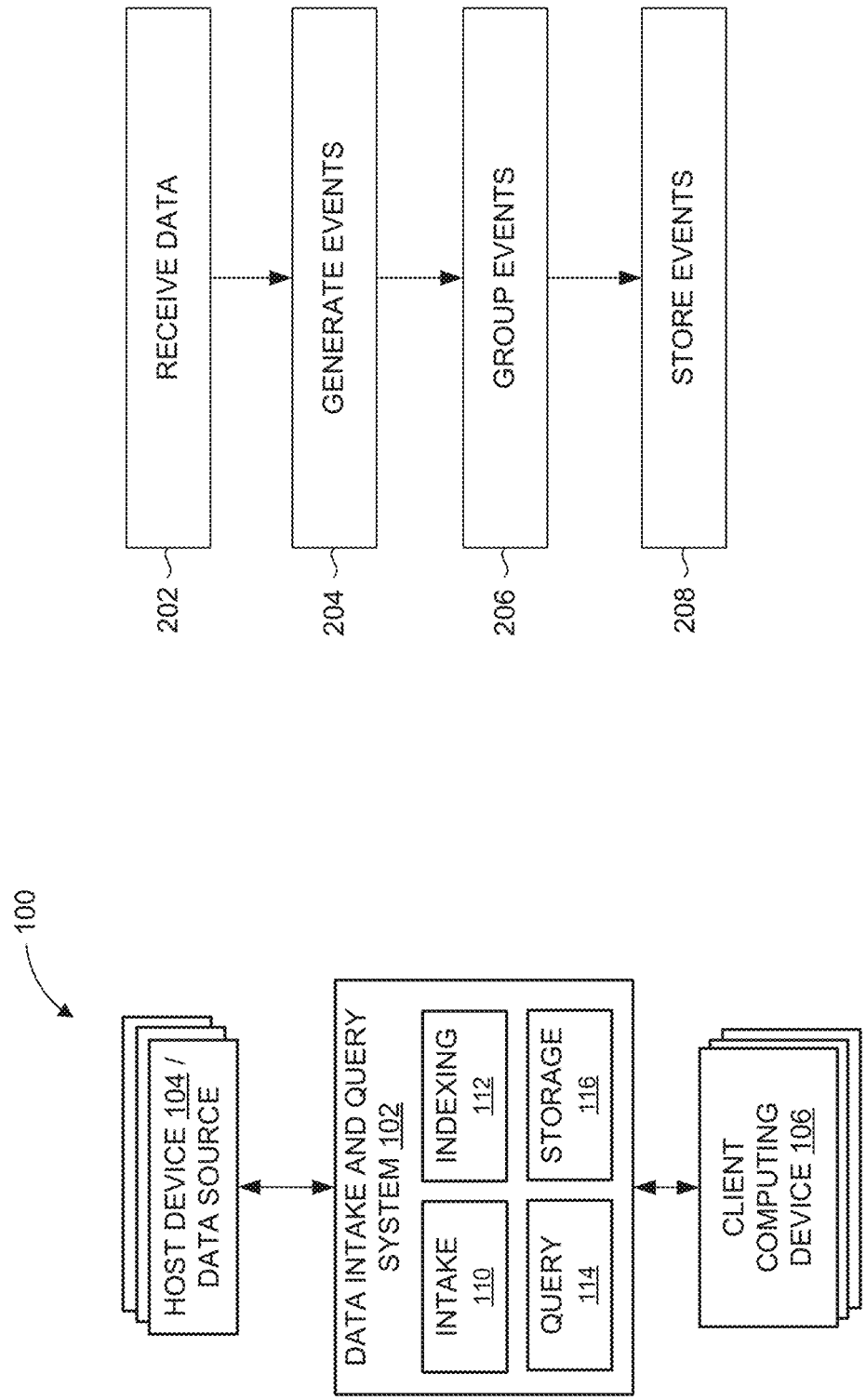

302

302A 127.0.0.1 -- eva [10/Oct/2000:13:55:36-0700] "GET/apache.gif HTTP/1.0" 200 2326 0.0947
127.0.0.1 -- emerson [10/Oct/2000:13:56:36-0700] "GET/eastwood.gif HTTP/1.0" 200 2980
0.0899      302C    302B
127.0.0.3 -- eliza [10/Oct/2000:13:57:36-0700] "GET/ezra.gif HTTP/1.0" 200 2900 0.0857
[Sunday Oct 10 1:58:33 2010] [error] [client 127.10.1.1.015] File does not exist: /home/emmeline/
pub_html/images/alisia.gif
       302E          302D
91.205.189.15 - - [28/Apr/2014:18:22:16] "GET /oldlink?itemId=EST-
14&JSESSIONID=SD6SL7FF7ADFF53113 HTTP 1.1" 200 1665 "http://
www.buttercupgames.com/oldlink?itemId=EST-14" "Mozilla/5.0 (Windwos NT 6.1; WOW 64)
AppleWebKit/536.5 (KHTML, like Gecko) Chrome/19.0.1084.46 Safari/536.5" 159

304 docker: {
    container_id: f7360a148a670c4c257f4ee024be81284b6017d72ae41ea8ee5d
}
kubernetes: {       304A
    container_name: kube-apiserver
    host: ip-172-20-43-173.ec2.internal
    labels: {
      k8s-app: kube-apiserver
    }
master_url: https://100.64.0.1:443/api
namespace_id: e5af26aa-4ef9-11e8-a4e1-0a2bf2ab4bba
namespace_name: kube-system
pod_id: 0a73017b-4efa-11e8-a4e1-0a2bf2ab4bba
pod_name: kube-apiserver-ip-172-20-43-173.ec2.internal
}                                                 304B
log: I0503 23:04:12.595203    1 wrap.go:42] GET /apis/admissionregistrations.k8s.io/v1beta1/
validatingwebhookconfiguration 200 [[kube-apiserver/v1.9.3 (linux/amd64) kubernetes/d283541]
127.0.0.1:55026 stream: stdout
time: 2018-05-03T23:04:12.619948395Z
}

306

| time | ID | CPU | memory |
|---|---|---|---|
| 10/10/00 12:01:00.013 | eliza | 14% | 80% |
| 10/10/00 12:01:05.153 | eva | 26% | 70% |

FIG. 3A

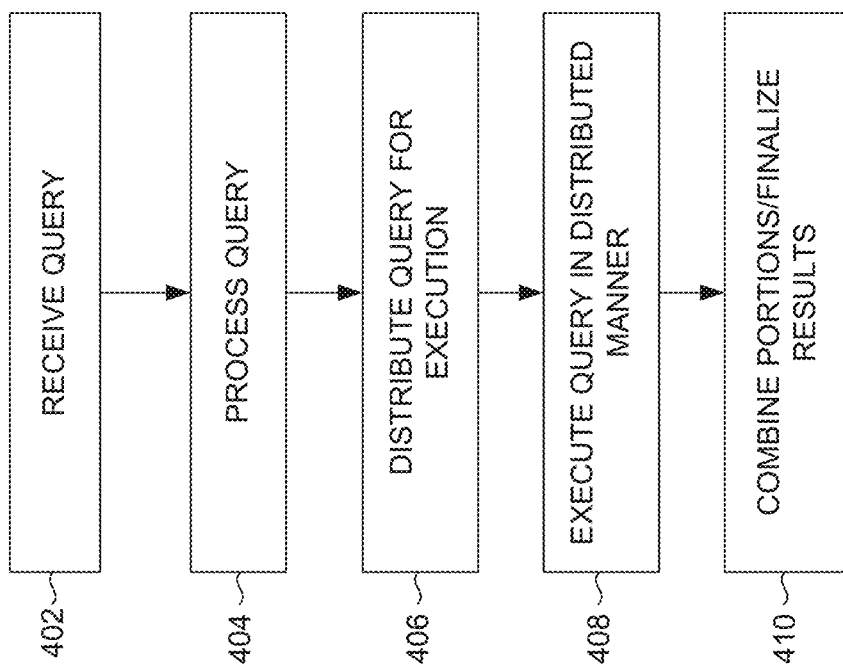

Splunk >Cloud (vNext) ▼ | Search | Datasets | Content
Content: > Untitled SPL Module
Outline | + | 700
@ main1

714
710

704 — 709A — 711A — 711B
```
1  $main1 = 1 FROM main
2  | rename source as `The Source`
3  | WHERE host = "gke-px-app-default-pool-2fc46a13-npnv";
```
← 711C

720

Keyword search

| | Time | Event | Aa Sourcetype |
|---|---|---|---|
| | | 00:00:00 +0000 UTC 2021-01-12 18:50:15 +0000 UTC }{Ready True 0001-01-01 00:00:00 +0000 UTC 2021-01-12 18:50:18 +0000 UTC }{ContainersReady True 0001-01-01 00:00:00... | |
| 7 | Fri, Apr 9th 2021 11:48:52 AM | {"plugin_id":"object":"2aca4420039b8","plugin_category":"filter","type":"jq_transformer", "output_plugin":false,"retry_count":null} | fluentd:monitor-agent |
| 8 | Fri, Apr 9th 2021 11:48:52 AM | {"plugin_id":"object":"2aca4420a8bc","plugin_category":"filter","type":"jq_transformer", "output_plugin":false,"retry_count":null} | fluentd:monitor-agent |
| 9 | Fri, Apr 9th 2021 11:48:52 AM | {"plugin_id":"object":"2aca43e35d40","plugin_category":"filter","type":"jq_transformer", "output_plugin":false,"retry_count":null} | fluentd:monitor-agent |
| 10 | Fri, Apr 9th 2021 11:48:52 AM | {"plugin_id":"object":"2aca43fe5ce4","plugin_category":"filter","type":"contact","output_ plugin":false,"retry_count":null} | fluentd:monitor-agent |
| 11 | Fri, Apr 9th 2021 11:48:52 AM | {"plugin_id":"object":"2aca43ffdeac","plugin_category":"filter","type":"grep","output- plugin":false,"retry_count":null} | fluentd:monitor-agent |
| 12 | Fri, Apr 9th 2021 11:48:52 AM | {"plugin_id":"object":"2aca4417b20c","plugin_category":"filter","type":"record_transformer", "output_plugin":false,"retry_count":null} | fluentd:monitor-agent |
| 13 | Fri, Apr 9th 2021 | {"plugin_id":"object":"2aca43e99890","plugin_category":"filter","type":"kubernetes_metad | fluentd:monitor-agent |

708
703 — Time Range Last 60mins
702
Display

718

Data | Actions | Details
Dataset
main

🔍 Search

⊙ Time
◇ Event
Aa Host
Aa index
Aa Sourcetype
Aa The source
buffer_available_buffer_s...
buffer_queue_byte_size
buffer_queue_length
buffer_stage_byte_size
buffer_stage_length
buffer_total_queue_byte_size
Aa caller
Aa cluster_name
Aa container_id
Aa container_name
emit_count
emit_records
Aa err
flush_time_count
Aa label_app
Aa label_k8s-app
Aa label_release

| Splunk > | | |
|---|---|---|
| Shared workspace > tom_test_3 > Untitled module* | | 900 |

904 — search / pipeline / Simple_stats

```
 1  import sample_data_index from /splunk_sample_data    909
 2
 3  function fun() {
 4      return "funky"      910B
 5  }                       910C
 6
 7
 8  $search = from sample_data_index
 9
10  $pipeline=from sample_data_index | into $destination
11  export $search;                  911C       910D
12  $simple_status = | from $bio | stats $pivot with extra measure = |from $bio |
     stats avg(weight), pivot (gender, avg(weight)) as _pivot1 by eyes |
     flaten _pivot;nt() by eyes;
```

910A, 910E, 910F, 911B 282 results. 49 fields. 4:00:00 PM, 31 Dec 1969 - 9:42:59 AM, 27 May 2022    showtimeline <

Keyword search

| Eye Color | Male | Female 908 |
|---|---|---|
| Amber | 199.7 | 170.9 |
| Blue | 176.4 | 156.5 |
| Brown | 185.2 | 152.1 |
| Gray | 168.9 | 148.6 |
| Green | 161.7 | 128.5 |
| Hazel | 136.7 | 130.1 |
| Red | 155.6 | 132.7 |

903 → All time ▼   </>  Save   Actions (4) 906 simple_stats

Data 918

$bio    1133  920

FILTERS(1)
Summarize avg(weight) for gender ...   924

Fields(49)  Search fields

→ Sort by Event coverage
- _time
- _raw
- Aa JSESSIONID         100
- Aa action              6
- # bytes              100
- Aa categoryId          9
- Aa clientip           20
- Aa cookie              1
- # date_hour           24
- # date_mday            8
- # date_minute         52
- Aa date_month          1
- # date_second         60

914, < Collapse

APPENDING TIME RANGES TO DISTINCT STATEMENTS OF A DATA PROCESSING PACKAGE

RELATED APPLICATIONS

Any and all applications for which a foreign or domestic priority claim is identified in the Application Data Sheet as filed with the present application are incorporated by reference under 37 CFR 1.57 and made a part of this specification. This application claims priority to U.S. Prov. App. No. 63/366,323, filed Jun. 13, 2022, entitled SYSTEM TO GENERATE AND/OR MODIFY INTERACTIVE CHARTS, MODIFY TIME RANGES ASSOCIATED WITH STATEMENTS OF A DATA PROCESSING PACKAGE AND/OR GENERATE DATA SUMMARIZATION STATEMENTS, which is incorporated herein by reference for all purposes.

BACKGROUND

Information technology (IT) environments may include diverse types of data systems that store large amounts of diverse data types generated by numerous devices. For example, a big data ecosystem may include databases such as MySQL and Oracle databases, cloud computing services such as Amazon web services (AWS), and other data systems that store passively or actively generated data, including machine-generated data ("machine data"). The machine data may include log data, performance data, diagnostic data, metrics, tracing data, or any other data that may be analyzed to diagnose equipment performance problems, monitor user interactions, and to derive other insights.

The large amount and diversity of data systems containing large amounts of structured, semi-structured, and unstructured data relevant to any search query may be massive, and continues to grow rapidly. This technological evolution may give rise to various challenges in relation to managing, understanding and effectively utilizing the data. To reduce the potentially vast amount of data that may be generated, some data systems pre-process data based on anticipated data analysis needs. In particular, specified data items may be extracted from the generated data and stored in a data system to facilitate efficient retrieval and analysis of those data items at a later time. At least some of the remainder of the generated data is typically discarded during pre-processing.

However, storing massive quantities of minimally processed or unprocessed data (collectively and individually referred to as "raw data") for later retrieval and analysis is becoming increasingly more feasible as storage capacity becomes more inexpensive and plentiful. In general, storing raw data and performing analysis on that data later may provide greater flexibility because it enables an analyst to analyze all of the generated data instead of only a fraction of it. Although the availability of vastly greater amounts of diverse data on diverse data systems provides opportunities to derive new insights, it also gives rise to technical challenges to search and analyze the data in a performant way.

BRIEF DESCRIPTION OF THE DRAWINGS

Illustrative examples are described in detail below with reference to the following figures:

FIG. 1 is a block diagram of an embodiment of a data processing environment.

FIG. 2 is a flow diagram illustrating an embodiment of a routine implemented by the data intake and query system to process, index, and store data.

FIG. 3A is a block diagram illustrating an embodiment of machine data received by the data intake and query system.

FIG. 4A is a flow diagram illustrating an embodiment of a routine implemented by the query system to execute a query.

FIG. 6 is a non-limiting example of a GUI that may be generated by the user interface system.

FIGS. 7A-7D, 8A-8D, 9A-9I, 10A-10I, and 11A-11D are diagrams illustrating example GUIs generated by the user interface system.

DETAILED DESCRIPTION

Figure 3B:
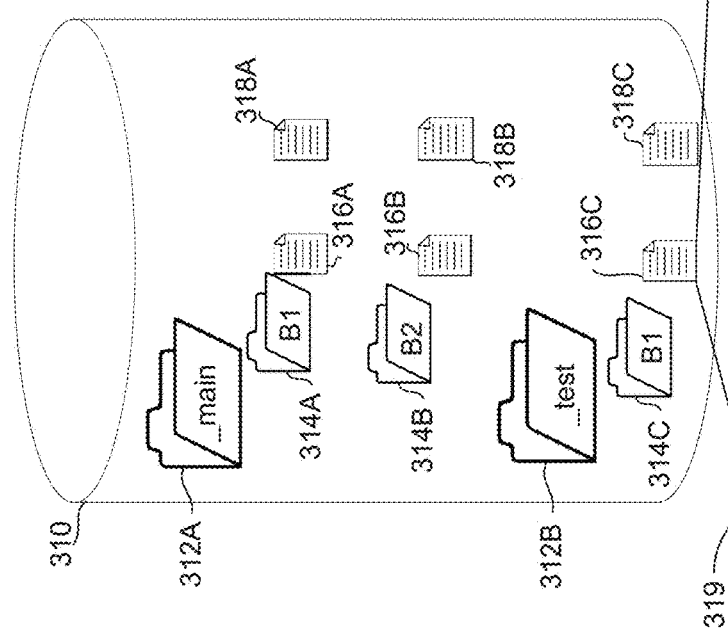
FIGS. 3B and 3C are block diagrams illustrating embodiments of various data structures for storing data processed by the data intake and query system.

Modern data centers and other computing environments may comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data may be raw machine data that is generated by various components in IT environments, such as servers, sensors, routers, mobile devices, Internet of Things (IoT) devices, etc. Machine data may include system logs, network packet data, sensor data, application program data, error logs, stack traces, system performance data, etc. In general, machine data may also include performance data, diagnostic information, and many other types of data that may be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time may provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which may collectively be very time-consuming to analyze. In another example, mobile devices may generate large amounts of information relating to data accesses, application performance, operating system performance, network performance, etc. There may be millions of mobile devices that concurrently report these types of information.

These challenges may be addressed by using an event-based data intake and query system, such as the SPLUNK® ENTERPRISE, SPLUNK® CLOUD, or SPLUNK® CLOUD SERVICE system developed by Splunk Inc. of San Francisco, California. These systems represent the leading platform for providing real-time operational intelligence that enables organizations to collect, index, and search machine data from various websites, applications, servers, networks, and mobile devices that power their businesses. The data intake and query system is particularly useful for analyzing data, which is commonly found in system log files, network data, metrics data, tracing data, and other data input sources.

In the data intake and query system, machine data is collected and stored as "events." An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp. The time stamp may be derived from the portion of machine data in the event, determined through interpolation between temporally proximate events having known timestamps, and/or may be determined based on other configurable rules for associating timestamps with events.

In some instances, machine data may have a predefined structure, where data items with specific data formats are stored at predefined locations in the data. For example, the machine data may include data associated with fields in a database table. In other instances, machine data may not have a predefined structure (e.g., may not be at fixed, predefined locations), but may have repeatable (e.g., non-random) patterns. This means that some machine data may comprise various data items of different data types that may be stored at different locations within the data. For example, when the data source is an operating system log, an event may include one or more lines from the operating system log containing machine data that includes different types of performance and diagnostic information associated with a specific point in time (e.g., a timestamp).

Examples of components which may generate machine data from which events may be derived include, but are not limited to, web servers, application servers, databases, firewalls, routers, operating systems, and software applications that execute on computer systems, mobile devices, sensors, Internet of Things (IoT) devices, etc. The machine data generated by such data sources may include, for example and without limitation, server log files, activity log files, configuration files, messages, network packet data, performance measurements, sensor measurements, etc.

The data intake and query system may use flexible schema to specify how to extract information from events. A flexible schema may be developed and redefined as needed. The flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp, and stores the events. The system enables users to run queries against the stored events to, for example, retrieve events that meet filter criteria specified in a query, such as criteria indicating certain keywords or having specific values in defined fields. Additional query terms may further process the event data, such as, by transforming the data, etc.

As used herein, the term "field" may refer to a location in the machine data of an event containing one or more values for a specific data item. A field may be referenced by a field name associated with the field. As will be described in more detail herein, in some cases, a field is defined by an extraction rule (e.g., a regular expression) that derives one or more values or a sub-portion of text from the portion of machine data in each event to produce a value for the field for that event. The set of values produced are semantically related (such as IP address), even though the machine data in each event may be in different formats (e.g., semantically related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file may include one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source-type. When events are to be searched based on a particular field name specified in a search, the system may use one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system may utilize a late-binding schema while performing queries on events. One aspect of a late-binding schema is applying extraction rules to events to extract values for specific fields during search time. More specifically, the extraction rule for a field may include one or more instructions that specify how to extract a value for the field from an event. An extraction rule may generally include any type of instruction for extracting values from machine data or events. In some cases, an extraction rule comprises a regular expression, where a sequence of characters form a search pattern. An extraction rule comprising a regular expression is referred to herein as a regex rule. The system applies a regex rule to machine data or an event to extract values for a field associated with the regex rule, where the values are extracted by searching the machine data/event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema may be developed on an ongoing basis until the time a query is actually executed. This means that extraction rules for the fields specified in a query may be provided in the query itself, or may be located during execution of the query. Hence, as a user learns more about the data in the events, the user may continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources.

In some embodiments, the configuration files and/or extraction rules described above may be stored in a catalog, such as a metadata catalog. In certain embodiments, the content of the extraction rules may be stored as rules or actions in the metadata catalog. For example, the identification of the data to which the extraction rule applies may be referred to a rule and the processing of the data may be referred to as an extraction action.

1.0. Operating Environment

FIG. 1 is a block diagram of an embodiment of a data processing environment 100. In the illustrated embodiment, the environment 100 includes a data intake and query system 102, one or more host devices 104, and one or more client computing devices 106 (generically referred to as client device(s) 106).

The data intake and query system 102, host devices 104, and client devices 106 may communicate with each other via one or more networks, such as a local area network (LAN), wide area network (WAN), private or personal network, cellular networks, intranetworks, and/or internetworks using any of wired, wireless, terrestrial microwave, satellite links, etc., and may include the Internet. Although not explicitly shown in FIG. 1, it will be understood that a client computing device 106 may communicate with a host device 104 via one or more networks. For example, if the host device 104 is configured as a web server and the client computing device 106 is a laptop, the laptop may communicate with the web server to view a website.

A client device 106 may correspond to a distinct computing device that may configure, manage, or sends queries to the system 102. Examples of client devices 106 may include, without limitation, smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, a client device 106 may include a hosted, virtualized, or containerized device, such as an isolated execution environment, that shares computing resources (e.g., processor, memory, etc.) of a particular machine with other isolated execution environments.

The client devices 106 may interact with the system 102 (or a host device 104) in a variety of ways. For example, the client devices 106 may communicate with the system 102 (or a host device 104) over an Internet (Web) protocol, via a gateway, via a command line interface, via a software developer kit (SDK), a standalone application, etc. As another example, the client devices 106 may use one or more executable applications or programs to interface with the system 102.

A host device 104 may correspond to a distinct computing device or system that includes or has access to data that may be ingested, indexed, and/or searched by the system 102. Accordingly, in some cases, a client device 106 may also be a host device 104 (e.g., it may include data that is ingested by the system 102 and it may submit queries to the system 102). The host devices 104 may include, but are not limited to, servers, sensors, routers, personal computers, mobile devices, internet of things (IoT) devices, or hosting devices, such as computing devices in a shared computing resource environment on which multiple isolated execution environment (e.g., virtual machines, containers, etc.) may be instantiated, or other computing devices in an IT environment (e.g., device that includes computer hardware, e.g., processors, non-transitory, computer-readable media, etc.). In certain cases, a host device 104 may include a hosted, virtualized, or containerized device, such as an isolated execution environment, that shares computing resources (e.g., processor, memory, etc.) of a particular machine (e.g., a hosting device or hosting machine) with other isolated execution environments.

As mentioned, host devices 104 may include or have access to data sources for the system 102. The data sources may include machine data found in log files, data files, distributed file systems, streaming data, publication-subscribe (pub/sub) buffers, directories of files, data sent over a network, event logs, registries, streaming data services (examples of which may include, by way of non-limiting example, Amazon's Simple Queue Service ("SQS") or Kinesis™ services, devices executing Apache Kafka™ software, or devices implementing the Message Queue Telemetry Transport (MQTT) protocol, Microsoft Azure EventHub, Google Cloud PubSub, devices implementing the Java Message Service (JMS) protocol, devices implementing the Advanced Message Queuing Protocol (AMQP)), cloud-based services (e.g., AWS, Microsoft Azure, Google Cloud, etc.), operating-system-level virtualization environments (e.g., Docker), container orchestration systems (e.g., Kubernetes), virtual machines using full virtualization or paravirtualization, or other virtualization technique or isolated execution environments.

In some cases, one or more applications executing on a host device may generate various types of machine data during operation. For example, a web server application executing on a host device 104 may generate one or more web server logs detailing interactions between the web server and any number of client devices 106 or other devices. As another example, a host device 104 implemented as a router may generate one or more router logs that record information related to network traffic managed by the router. As yet another example, a database server application executing on a host device 104 may generate one or more logs that record information related to requests sent from other devices (e.g., web servers, application servers, client devices, etc.) for data managed by the database server. Similarly, a host device 104 may generate and/or store computing resource utilization metrics, such as, but not limited to, CPU utilization, memory utilization, number of processes being executed, etc. Any one or any combination of the files or data generated in such cases may be used as a data source for the system 102.

In some embodiments, an application may include a monitoring component that facilitates generating performance data related to host device's operating state, including monitoring network traffic sent and received from the host device and collecting other device and/or application-specific information. A monitoring component may be an integrated component of the application, a plug-in, an extension, or any other type of add-on component, or a stand-alone process.

Such monitored information may include, but is not limited to, network performance data (e.g., a URL requested, a connection type (e.g., HTTP, HTTPS, etc.), a connection start time, a connection end time, an HTTP status code, request length, response length, request headers, response headers, connection status (e.g., completion, response time(s), failure, etc.)) or device performance information (e.g., current wireless signal strength of the device, a current connection type and network carrier, current memory performance information, processor utilization, memory utilization, a geographic location of the device, a device orientation, and any other information related to the operational state of the host device, etc.), device profile information (e.g., a type of client device, a manufacturer, and model of the device, versions of various software applications installed on the device, etc.) In some cases, the monitoring component may collect device performance information by monitoring one or more host device operations, or by making calls to an operating system and/or one or more other applications executing on a host device for performance information. The monitored information may be stored in one or more files and/or streamed to the system 102.

In general, a monitoring component may be configured to generate performance data in response to a monitor trigger in the code of a client application or other triggering application event, as described above, and to store the performance data in one or more data records. Each data record, for example, may include a collection of field-value pairs, each field-value pair storing a particular item of performance data in association with a field for the item. For example, a data record generated by a monitoring component may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

In some embodiments, such as in a shared computing resource environment (or hosted environment), a host device 104 may include logs or machine data generated by an application executing within an isolated execution environment (e.g., web server log file if the isolated execution environment is configured as a web server or database server log files if the isolated execution environment is configured as database server, etc.), machine data associated with the computing resources assigned to the isolated execution environment (e.g., CPU utilization of the portion of the CPU allocated to the isolated execution environment, memory utilization of the portion of the memory allocated to the isolated execution environment, etc.), logs or machine data generated by an application that enables the isolated execution environment to share resources with other isolated execution environments (e.g., logs generated by a Docker manager or Kubernetes manager executing on the host device 104), and/or machine data generated by monitoring the computing resources of the host device 104 (e.g., CPU utilization, memory utilization, etc.) that are shared between the isolated execution environments. Given the separation (and isolation) between isolated execution environments executing on a common computing device, in certain embodiments, each isolated execution environment may be treated as a separate host device 104 even if they are, in fact, executing on the same computing device or hosting device.

Accordingly, as used herein, obtaining data from a data source may refer to communicating with a host device 104 to obtain data from the host device 104 (e.g., from one or more data source files, data streams, directories on the host device 104, etc.). For example, obtaining data from a data source may refer to requesting data from a host device 104 and/or receiving data from a host device 104. In some such cases, the host device 104 may retrieve and return the requested data from a particular data source and/or the system 102 may retrieve the data from a particular data source of the host device 104 (e.g., from a particular file stored on a host device 104).

The data intake and query system 102 may ingest, index, and/or store data from heterogeneous data sources and/or host devices 104. For example, the system 102 may ingest, index, and/or store any type of machine data, regardless of the form of the machine data or whether the machine data matches or is similar to other machine data ingested, indexed, and/or stored by the system 102. In some cases, the system 102 may generate events from the received data, group the events, and store the events in buckets. The system 102 may also search heterogeneous data that it has stored, or search data stored by other systems (e.g., other system 102 systems or other non-system 102 systems). For example, in response to received queries, the system 102 may assign one or more components to search events stored in the storage system or search data stored elsewhere.

As will be described herein in greater detail below, the system 102 may use one or more components to ingest, index, store, and/or search data. In some embodiments, the system 102 is implemented as a distributed system that uses multiple components to perform its various functions. For example, the system 102 may include any one or any combination of an intake system 110 (including one or more components) to ingest data, an indexing system 112 (including one or more components) to index the data, a storage system 116 (including one or more components) to store the data, and/or a query system 114 (including one or more components) to search the data, etc.

In the illustrated embodiment, the system 102 is shown having four subsystems 110, 112, 114, 116. However, it will be understood that the system 102 may include any one or any combination of the intake system 110, indexing system 112, query system 114, or storage system 116. Further, in certain embodiments, one or more of the intake system 110, indexing system 112, query system 114, or storage system 116 may be used alone or apart from the system 102. For example, the intake system 110 may be used alone to glean information from streaming data that is not indexed or stored by the system 102, or the query system 114 may be used to search data that is unaffiliated with the system 102.

In certain embodiments, the components of the different systems may be distinct from each other or there may be some overlap. For example, one component of the system 102 may include some indexing functionality and some searching functionality and thus be used as part of the indexing system 112 and query system 114, while another computing device of the system 102 may only have ingesting or search functionality and only be used as part of those respective systems. Similarly, the components of the storage system 116 may include data stores of individual components of the indexing system and/or may be a separate shared data storage system, like Amazon S3, that is accessible to distinct components of the intake system 110, indexing system 112, and query system 114.

In some cases, the components of the system 102 are implemented as distinct computing devices having their own computer hardware (e.g., processors, non-transitory, computer-readable media, etc.) and/or as distinct hosted devices (e.g., isolated execution environments) that share computing resources or hardware in a shared computing resource environment.

For simplicity, references made herein to the intake system 110, indexing system 112, storage system 116, and query system 114 may refer to those components used for ingesting, indexing, storing, and searching, respectively. However, it will be understood that although reference is made to two separate systems, the same underlying component may be performing the functions for the two different systems. For example, reference to the indexing system indexing data and storing the data in the storage system 116 or the query system searching the data may refer to the same component (e.g., same computing device or hosted device) indexing the data, storing the data, and then searching the data that it stored.

As will be described in greater detail herein, the intake system 110 may receive data from the host devices 104 or data sources, perform one or more preliminary processing operations on the data, and communicate the data to the indexing system 112, query system 114, storage system 116, or to other systems (which may include, for example, data processing systems, telemetry systems, real-time analytics systems, data stores, databases, etc., any of which may be operated by an operator of the system 102 or a third party). Given the amount of data that may be ingested by the intake system 110, in some embodiments, the intake system may include multiple distributed computing devices or components working concurrently to ingest the data.

The intake system 110 may receive data from the host devices 104 in a variety of formats or structures. In some embodiments, the received data corresponds to raw machine data, structured or unstructured data, correlation data, data files, directories of files, data sent over a network, event logs, registries, messages published to streaming data sources, performance metrics, sensor data, image and video data, etc.

The preliminary processing operations performed by the intake system 110 may include, but is not limited to, associating metadata with the data received from a host device 104, extracting a timestamp from the data, identifying individual events within the data, extracting a subset of machine data for transmittal to the indexing system 112, enriching the data, etc. As part of communicating the data to the indexing system, the intake system 110 may route the data to a particular component of the intake system 110 or dynamically route the data based on load-balancing, etc. In certain cases, one or more components of the intake system 110 may be installed on a host device 104.

1.4.2. Indexing System Over View

As will be described in greater detail herein, the indexing system 112 may include one or more components (e.g., indexing nodes) to process the data and store it, for example, in the storage system 116. As part of processing the data, the indexing system may identify distinct events within the data, timestamps associated with the data, organize the data into buckets or time series buckets, convert editable buckets to non-editable buckets, store copies of the buckets in the storage system 116, merge buckets, generate indexes of the data, etc. In addition, the indexing system 112 may update various catalogs or databases with information related to the buckets (pre-merged or merged) or data that is stored in the storage system 116, and may communicate with the intake system 110 about the status of the data storage.

As will be described in greater detail herein, the query system 114 may include one or more components to receive, process, and execute queries. In some cases, the query system 114 may use the same component to process and execute the query or use one or more components to receive and process the query (e.g., a search head) and use one or more other components to execute at least a portion of the query (e.g., search nodes). In some cases, a search node and an indexing node may refer to the same computing device or hosted device performing different functions. In certain cases, a search node may be a separate computing device or hosted device from an indexing node.

Queries received by the query system 114 may be relatively complex and identify a set of data to be processed and a manner of processing the set of data from one or more client devices 106. In certain cases, the query may be implemented using a pipelined command language or other query language. As described herein, in some cases, the query system 114 may execute parts of the query in a distributed fashion (e.g., one or more mapping phases or parts associated with identifying and gathering the set of data identified in the query) and execute other parts of the query on a single component (e.g., one or more reduction phases). However, it will be understood that in some cases multiple components may be used in the map and/or reduce functions of the query execution.

In some cases, as part of executing the query, the query system 114 may use one or more catalogs or databases to identify the set of data to be processed or its location in the storage system 116 and/or may retrieve data from the storage system 116. In addition, in some embodiments, the query system 114 may store some or all of the search results in the storage system 116.

In some cases, the storage system 116 may include one or more data stores associated with or coupled to the components of the indexing system 112 that are accessible via a system bus or local area network. In certain embodiments, the storage system 116 may be a shared storage system 116, like Amazon S3 or Google Cloud Storage, that are accessible via a wide area network.

As mentioned and as will be described in greater detail below, the storage system 116 may be made up of one or more data stores storing data that has been processed by the indexing system 112. In some cases, the storage system includes data stores of the components of the indexing system 112 and/or query system 114. In certain embodiments, the storage system 116 may be implemented as a shared storage system 116. The shared storage system 116 may be configured to provide high availability, highly resilient, low loss data storage. In some cases, to provide the high availability, highly resilient, low loss data storage, the shared storage system 116 may store multiple copies of the data in the same and different geographic locations and across different types of data stores (e.g., solid state, hard drive, tape, etc.). Further, as data is received at the shared storage system 116 it may be automatically replicated multiple times according to a replication factor to different data stores across the same and/or different geographic locations. In some embodiments, the shared storage system 116 may correspond to cloud storage, such as Amazon Simple Storage Service (S3) or Elastic Block Storage (EBS), Google Cloud Storage, Microsoft Azure Storage, etc.

In some embodiments, indexing system 112 may read to and write from the shared storage system 116. For example, the indexing system 112 may copy buckets of data from its local or shared data stores to the shared storage system 116. In certain embodiments, the query system 114 may read from, but may not write to, the shared storage system 116. For example, the query system 114 may read the buckets of data stored in shared storage system 116 by the indexing system 112, but may not be able to copy buckets or other data to the shared storage system 116. In some embodiments, the intake system 110 does not have access to the shared storage system 116. However, in some embodiments, one or more components of the intake system 110 may write data to the shared storage system 116 that may be read by the indexing system 112.

As described herein, in some embodiments, data in the system 102 (e.g., in the data stores of the components of the indexing system 112, shared storage system 116, or search nodes of the query system 114) may be stored in one or more time series buckets. Each bucket may include raw machine data associated with a timestamp and additional information about the data or bucket, such as, but not limited to, one or more filters, indexes (e.g., TSIDX, inverted indexes, keyword indexes, etc.), bucket summaries, etc. In some embodiments, the bucket data and information about the bucket data is stored in one or more files. For example, the raw machine data, filters, indexes, bucket summaries, etc. may be stored in respective files in or associated with a bucket. In certain cases, the group of files may be associated together to form the bucket.

The system 102 may include additional components that interact with any one or any combination of the intake system 110, indexing system 112, query system 114, and/or storage system 116. Such components may include, but are not limited to an authentication system, orchestration system, one or more catalogs or databases, a gateway, etc.

An authentication system may include one or more components to authenticate users to access, use, and/or configure the system 102. Similarly, the authentication system may be used to restrict what a particular user may do on the system 102 and/or what components or data a user may access, etc.

An orchestration system may include one or more components to manage and/or monitor the various components of the system 102. In some embodiments, the orchestration system may monitor the components of the system 102 to detect when one or more components has failed or is unavailable and enable the system 102 to recover from the failure (e.g., by adding additional components, fixing the failed component, or having other components complete the tasks assigned to the failed component). In certain cases, the orchestration system may determine when to add components to or remove components from a particular system 110, 112, 114, 116 (e.g., based on usage, user/tenant requests, etc.). In embodiments where the system 102 is implemented in a shared computing resource environment, the orchestration system may facilitate the creation and/or destruction of isolated execution environments or instances of the components of the system 102, etc.

In certain embodiments, the system 102 may include various components that enable it to provide stateless services or enable it to recover from an unavailable or unresponsive component without data loss in a time efficient manner. For example, the system 102 may store contextual information about its various components in a distributed way such that if one of the components becomes unresponsive or unavailable, the system 102 may replace the unavailable component with a different component and provide the replacement component with the contextual information. In this way, the system 102 may quickly recover from an unresponsive or unavailable component while reducing or eliminating the loss of data that was being processed by the unavailable component.

In some embodiments, the system 102 may store the contextual information in a catalog, as described herein. In certain embodiments, the contextual information may correspond to information that the system 102 has determined or learned based on use. In some cases, the contextual information may be stored as annotations (manual annotations and/or system annotations), as described herein.

In certain embodiments, the system 102 may include an additional catalog that monitors the location and storage of data in the storage system 116 to facilitate efficient access of the data during search time. In certain embodiments, such a catalog may form part of the storage system 116.

In some embodiments, the system 102 may include a gateway or other mechanism to interact with external devices or to facilitate communications between components of the system 102. In some embodiments, the gateway may be implemented using an application programming interface (API). In certain embodiments, the gateway may be implemented using a representational state transfer API (REST API).

In some environments, a user of a system 102 may install and configure, on computing devices owned and operated by the user, one or more software applications that implement some or all of the components of the system 102. For example, with reference to FIG. 1, a user may install a software application on server computers owned by the user and configure each server to operate as one or more components of the intake system 110, indexing system 112, query system 114, shared storage system 116, or other components of the system 102. This arrangement generally may be referred to as an "on-premises" solution. That is, the system 102 is installed and operates on computing devices directly controlled by the user of the system 102. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 102 operate.

In certain embodiments, one or more of the components of the system 102 may be implemented in a shared computing resource environment. In this context, a shared computing resource environment or cloud-based service may refer to a service hosted by one more computing resources that are accessible to end users over a network, for example, by using a web browser or other application on a client device to interface with the remote computing resources. For example, a service provider may provide a system 102 by managing computing resources configured to implement various aspects of the system (e.g., intake system 110, indexing system 112, query system 114, shared storage system 116, other components, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

When implemented in a shared computing resource environment, the underlying hardware (non-limiting examples: processors, hard drives, solid-state memory, RAM, etc.) on which the components of the system 102 execute may be shared by multiple customers or tenants as part of the shared computing resource environment. In addition, when implemented in a shared computing resource environment as a cloud-based service, various components of the system 102 may be implemented using containerization or operating-system-level virtualization, or other virtualization technique. For example, one or more components of the intake system 110, indexing system 112, or query system 114 may be implemented as separate software containers or container instances. Each container instance may have certain computing resources (e.g., memory, processor, etc.) of an underlying hosting computing system (e.g., server, microprocessor, etc.) assigned to it, but may share the same operating system and may use the operating system's system call interface. Each container may provide an isolated execution environment on the host system, such as by providing a memory space of the hosting system that is logically isolated from memory space of other containers. Further, each container may run the same or different computer applications concurrently or separately, and may interact with each other. Although reference is made herein to containerization and container instances, it will be understood that other virtualization techniques may be used. For example, the components may be implemented using virtual machines using full virtualization or paravirtualization, etc. Thus, where reference is made to "containerized" components, it should be understood that such components may additionally or alternatively be implemented in other isolated execution environments, such as a virtual machine environment.

Implementing the system 102 in a shared computing resource environment may provide a number of benefits. In some cases, implementing the system 102 in a shared computing resource environment may make it easier to install, maintain, and update the components of the system 102. For example, rather than accessing designated hardware at a particular location to install or provide a component of the system 102, a component may be remotely instantiated or updated as desired. Similarly, implementing the system 102 in a shared computing resource environment or as a cloud-based service may make it easier to meet dynamic demand. For example, if the system 102 experiences signifimayt load at indexing or search, additional compute resources may be deployed to process the additional data or queries. In an "on-premises" environment, this type of flexibility and scalability may not be possible or feasible.

In addition, by implementing the system 102 in a shared computing resource environment or as a cloud-based service may improve compute resource utilization. For example, in an on-premises environment if the designated compute resources are not being used by, they may sit idle and unused. In a shared computing resource environment, if the compute resources for a particular component are not being used, they may be re-allocated to other tasks within the system 102 and/or to other systems unrelated to the system 102.

As mentioned, in an on-premises environment, data from one instance of a system 102 is logically and physically separated from the data of another instance of a system 102 by virtue of each instance having its own designated hardware. As such, data from different customers of the system 102 is logically and physically separated from each other. In a shared computing resource environment, components of a system 102 may be configured to process the data from one customer or tenant or from multiple customers or tenants. Even in cases where a separate component of a system 102 is used for each customer, the underlying hardware on which the components of the system 102 are instantiated may still process data from different tenants. Accordingly, in a shared computing resource environment, the data from different tenants may not be physically separated on distinct hardware devices. For example, data from one tenant may reside on the same hard drive as data from another tenant or be processed by the same processor. In such cases, the system 102 may maintain logical separation between tenant data. For example, the system 102 may include separate directories for different tenants and apply different permissions and access controls to access the different directories or to process the data, etc.

In certain cases, the tenant data from different tenants is mutually exclusive and/or independent from each other. For example, in certain cases, Tenant A and Tenant B do not share the same data, similar to the way in which data from a local hard drive of Customer A is mutually exclusive and independent of the data (and not considered part) of a local hard drive of Customer B. While Tenant A and Tenant B may have matching or identical data, each tenant would have a separate copy of the data. For example, with reference again to the local hard drive of Customer A and Customer B example, each hard drive could include the same file. However, each instance of the file would be considered part of the separate hard drive and would be independent of the other file. Thus, one copy of the file would be part of Customer's A hard drive and a separate copy of the file would be part of Customer B's hard drive. In a similar manner, to the extent Tenant A has a file that is identical to a file of Tenant B, each tenant would have a distinct and independent copy of the file stored in different locations on a data store or on different data stores.

Further, in certain cases, the system 102 may maintain the mutual exclusivity and/or independence between tenant data even as the tenant data is being processed, stored, and searched by the same underlying hardware. In certain cases, to maintain the mutual exclusivity and/or independence between the data of different tenants, the system 102 may use tenant identifiers to uniquely identify data associated with different tenants.

In a shared computing resource environment, some components of the system 102 may be instantiated and designated for individual tenants and other components may be shared by multiple tenants. In certain embodiments, a separate intake system 110, indexing system 112, and query system 114 may be instantiated for each tenant, whereas the shared storage system 116 or other components (e.g., data store, metadata catalog, and/or acceleration data store, described below) may be shared by multiple tenants. In some such embodiments where components are shared by multiple tenants, the components may maintain separate directories for the different tenants to ensure their mutual exclusivity and/or independence from each other. Similarly, in some such embodiments, the system 102 may use different hosting computing systems or different isolated execution environments to process the data from the different tenants as part of the intake system 110, indexing system 112, and/or query system 114.

In some embodiments, individual components of the intake system 110, indexing system 112, and/or query system 114 may be instantiated for each tenant or shared by multiple tenants. For example, some individual intake system components (e.g., forwarders, output ingestion buffer) may be instantiated and designated for individual tenants, while other intake system components (e.g., a data retrieval subsystem, intake ingestion buffer, and/or streaming data processor), may be shared by multiple tenants.

In certain embodiments, an indexing system 112 (or certain components thereof) may be instantiated and designated for a particular tenant or shared by multiple tenants. In some embodiments where a separate indexing system 112 is instantiated and designated for each tenant, different resources may be reserved for different tenants. For example, Tenant A may be consistently allocated a minimum of four indexing nodes and Tenant B may be consistently allocated a minimum of two indexing nodes. In some such embodiments, the four indexing nodes may be reserved for Tenant A and the two indexing nodes may be reserved for Tenant B, even if Tenant A and Tenant B are not using the reserved indexing nodes.

In embodiments where an indexing system 112 is shared by multiple tenants, components of the indexing system 112 may be dynamically assigned to different tenants. For example, if Tenant A has greater indexing demands, additional indexing nodes may be instantiated or assigned to Tenant A's data. However, as the demand decreases, the indexing nodes may be reassigned to a different tenant or terminated. Further, in some embodiments, a component of the indexing system 112 may concurrently process data from the different tenants.

In some embodiments, one instance of query system 114 may be shared by multiple tenants. In some such cases, the same search head may be used to process/execute queries for different tenants and/or the same search nodes may be used to execute query for different tenants. Further, in some such cases, different tenants may be allocated different amounts of compute resources. For example, Tenant A may be assigned more search heads or search nodes based on demand or based on a service level arrangement than another tenant. However, once a search is completed the search head and/or nodes assigned to Tenant A may be assigned to Tenant B, deactivated, or their resource may be re-allocated to other components of the system 102, etc.

In some cases, by sharing more components with different tenants, the functioning of the system 102 may be improved. For example, by sharing components across tenants, the system 102 may improve resource utilization thereby reducing the amount of resources allocated as a whole. For example, if four indexing nodes, two search heads, and four search nodes are reserved for each tenant then those compute resources are unavailable for use by other processes or tenants, even if they go unused. In contrast, by sharing the indexing nodes, search heads, and search nodes with different tenants and instantiating additional compute resources, the system 102 may use fewer resources overall while providing improved processing time for the tenants that are using the compute resources. For example, if tenant A is not using any search nodes 506 and tenant B has many searches running, the system 102 may use search nodes that would have been reserved for tenant A to service tenant B. In this way, the system 102 may decrease the number of compute resources used/reserved, while improving the search time for tenant B and improving compute resource utilization.

2.0. Data Ingestion, Indexing, and Storage

FIG. 2 is a flow diagram illustrating an embodiment of a routine implemented by the system 102 to process, index, and store data received from host devices 104. The data flow illustrated in FIG. 2 is provided for illustrative purposes only. It will be understood that one or more of the steps of the processes illustrated in FIG. 2 may be removed or that the ordering of the steps may be changed. Furthermore, for the purposes of illustrating a clear example, one or more particular system components are described in the context of performing various operations during each of the data flow stages. For example, the intake system 110 is described as receiving machine data and the indexing system 112 is described as generating events, grouping events, and storing events. However, other system arrangements and distributions of the processing steps across system components may be used. For example, in some cases, the intake system 110 may generate events.

At block 202, the intake system 110 receives data from a host device 104. The intake system 110 initially may receive the data as a raw data stream generated by the host device 104. For example, the intake system 110 may receive a data stream from a log file generated by an application server, from a stream of network data from a network device, or from any other source of data. Non-limiting examples of machine data that may be received by the intake system 110 is described herein with reference to FIG. 3A.

In some embodiments, the intake system 110 receives the raw data and may segment the data stream into messages, possibly of a uniform data size, to facilitate subsequent processing steps. The intake system 110 may thereafter process the messages in accordance with one or more rules to conduct preliminary processing of the data. In one embodiment, the processing conducted by the intake system 110 may be used to indicate one or more metadata fields applicable to each message. For example, the intake system 110 may include metadata fields within the messages, or publish the messages to topics indicative of a metadata field. These metadata fields may, for example, provide information related to a message as a whole and may apply to each event that is subsequently derived from the data in the message. For example, the metadata fields may include separate fields specifying each of a host, a source, and a sourcetype related to the message. A host field may contain a value identifying a host name or IP address of a device that generated the data. A source field may contain a value identifying a source of the data, such as a pathname of a file or a protocol and port related to received network data. A sourcetype field may contain a value specifying a particular sourcetype label for the data. Additional metadata fields may also be included, such as a character encoding of the data, if known, and possibly other values that provide information relevant to later processing steps. In certain embodiments, the intake system 110 may perform additional operations, such as, but not limited to, identifying individual events within the data, determining timestamps for the data, further enriching the data, etc.

At block 204, the indexing system 112 generates events from the data. In some cases, as part of generating the events, the indexing system 112 may parse the data of the message. In some embodiments, the indexing system 112 may determine a sourcetype associated with each message (e.g., by extracting a sourcetype label from the metadata fields associated with the message, etc.) and refer to a sourcetype configuration corresponding to the identified sourcetype to parse the data of the message. The sourcetype definition may include one or more properties that indicate to the indexing system 112 to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a sourcetype for the data is unknown to the indexing system 112, the indexing system 112 may infer a sourcetype for the data by examining the structure of the data. Then, the indexing system 112 may apply an inferred sourcetype definition to the data to create the events.

In addition, as part of generating events from the data, the indexing system 112 may determine a timestamp for each event. Similar to the process for parsing machine data, the indexing system 112 may again refer to a sourcetype definition associated with the data to locate one or more properties that indicate instructions for determining a timestamp for each event. The properties may, for example, instruct the indexing system 112 to extract a time value from a portion of data for the event (e.g., using a regex rule), to interpolate time values based on timestamps associated with temporally proximate events, to create a timestamp based on a time the portion of machine data was received or generated, to use the timestamp of a previous event, or use any other rules for determining timestamps, etc.

The indexing system 112 may also associate events with one or more metadata fields. In some embodiments, a timestamp may be included in the metadata fields. These metadata fields may include any number of "default fields" that are associated with all events, and may also include one more custom fields as defined by a user. In certain embodiments, the default metadata fields associated with each event may include a host, source, and sourcetype field including or in addition to a field storing the timestamp.

In certain embodiments, the indexing system 112 may also apply one or more transformations to event data that is to be included in an event. For example, such transformations may include removing a portion of the event data (e.g., a portion used to define event boundaries, extraneous characters from the event, other extraneous text, etc.), masking a portion of event data (e.g., masking a credit card number), removing redundant portions of event data, etc. The transformations applied to event data may, for example, be specified in one or more configuration files and referenced by one or more sourcetype definitions.

At block 206, the indexing system 112 may group events. In some embodiments, the indexing system 112 may group events based on time. For example, events generated within a particular time period or events that have a time stamp within a particular time period may be grouped together to form a bucket. A non-limiting example of a bucket is described herein with reference to FIG. 3B.

In certain embodiments, multiple components of the indexing system, such as an indexing node, may concurrently generate events and buckets. Furthermore, each indexing node that generates and groups events may concurrently generate multiple buckets. For example, multiple processors of an indexing node may concurrently process data, generate events, and generate buckets. Further, multiple indexing nodes may concurrently generate events and buckets. As such, ingested data may be processed in a highly distributed manner.

In some embodiments, as part of grouping events together, the indexing system 112 may generate one or more inverted indexes for a particular group of events. A non-limiting example of an inverted index is described herein with reference to FIG. 3C. In certain embodiments, the inverted indexes may include location information for events of a bucket. For example, the events of a bucket may be compressed into one or more files to reduce their size. The inverted index may include location information indicating the particular file and/or location within a particular file of a particular event.

In certain embodiments, the inverted indexes may include keyword entries or entries for field values or field name-value pairs found in events. In some cases, a field name-value pair may include a pair of words connected by a symbol, such as an equals sign or colon. The entries may also include location information for events that include the keyword, field value, or field value pair. In this way, relevant events may be quickly located. In some embodiments, fields may automatically be generated for some or all of the field names of the field name-value pairs at the time of indexing. For example, if the string "dest=10.0.1.2" is found in an event, a field named "dest" may be created for the event, and assigned a value of "10.0.1.2." In certain embodiments, the indexing system may populate entries in the inverted index with field name-value pairs by parsing events using one or more regex rules to determine a field value associated with a field defined by the regex rule. For example, the regex rule may indicate how to find a field value for a userID field in certain events. In some cases, the indexing system 112 may use the sourcetype of the event to determine which regex to use for identifying field values.

Figure 3C:
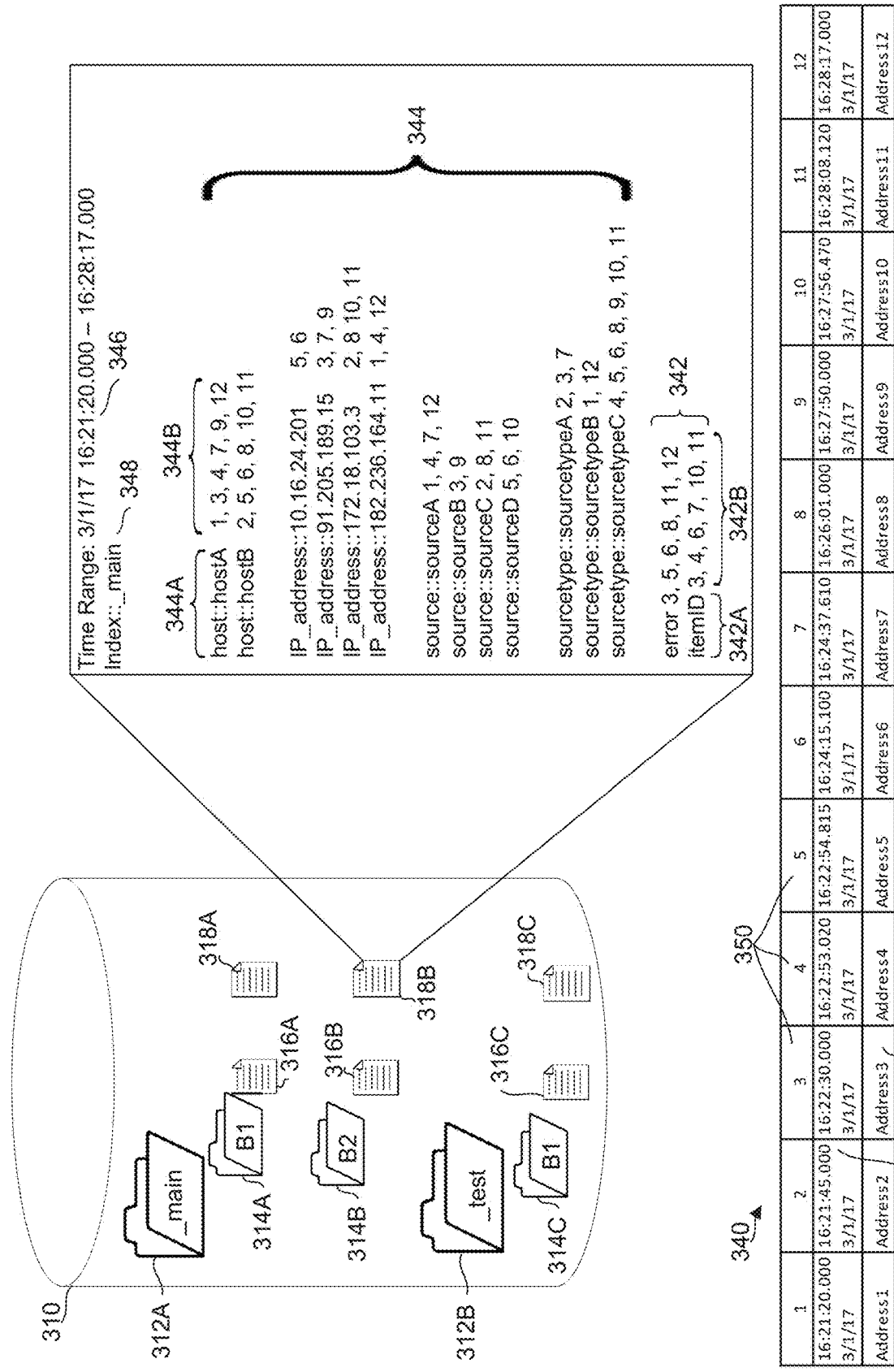

At block 208, the indexing system 112 stores the events with an associated timestamp in the storage system 116, which may be in a local data store and/or in a shared storage system. Timestamps enable a user to search for events based on a time range. In some embodiments, the stored events are organized into "buckets," where each bucket stores events associated with a specific time range based on the timestamps associated with each event. As mentioned, FIGS. 3B and 3C illustrate an example of a bucket. This improves time-based searching, as well as allows for events with recent timestamps, which may have a higher likelihood of being accessed, to be stored in a faster memory to facilitate faster retrieval. For example, buckets containing the most recent events may be stored in flash memory rather than on a hard disk. In some embodiments, each bucket may be associated with an identifier, a time range, and a size constraint.

The indexing system 112 may be responsible for storing the events in the storage system 116. As mentioned, the events or buckets may be stored locally on a component of the indexing system 112 or in a shared storage system 116. In certain embodiments, the component that generates the events and/or stores the events (indexing node) may also be assigned to search the events. In some embodiments separate components may be used for generating and storing events (indexing node) and for searching the events (search node).

By storing events in a distributed manner (either by storing the events at different components or in a shared storage system 116), the query system 114 may analyze events for a query in parallel. For example, using mapreduce techniques, multiple components of the query system (e.g., indexing or search nodes) may concurrently search and provide partial responses for a subset of events to another component (e.g., search head) that combines the results to produce an answer for the query. By storing events in buckets for specific time ranges, the indexing system 112 may further optimize the data retrieval process by the query system 114 to search buckets corresponding to time ranges that are relevant to a query. In some embodiments, each bucket may be associated with an identifier, a time range, and a size constraint. In certain embodiments, a bucket may correspond to a file system directory and the machine data, or events, of a bucket may be stored in one or more files of the file system directory. The file system directory may include additional files, such as one or more inverted indexes, high performance indexes, permissions files, configuration files, etc.

In embodiments where components of the indexing system 112 store buckets locally, the components may include a home directory and a cold directory. The home directory may store hot buckets and warm buckets, and the cold directory stores cold buckets. A hot bucket may refer to a bucket that is capable of receiving and storing additional events. A warm bucket may refer to a bucket that may no longer receive events for storage, but has not yet been moved to the cold directory. A cold bucket may refer to a bucket that may no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, components of the indexing system 112 may also have a quarantine bucket that contains events having potentially inaccurate information, such as an incorrect timestamp associated with the event or a timestamp that appears to be an unreasonable timestamp for the corresponding event. The quarantine bucket may have events from any time range; as such, the quarantine bucket may always be searched at search time. Additionally, components of the indexing system may store old, archived data in a frozen bucket that is not capable of being searched at search time. In some embodiments, a frozen bucket may be stored in slower and/or larger memory, such as a hard disk, and may be stored in offline and/or remote storage.

In some embodiments, components of the indexing system 112 may not include a cold directory and/or cold or frozen buckets. For example, in embodiments where buckets are copied to a shared storage system 116 and searched by separate components of the query system 114, buckets may be deleted from components of the indexing system as they are stored to the storage system 116. In certain embodiments, the shared storage system 116 may include a home directory that includes warm buckets copied from the indexing system 112 and a cold directory of cold or frozen buckets as described above.

FIG. 3A is a block diagram illustrating an embodiment of machine data received by the system 102. The machine data may correspond to data from one or more host devices 104 or data sources. As mentioned, the data source may correspond to a log file, data stream or other data structure that is accessible by a host device 104. In the illustrated embodiment of FIG. 3A, the machine data has different forms. For example, the machine data 302 may be log data that is unstructured or that does not have any clear structure or fields, and include different portions 302A-302E that correspond to different entries of the log and that separated by boundaries. Such data may also be referred to as raw machine data.

The machine data 304 may be referred to as structured or semi-structured machine data as it does include some data in a JSON structure defining certain field and field values (e.g., machine data 304A showing field name: field values container_name: kube-apiserver, host: ip 172 20 43 173.ec2.internal, pod_id: 0a73017b-4efa-11e8-a4e1-0a2bf2ab4bba, etc.), but other parts of the machine data 304 is unstructured or raw machine data (e.g., machine data 304B). The machine data 306 may be referred to as structured data as it includes particular rows and columns of data with field names and field values.

In some embodiments, the machine data 302 may correspond to log data generated by a host device 104 configured as an Apache server, the machine data 304 may correspond to log data generated by a host device 104 in a shared computing resource environment, and the machine data 306 may correspond to metrics data. Given the differences between host devices 104 that generated the log data 302, 304, the form of the log data 302, 304 is different. In addition, as the log data 304 is from a host device 104 in a shared computing resource environment, it may include log data generated by an application being executed within an isolated execution environment (304B, excluding the field name "log:") and log data generated by an application that enables the sharing of computing resources between isolated execution environments (all other data in 304). Although shown together in FIG. 3A, it will be understood that machine data with different hosts, sources, or sourcetypes may be received separately and/or found in different data sources and/or host devices 104.

As described herein, the system 102 may process the machine data based on the form in which it is received. In some cases, the intake system 110 may utilize one or more rules to process the data. In certain embodiments, the intake system 110 may enrich the received data. For example, the intake system may add one or more fields to the data received from the host devices 104, such as fields denoting the host, source, sourcetype, index, or tenant associated with the incoming data. In certain embodiments, the intake system 110 may perform additional processing on the incoming data, such as transforming structured data into unstructured data (or vice versa), identifying timestamps associated with the data, removing extraneous data, parsing data, indexing data, separating data, categorizing data, routing data based on criteria relating to the data being routed, and/or performing other data transformations, etc.

In some cases, the data processed by the intake system 110 may be communicated or made available to the indexing system 112, the query system 114, and/or to other systems. In some embodiments, the intake system 110 communicates or makes available streams of data using one or more shards. For example, the indexing system 112 may read or receive data from one shard and another system may receive data from another shard. As another example, multiple systems may receive data from the same shard.

As used herein, a partition may refer to a logical division of data. In some cases, the logical division of data may refer to a portion of a data stream, such as a shard from the intake system 110. In certain cases, the logical division of data may refer to an index or other portion of data stored in the storage system 116, such as different directories or file structures used to store data or buckets. Accordingly, it will be understood that the logical division of data referenced by the term partition will be understood based on the context of its use.

FIGS. 3B and 3C are block diagrams illustrating embodiments of various data structures for storing data processed by the system 102. FIG. 3B includes an expanded view illustrating an example of machine data stored in a data store 310 of the data storage system 116. It will be understood that the depiction of machine data and associated metadata as rows and columns in the table 319 of FIG. 3B is merely illustrative and is not intended to limit the data format in which the machine data and metadata is stored in various embodiments described herein. In one particular embodiment, machine data may be stored in a compressed or encrypted format. In such embodiments, the machine data may be stored with or be associated with data that describes the compression or encryption scheme with which the machine data is stored. The information about the compression or encryption scheme may be used to decompress or decrypt the machine data, and any metadata with which it is stored, at search time.

In the illustrated embodiment of FIG. 3B the data store 310 includes a directory 312 (individually referred to as 312A, 312B) for each index (or partition) that contains a portion of data stored in the data store 310 and a sub-directory 314 (individually referred to as 314A, 314B, 314C) for one or more buckets of the index. In the illustrated embodiment of FIG. 3B, each sub-directory 314 corresponds to a bucket and includes an event data file 316 (individually referred to as 316A, 316B, 316C) and an inverted index 318 (individually referred to as 318A, 318B, 318C). However, it will be understood that each bucket may be associated with fewer or more files and each sub-directory 314 may store fewer or more files.

In the illustrated embodiment, the data store 310 includes a _main directory 312A associated with an index "_main" and a _test directory 312B associated with an index "test." However, the data store 310 may include fewer or more directories. In some embodiments, multiple indexes may share a single directory or all indexes may share a common directory. Additionally, although illustrated as a single data store 310, it will be understood that the data store 310 may be implemented as multiple data stores storing different portions of the information shown in FIG. 3C. For example, a single index may span multiple directories or multiple data stores.

Furthermore, although not illustrated in FIG. 3B, it will be understood that, in some embodiments, the data store 310 may include directories for each tenant and sub-directories for each index of each tenant, or vice versa. Accordingly, the directories 312A and 312B may, in certain embodiments, correspond to sub-directories of a tenant or include sub-directories for different tenants.

In the illustrated embodiment of FIG. 3B, two sub-directories 314A, 314B of the main directory 312A and one sub-directory 312C of the _test directory 312B are shown. The sub-directories 314A, 314B, 314C may correspond to buckets of the indexes associated with the directories 312A, 312B. For example, the sub-directories 314A and 314B may correspond to buckets "B1" and "B2," respectively, of the index "main" and the sub-directory 314C may correspond to bucket "B1" of the index "_test." Accordingly, even though there are two "B1" buckets shown, as each "B1" bucket is associated with a different index (and corresponding directory 312), the system 102 may uniquely identify them.

Although illustrated as buckets "B1" and "B2," it will be understood that the buckets (and/or corresponding sub-directories 314) may be named in a variety of ways. In certain embodiments, the bucket (or sub-directory) names may include information about the bucket. For example, the bucket name may include the name of the index with which the bucket is associated, a time range of the bucket, etc.

As described herein, each bucket may have one or more files associated with it, including, but not limited to one or more raw machine data files, bucket summary files, filter files, inverted indexes (also referred to herein as high performance indexes or keyword indexes), permissions files, configuration files, etc. In the illustrated embodiment of FIG. 3B, the files associated with a particular bucket may be stored in the sub-directory corresponding to the particular bucket. Accordingly, the files stored in the sub-directory 314A may correspond to or be associated with bucket "B1," of index "_main," the files stored in the sub-directory 314B may correspond to or be associated with bucket "B2" of index "main," and the files stored in the sub-directory 314C may correspond to or be associated with bucket "B1" of index "test."

FIG. 3B further illustrates an expanded event data file 316C showing an example of data that may be stored therein. In the illustrated embodiment, four events 320, 322, 324, 326 of the machine data file 316C are shown in four rows. Each event 320-326 includes machine data 330 and a timestamp 332. The machine data 330 may correspond to the machine data received by the system 102. For example, in the illustrated embodiment, the machine data 330 of events 320, 322, 324, 326 corresponds to portions 302A, 302B, 302C, 302D, respectively, of the machine data 302 after it was processed by the indexing system 112.

Metadata 334-338 associated with the events 320-326 is also shown in the table 319. In the illustrated embodiment, the metadata 334-338 includes information about a host 334, source 336, and sourcetype 338 associated with the events 320-326. Any of the metadata may be extracted from the corresponding machine data, or supplied or defined by an entity, such as a user or computer system. The metadata fields 334-338 may become part of, stored with, or otherwise associated with the events 320-326. In certain embodiments, the metadata 334-338 may be stored in a separate file of the sub-directory 314C and associated with the machine data file 316C. In some cases, while the timestamp 332 may be extracted from the raw data of each event, the values for the other metadata fields may be determined by the indexing system 112 based on information it receives pertaining to the host device 104 or data source of the data separate from the machine data.

While certain default or user-defined metadata fields may be extracted from the machine data for indexing purposes, the machine data within an event may be maintained in its original condition. As such, in embodiments in which the portion of machine data included in an event is unprocessed or otherwise unaltered, it is referred to herein as a portion of raw machine data. For example, in the illustrated embodiment, the machine data of events 320-326 is identical to the portions of the machine data 302A-302D, respectively, used to generate a particular event. Similarly, the entirety of the machine data 302 may be found across multiple events. As such, unless certain information needs to be removed for some reasons (e.g., extraneous information, confidential information), all the raw machine data contained in an event may be preserved and saved in its original form. Accordingly, the data store in which the event records are stored is sometimes referred to as a "raw record data store." The raw record data store contains a record of the raw event data tagged with the various fields.

In other embodiments, the portion of machine data in an event may be processed or otherwise altered relative to the machine data used to create the event. With reference to the machine data 304, the machine data of a corresponding event (or events) may be modified such that only a portion of the machine data 304 is stored as one or more events. For example, in some cases, only machine data 304B of the machine data 304 may be retained as one or more events or the machine data 304 may be altered to remove duplicate data, confidential information, etc.

In FIG. 3B, the first three rows of the table 319 present events 320, 322, and 324 and are related to a server access log that records requests from multiple clients processed by a server, as indicated by entry of "access.log" in the source column 336. In the example shown in FIG. 3B, each of the events 320-324 is associated with a discrete request made to the server by a client. The raw machine data generated by the server and extracted from a server access log may include the IP address 1140 of the client, the user id 1141 of the person requesting the document, the time 1142 the server finished processing the request, the request line 1143 from the client, the status code 1144 returned by the server to the client, the size of the object 1145 returned to the client (in this case, the gif file requested by the client) and the time spent 1146 to serve the request in microseconds. In the illustrated embodiments of FIGS. 3A, 3B, all the raw machine data retrieved from the server access log is retained and stored as part of the corresponding events 320-324 in the file 316C.

Event 326 is associated with an entry in a server error log, as indicated by "error.log" in the source column 336 that records errors that the server encountered when processing a client request. Similar to the events related to the server access log, all the raw machine data in the error log file pertaining to event 326 may be preserved and stored as part of the event 326.

Saving minimally processed or unprocessed machine data in a data store associated with metadata fields in the manner similar to that shown in FIG. 3B is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user may continue to refine the late-binding schema by defining new extraction rules, or modifying or deleting existing extraction rules used by the system.

FIG. 3C illustrates an embodiment of another file that may be included in one or more subdirectories 314 or buckets. Specifically, FIG. 3C illustrates an exploded view of an embodiments of an inverted index 318B in the sub-directory 314B, associated with bucket "B2" of the index "main," as well as an event reference array 340 associated with the inverted index 318B.

In some embodiments, the inverted indexes 318 may correspond to distinct time-series buckets. As such, each inverted index 318 may correspond to a particular range of time for an index. In the illustrated embodiment of FIG. 3C, the inverted indexes 318A, 318B correspond to the buckets "B1" and "B2," respectively, of the index "_main," and the inverted index 318C corresponds to the bucket "B1" of the index "_test." In some embodiments, an inverted index 318 may correspond to multiple time-series buckets (e.g., include information related to multiple buckets) or inverted indexes 318 may correspond to a single time-series bucket.

Each inverted index 318 may include one or more entries, such as keyword (or token) entries 342 or field-value pair entries 344. Furthermore, in certain embodiments, the inverted indexes 318 may include additional information, such as a time range 346 associated with the inverted index or an index identifier 348 identifying the index associated with the inverted index 318. It will be understood that each inverted index 318 may include less or more information than depicted. For example, in some cases, the inverted indexes 318 may omit a time range 346 and/or index identifier 348. In some such embodiments, the index associated with the inverted index 318 may be determined based on the location (e.g., directory 312) of the inverted index 318 and/or the time range of the inverted index 318 may be determined based on the name of the sub-directory 314.

Token entries, such as token entries 342 illustrated in inverted index 318B, may include a token 342A (e.g., "error," "itemID," etc.) and event references 342B indicative of events that include the token. For example, for the token "error," the corresponding token entry includes the token "error" and an event reference, or unique identifier, for each event stored in the corresponding time-series bucket that includes the token "error." In the illustrated embodiment of FIG. 3C, the error token entry includes the identifiers 3, 5, 6, 8, 11, and 12 corresponding to events located in the bucket "B2" of the index "_main."

In some cases, some token entries may be default entries, automatically determined entries, or user specified entries. In some embodiments, the indexing system 112 may identify each word or string in an event as a distinct token and generate a token entry for the identified word or string. In some cases, the indexing system 112 may identify the beginning and ending of tokens based on punctuation, spaces, etc. In certain cases, the indexing system 112 may rely on user input or a configuration file to identify tokens for token entries 342, etc. It will be understood that any combination of token entries may be included as a default, automatically determined, or included based on user-specified criteria.

Similarly, field-value pair entries, such as field-value pair entries 344 shown in inverted index 318B, may include a field-value pair 344A and event references 344B indicative of events that include a field value that corresponds to the field-value pair (or the field-value pair). For example, for a field-value pair sourcetype::sendmail, a field-value pair entry 344 may include the field-value pair "sourcetype::sendmail" and a unique identifier, or event reference, for each event stored in the corresponding time-series bucket that includes a sourcetype "sendmail."

In some cases, the field-value pair entries 344 may be default entries, automatically determined entries, or user specified entries. As a non-limiting example, the field-value pair entries for the fields "host," "source," and "sourcetype" may be included in the inverted indexes 318 as a default. As such, all of the inverted indexes 318 may include field-value pair entries for the fields "host," "source," and "sourcetype." As yet another non-limiting example, the field-value pair entries for the field "IP_address" may be user specified and may only appear in the inverted index 318B or the inverted indexes 318A, 318B of the index "_main" based on user-specified criteria. As another non-limiting example, as the indexing system 112 indexes the events, it may automatically identify field-value pairs and create field-value pair entries 344. For example, based on the indexing system's 212 review of events, it may identify IP_address as a field in each event and add the IP address field-value pair entries to the inverted index 318B (e.g., based on punctuation, like two keywords separated by an '=' or ':' etc.). It will be understood that any combination of field-value pair entries may be included as a default, automatically determined, or included based on user-specified criteria.

With reference to the event reference array 340, each unique identifier 350, or event reference, may correspond to a unique event located in the time series bucket or machine data file 316B. The same event reference may be located in multiple entries of an inverted index 318. For example, if an event has a sourcetype "splunkd," host "www1" and token "warning," then the unique identifier for the event may appear in the field-value pair entries 344 "sourcetype::splunkd" and "host::www1," as well as the token entry "warning." With reference to the illustrated embodiment of FIG. 3C and the event that corresponds to the event reference 3, the event reference 3 is found in the field-value pair entries 344 "host::hostA," "source::sourceB," "sourcetype::sourcetypeA," and "IP_address::91.205.189.15" indicating that the event corresponding to the event references is from hostA, sourceB, of sourcetypeA, and includes "91.205.189.15" in the event data.

For some fields, the unique identifier is located in only one field-value pair entry for a particular field. For example, the inverted index 318 may include four sourcetype field-value pair entries 344 corresponding to four different source-types of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 3C, since the event reference 7 appears in the field-value pair entry "sourcetype::sourcetypeA," then it does not appear in the other field-value pair entries for the sourcetype field, including "sourcetype::sourcetypeB," "sourcetype::sourcetypeC," and "sourcetype::sourcetypeD."

The event references 350 may be used to locate the events in the corresponding bucket or machine data file 316. For example, the inverted index 318B may include, or be associated with, an event reference array 340. The event reference array 340 may include an array entry 350 for each event reference in the inverted index 318B. Each array entry 350 may include location information 352 of the event corresponding to the unique identifier (non-limiting example: seek address of the event, physical address, slice ID, etc.), a timestamp 354 associated with the event, or additional information regarding the event associated with the event reference, etc.

For each token entry 342 or field-value pair entry 344, the event reference 342B, 344B, respectively, or unique identifiers may be listed in chronological order or the value of the event reference may be assigned based on chronological data, such as a timestamp associated with the event referenced by the event reference. For example, the event reference 1 in the illustrated embodiment of FIG. 3C may correspond to the first-in-time event for the bucket, and the event reference 12 may correspond to the last-in-time event for the bucket. However, the event references may be listed in any order, such as reverse chronological order, ascending order, descending order, or some other order (e.g., based on time received or added to the machine data file), etc. Further, the entries may be sorted. For example, the entries may be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 3C, the entries are sorted first by entry type and then alphabetically.

In some cases, inverted indexes 318 may decrease the search time of a query. For example, for a statistical query, by using the inverted index, the system 102 may avoid the computational overhead of parsing individual events in a machine data file 316. Instead, the system 102 may use the inverted index 318 separate from the raw record data store to generate responses to the received queries.

3.0. Query Processing and Execution

FIG. 4A is a flow diagram illustrating an embodiment of a routine implemented by the query system 114 for executing a query. At block 402, the query system 114 receives a search query. As described herein, the query may be in the form of a pipelined command language or other query language and include filter criteria used to identify a set of data and processing criteria used to process the set of data.

At block 404, the query system 114 processes the query. As part of processing the query, the query system 114 may determine whether the query was submitted by an authenticated user and/or review the query to determine that it is in a proper format for the data intake and query system 102, has correct semantics and syntax, etc. In addition, the query system 114 may determine what, if any, configuration files or other configurations to use as part of the query.

In addition, as part of processing the query, the query system 114 may determine what portion(s) of the query to execute in a distributed manner (e.g., what to delegate to search nodes) and what portions of the query to execute in a non-distributed manner (e.g., what to execute on the search head). For the parts of the query that are to be executed in a distributed manner, the query system 114 may generate specific commands, for the components that are to execute the query. This may include generating subqueries, partial queries or different phases of the query for execution by different components of the query system 114. In some cases, the query system 114 may use map-reduce techniques to determine how to map the data for the search and then reduce the data. Based on the map-reduce phases, the query system 114 may generate query commands for different components of the query system 114.

As part of processing the query, the query system 114 may determine where to obtain the data. For example, in some cases, the data may reside on one or more indexing nodes or search nodes, as part of the storage system 116 or may reside in a shared storage system or a system external to the system 102. In some cases, the query system 114 may determine what components to use to obtain and process the data. For example, the query system 114 may identify search nodes that are available for the query, etc.

At block 406, the query system 114 distributes the determined portions or phases of the query to the appropriate components (e.g., search nodes). In some cases, the query system 114 may use a catalog to determine which components to use to execute the query (e.g., which components include relevant data and/or are available, etc.).

At block 408, the components assigned to execute the query, execute the query. As mentioned, different components may execute different portions of the query. In some cases, multiple components (e.g., multiple search nodes) may execute respective portions of the query concurrently and communicate results of their portion of the query to another component (e.g., search head). As part of the identifying the set of data or applying the filter criteria, the components of the query system 114 may search for events that match the criteria specified in the query. These criteria may include matching keywords or specific values for certain fields. The searching operations at block 408 may use the late-binding schema to extract values for specified fields from events at the time the query is processed. In some embodiments, one or more rules for extracting field values may be specified as part of a sourcetype definition in a configuration file or in the query itself. In certain embodiments where search nodes are used to obtain the set of data, the search nodes may send the relevant events back to the search head, or use the events to determine a partial result, and send the partial result back to the search head.

At block 410, the query system 114 combines the partial results and/or events to produce a final result for the query. As mentioned, in some cases, combining the partial results and/or finalizing the results may include further processing the data according to the query. Such processing may entail joining different set of data, transforming the data, and/or performing one or more mathematical operations on the data, preparing the results for display, etc.

In some examples, the results of the query are indicative of performance or security of the IT environment and may help improve the performance of components in the IT environment. This final result may comprise different types of data depending on what the query requested. For example, the results may include a listing of matching events returned by the query, or some type of visualization of the data from the returned events. In another example, the final result may include one or more calculated values derived from the matching events.

The results generated by the query system 114 may be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring to the search jobs.

The query system 114 may also perform various operations to make the search more efficient. For example, before the query system 114 begins execution of a query, it may determine a time range for the query and a set of common keywords that all matching events include. The query system 114 may then use these parameters to obtain a superset of the eventual results. Then, during a filtering stage, the query system 114 may perform field-extraction operations on the superset to produce a reduced set of search results. This speeds up queries, which may be particularly helpful for queries that are performed on a periodic basis. In some cases, to make the search more efficient, the query system 114 may use information known about certain data sets that are part of the query to filter other data sets. For example, if an early part of the query includes instructions to obtain data with a particular field, but later commands of the query do not rely on the data with that particular field, the query system 114 may omit the superfluous part of the query from execution.

Various embodiments of the present disclosure may be implemented using, or in conjunction with, a pipelined command language. A pipelined command language is a language in which a set of inputs or data is operated on by a first command in a sequence of commands, and then subsequent commands in the order they are arranged in the sequence. Such commands may include any type of functionality for operating on data, such as retrieving, searching, filtering, aggregating, processing, transmitting, and the like. As described herein, a query may thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, may be formulated such that the order in which the commands are arranged defines the order in which the commands are applied to a set of data or the results of an earlier executed command. For example, a first command in a command sequence may include filter criteria used to search or filter for specific data. The results of the first command may then be passed to another command listed later in the command sequence for further processing.

In various embodiments, a query may be formulated as a command sequence defined in a command line of a search UI. In some embodiments, a query may be formulated as a sequence of SPL commands. Some or all of the SPL commands in the sequence of SPL commands may be separated from one another by a pipe symbol "|." In such embodiments, a set of data, such as a set of events, may be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein may be implemented with Splunk Processing Language (SPL) used in conjunction with the SPLUNK® ENTERPRISE system.

While a query may be formulated in many ways, a query may start with a search command and one or more corresponding search terms or filter criteria at the beginning of the pipeline. Such search terms or filter criteria may include any combination of keywords, phrases, times, dates, Boolean expressions, fieldname-field value pairs, etc. that specify which results should be obtained from different locations. The results may then be passed as inputs into subsequent commands in a sequence of commands by using, for example, a pipe character. The subsequent commands in a sequence may include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary may include a graph, chart, metric, or other visualization of the data. An aggregation function may include analysis or calculations to return an aggregate value, such as an average value, a sum, a maximum value, a root mean square, statistical values, and the like.

Due to its flexible nature, use of a pipelined command language in various embodiments is advantageous because it may perform "filtering" as well as "processing" functions. In other words, a single query may include a search command and search term expressions, as well as data-analysis expressions. For example, a command at the beginning of a query may perform a "filtering" step by retrieving a set of data based on a condition (e.g., records associated with server response times of less than 1 microsecond). The results of the filtering step may then be passed to a subsequent command in the pipeline that performs a "processing" step (e.g., calculation of an aggregate value related to the filtered events such as the average response time of servers with response times of less than 1 microsecond). Furthermore, the search command may allow events to be filtered by keyword as well as field criteria. For example, a search command may filter events based on the word "warning" or filter events based on a field value "10.0.1.2" associated with a field "clientip."

The results obtained or generated in response to a command in a query may be considered a set of results data. The set of results data may be passed from one command to another in any data format. In one embodiment, the set of result data may be in the form of a dynamically created table. Each command in a particular query may redefine the shape of the table. In some implementations, an event retrieved from an index in response to a query may be considered a row with a column for each field value. Columns may contain basic information about the data and/or data that has been dynamically extracted at search time.

Figure 4B:
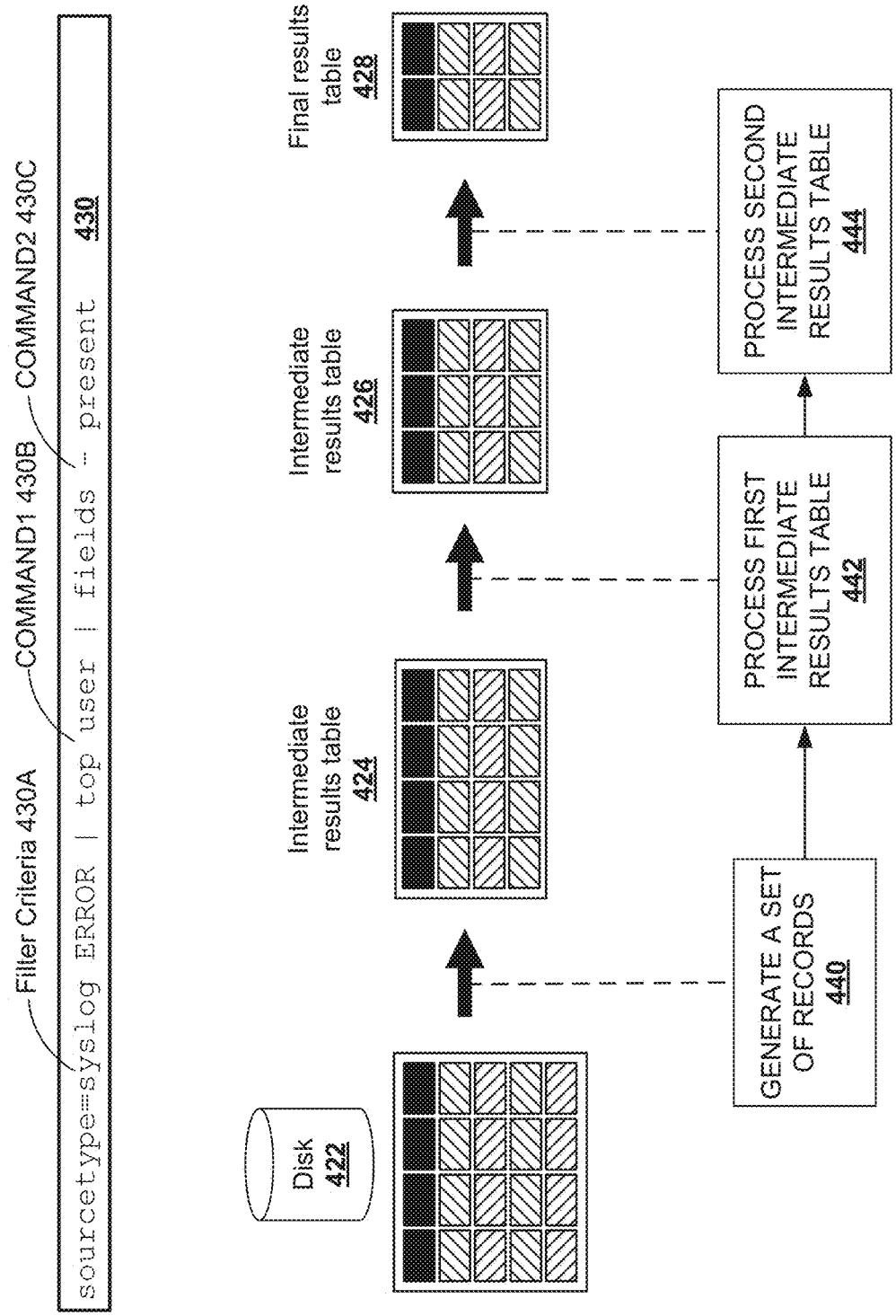
FIG. 4B provides a visual representation of the manner in which a pipelined command language or query may operate.

FIG. 4B provides a visual representation of the manner in which a pipelined command language or query may operate in accordance with the disclosed embodiments. The query 430 may be input by the user and submitted to the query system 114. In the illustrated embodiment, the query 430 comprises filter criteria 430A, followed by two commands 430B, 430C (namely, Command1 and Command2). Disk 422 represents data as it is stored in a data store to be searched. For example, disk 422 may represent a portion of the storage system 116 or some other data store that may be searched by the query system 114. Individual rows of may represent different events and columns may represent different fields for the different events. In some cases, these fields may include raw machine data, host, source, and sourcetype.

At block 440, the query system 114 uses the filter criteria 430A (e.g., "sourcetype=syslog ERROR") to filter events stored on the disk 422 to generate an intermediate results table 424. Given the semantics of the query 430 and order of the commands, the query system 114 may execute the filter criteria 430A portion of the query 430 before executing Command1 or Command2.

Rows in the table 424 may represent individual records, where each record corresponds to an event in the disk 422 that satisfied the filter criteria. Columns in the table 424 may correspond to different fields of an event or record, such as "user," "count," percentage," "timestamp," or the raw machine data of an event, etc. Notably, the fields in the intermediate results table 424 may differ from the fields of the events on the disk 422. In some cases, this may be due to the late binding schema described herein that may be used to extract field values at search time. Thus, some of the fields in table 424 may not have existed in the events on disk 422.

Illustratively, the intermediate results table 424 has fewer rows than what is shown in the disk 422 because only a subset of events retrieved from the disk 422 matched the filter criteria 430A "sourcetype=syslog ERROR." In some embodiments, instead of searching individual events or raw machine data, the set of events in the intermediate results table 424 may be generated by a call to a pre-existing inverted index.

At block 442, the query system 114 processes the events of the first intermediate results table 424 to generate the second intermediate results table 426. With reference to the query 430, the query system 114 processes the events of the first intermediate results table 424 to identify the top users according to Command1. This processing may include determining a field value for the field "user" for each record in the intermediate results table 424, counting the number of unique instances of each "user" field value (e.g., number of users with the name David, John, Julie, etc.) within the intermediate results table 424, ordering the results from largest to smallest based on the count, and then keeping only the top 10 results (e.g., keep an identification of the top 10 most common users). Accordingly, each row of table 426 may represent a record that includes a unique field value for the field "user," and each column may represent a field for that record, such as fields "user," "count," and "percentage."

At block 444, the query system 114 processes the second intermediate results table 426 to generate the final results table 428. With reference to query 430, the query system 114 applies the command "fields-present" to the second intermediate results table 426 to generate the final results table 428. As shown, the command "fields-present" of the query 430 results in one less column, which may represent that a field was removed during processing. For example, the query system 114 may have determined that the field "percentage" was unnecessary for displaying the results based on the Command2. In such a scenario, each record of the final results table 428 would include a field "user," and "count." Further, the records in the table 428 would be ordered from largest count to smallest count based on the query commands.

It will be understood that the final results table 428 may be a third intermediate results table, which may be pipelined to another stage where further filtering or processing of the data may be performed, e.g., preparing the data for display purposes, filtering the data based on a condition, performing a mathematical calculation with the data, etc. In different embodiments, other query languages, such as the Structured Query Language ("SQL"), may be used to create a query.

As described herein, extraction rules may be used to extract field-value pairs or field values from data. An extraction rule may comprise one or more regex rules that specify how to extract values for the field corresponding to the extraction rule. In addition to specifying how to extract field values, the extraction rules may also include instructions for deriving a field value by performing a function on a character string or value retrieved by the extraction rule. For example, an extraction rule may truncate a character string or convert the character string into a different data format. Extraction rules may be used to extract one or more values for a field from events by parsing the portions of machine data in the events and examining the data for one or more patterns of characters, numbers, delimiters, etc., that indicate where the field begins and, optionally, ends. In certain embodiments, extraction rules may be stored in one or more configuration files. In some cases, a query itself may specify one or more extraction rules.

In some cases, extraction rules may be applied at data ingest by the intake system 110 and/or indexing system 112. For example, the intake system 110 and indexing system 112 may apply extraction rules to ingested data and/or events generated from the ingested data and store results in an inverted index.

The system 102 advantageously allows for search time field extraction. In other words, fields may be extracted from the event data at search time using late-binding schema as opposed to at data ingestion time, which was a major limitation of the prior art systems. Accordingly, extraction rules may be applied at search time by the query system 114. The query system may apply extraction rules to events retrieved from the storage system 116 or data received from sources external to the system 102. Extraction rules may be applied to all the events in the storage system 116 or to a subset of the events that have been filtered based on some filter criteria (e.g., event timestamp values, etc.).

Figure 4C:
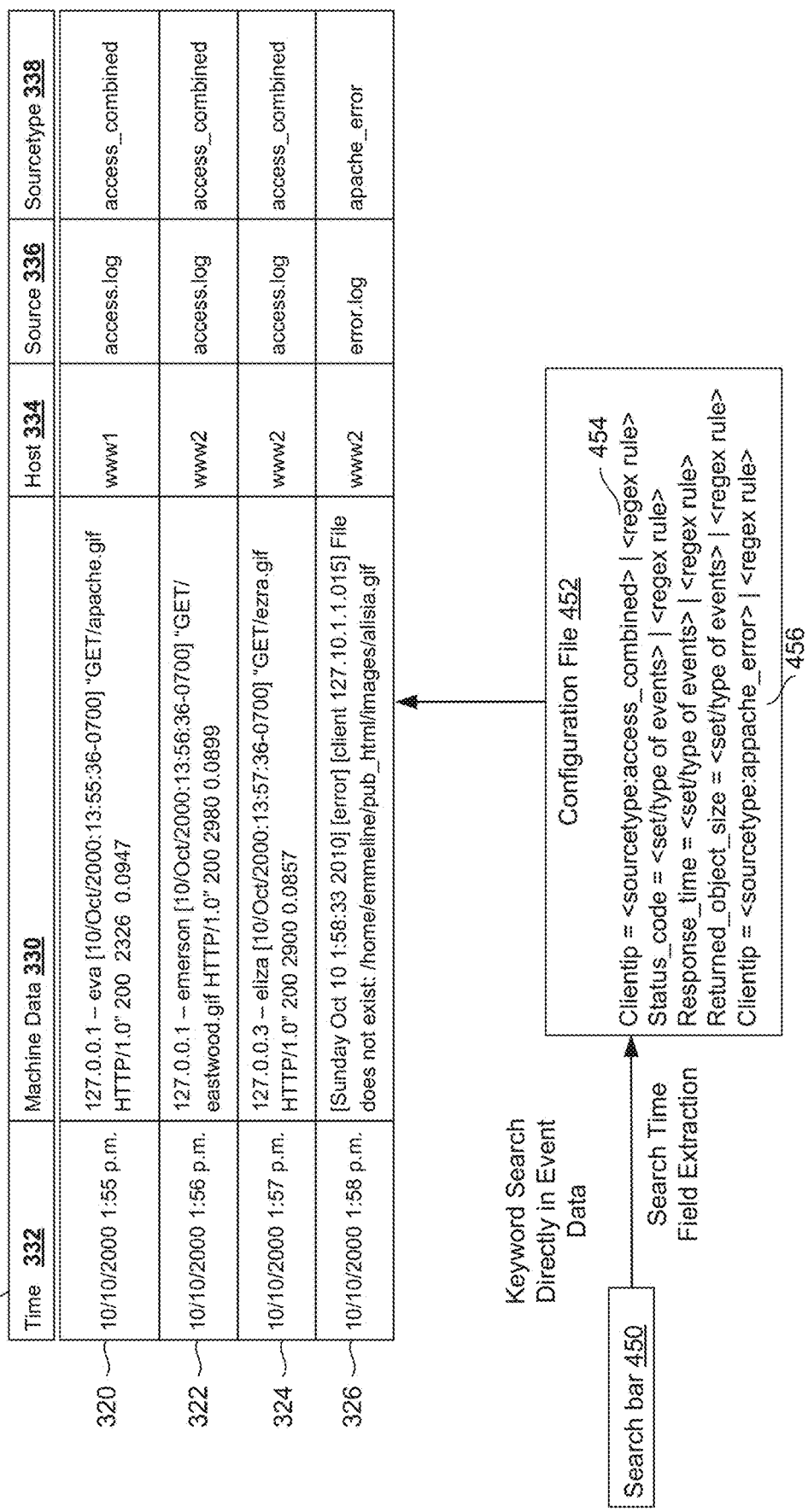
FIG. 4C is a block diagram illustrating an embodiment of a configuration file that includes various extraction rules that may be applied to events.

FIG. 4C is a block diagram illustrating an embodiment of the table 319 showing events 320-326, described previously with reference to FIG. 3B. As described herein, the table 319 is for illustrative purposes, and the events 320-326 may be stored in a variety of formats in an event data file 316 or raw record data store. Further, it will be understood that the event data file 316 or raw record data store may store millions of events. FIG. 4C also illustrates an embodiment of a search bar 450 for entering a query and a configuration file 452 that includes various extraction rules that may be applied to the events 320-326.

As a non-limiting example, if a user inputs a query into search bar 450 that includes only keywords (also known as "tokens"), e.g., the keyword "error" or "warning," the query system 114 may search for those keywords directly in the events 320-326 stored in the raw record data store.

As described herein, the indexing system 112 may optionally generate and use an inverted index with keyword entries to facilitate fast keyword searching for event data. If a user searches for a keyword that is not included in the inverted index, the query system 114 may nevertheless be able to retrieve the events by searching the event data for the keyword in the event data file 316 or raw record data store directly. For example, if a user searches for the keyword "eva," and the name "eva" has not been indexed at search time, the query system 114 may search the events 320-326 directly and return the first event 320. In the case where the keyword has been indexed, the inverted index may include a reference pointer that will allow for a more efficient retrieval of the event data from the data store. If the keyword has not been indexed, the query system 114 may search through the events in the event data file to service the search.

In many cases, a query include fields. The term "field" refers to a location in the event data containing one or more values for a specific data item. Often, a field is a value with a fixed, delimited position on a line, or a name and value pair, where there is a single value to each field name. A field may also be multivalued, that is, it may appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the query, "status=404." This search query finds events with "status" fields that have a value of "404." When the search is run, the query system 114 does not look for events with any other "status" value. It also does not look for events containing other fields that share "404" as a value. As a result, the search returns a set of results that are more focused than if "404" had been used in the search string as part of a keyword search. Note also that fields may appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "Nov 15 09:33:22 evaemerson."

FIG. 4C illustrates the manner in which configuration files may be used to configure custom fields at search time in accordance with the disclosed embodiments. In response to receiving a query, the query system 114 determines if the query references a "field." For example, a query may request a list of events where the "clientip" field equals "127.0.0.1." If the query itself does not specify an extraction rule and if the field is not an indexed metadata field, e.g., time, host, source, sourcetype, etc., then in order to determine an extraction rule, the query system 114 may, in one or more embodiments, locate configuration file 452 during the execution of the query.

Configuration file 452 may contain extraction rules for various fields, e.g., the "clientip" field. The extraction rules may be inserted into the configuration file 452 in a variety of ways. In some embodiments, the extraction rules may comprise regular expression rules that are manually entered in by the user.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system may then generate a regular expression that extracts those fields from similar events and store the regular expression as an extraction rule for the associated field in the configuration file 452.

In some embodiments, the indexing system 112 may automatically discover certain custom fields at index time and the regular expressions for those fields will be automatically generated at index time and stored as part of extraction rules in configuration file 452. For example, fields that appear in the event data as "key=value" pairs may be automatically extracted as part of an automatic field discovery process. Note that there may be several other ways of adding field definitions to configuration files in addition to the methods discussed herein.

Events from heterogeneous sources that are stored in the storage system 116 may contain the same fields in different locations due to discrepancies in the format of the data generated by the various sources. For example, event 326 also contains a "clientip" field, however, the "clientip" field is in a different format from events 320, 322, and 324. Furthermore, certain events may not contain a particular field at all. To address the discrepancies in the format and content of the different types of events, the configuration file 452 may specify the set of events to which an extraction rule applies. For example, extraction rule 454 specifies that it is to be used with events having a sourcetype "access_combined," and extraction rule 456 specifies that it is to be used with events having a sourcetype "apache_error." Other extraction rules shown in configuration file 452 specify a set or type of events to which they apply. In addition, the extraction rules shown in configuration file 452 include a regular expression for parsing the identified set of events to determine the corresponding field value. Accordingly, each extraction rule may pertain to only a particular type of event. Accordingly, if a particular field, e.g., "clientip" occurs in multiple types of events, each of those types of events may have its own corresponding extraction rule in the configuration file 452 and each of the extraction rules would comprise a different regular expression to parse out the associated field value. In some cases, the sets of events are grouped by sourcetype because events generated by a particular source may have the same format.

The field extraction rules stored in configuration file 452 may be used to perform search-time field extractions. For example, for a query that requests a list of events with sourcetype "access_combined" where the "clientip" field equals "127.0.0.1," the query system 114 may locate the configuration file 452 to retrieve extraction rule 454 that allows it to extract values associated with the "clientip" field from the events where the sourcetype is "access_combined" (e.g., events 320-324). After the "clientip" field has been extracted from the events 320, 322, 324, the query system 114 may then apply the field criteria by performing a compare operation to filter out events where the "clientip" field does not equal "127.0.0.1." In the example shown in FIG. 4C, the events 320 and 322 would be returned in response to the user query. In this manner, the query system 114 may service queries with filter criteria containing field criteria and/or keyword criteria.

It should also be noted that any events filtered by performing a search-time field extraction using a configuration file 452 may be further processed by directing the results of the filtering step to a processing step using a pipelined search language. Using the prior example, a user may pipeline the results of the compare step to an aggregate function by asking the query system 114 to count the number of events where the "clientip" field equals "127.0.0.1."

By providing the field definitions for the queried fields at search time, the configuration file 452 allows the event data file or raw record data store to be field searchable. In other words, the raw record data store may be searched using keywords as well as fields, wherein the fields are searchable name/value pairings that may distinguish one event from another event and may be defined in configuration file 452 using extraction rules. In comparison to a search containing field names, a keyword search may result in a search of the event data directly without the use of a configuration file.

Further, the ability to add schema to the configuration file 452 at search time results in increased efficiency and flexibility. A user may create new fields at search time and simply add field definitions to the configuration file 452. As a user learns more about the data in the events, the user may continue to refine the late-binding schema by adding new fields, deleting fields, or modifying the field extraction rules in the configuration file for use the next time the schema is used by the system 102. Because the system 102 maintains the underlying raw data and uses late-binding schema for searching the raw data, it enables a user to continue investigating and learn valuable insights about the raw data long after data ingestion time. Similarly, multiple field definitions may be added to the configuration file to capture the same field across events generated by different sources or sourcetypes. This allows the system 102 to search and correlate data across heterogeneous sources flexibly and efficiently.

The system 102 may use one or more data models to search and/or better understand data. A data model is a hierarchically structured search-time mapping of semantic knowledge about one or more datasets. It encodes the domain knowledge used to build a variety of specialized searches of those datasets. Those searches, in turn, may be used to generate reports.

The above-described system provides significant flexibility by enabling a user to analyze massive quantities of minimally processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

Performing extraction and analysis operations at search time may involve a large amount of data and require a large number of computational operations, which may cause delays in processing the queries. In some embodiments, the system 102 may employ a number of unique acceleration techniques to speed up analysis operations performed at search time. These techniques include: performing search operations in parallel using multiple components of the query system 114, using an inverted index 118, and accelerating the process of generating reports.

To facilitate faster query processing, a query may be structured such that multiple components of the query system 114 (e.g., search nodes) perform the query in parallel, while aggregation of search results from the multiple components is performed at a particular component (e.g., search head). For example, consider a scenario in which a user enters the query "Search "error"| stats count BY host." The query system 114 may identify two phases for the query, including: (1) subtasks (e.g., data retrieval or simple filtering) that may be performed in parallel by multiple components, such as search nodes, and (2) a search results aggregation operation to be executed by one component, such as the search head, when the results are ultimately collected from the search nodes.

Based on this determination, the query system 114 may generate commands to be executed in parallel by the search nodes, with each search node applying the generated commands to a subset of the data to be searched. In this example, the query system 114 generates and then distributes the following commands to the individual search nodes: "Search "error" | prestats count BY host." In this example, the "prestats" command may indicate that individual search nodes are processing a subset of the data and are responsible for producing partial results and sending them to the search head. After the search nodes return the results to the search head, the search head aggregates the received results to form a single search result set. By executing the query in this manner, the system effectively distributes the computational operations across the search nodes while reducing data transfers. It will be understood that the query system 114 may employ a variety of techniques to use distributed components to execute a query. In some embodiments, the query system 114 may use distributed components for only mapping functions of a query (e.g., gather data, applying filter criteria, etc.). In certain embodiments, the query system 114 may use distributed components for mapping and reducing functions (e.g., joining data, combining data, reducing data, etc.) of a query.

4.0. Example Use Cases

The system 102 provides various schemas, dashboards, and visualizations that simplify developers' tasks to create applications with additional capabilities, including but not limited to security, data center monitoring, IT service monitoring, and client/customer insights.

An embodiment of an enterprise security application is as SPLUNK® ENTERPRISE SECURITY, which performs monitoring and alerting operations and includes analytics to facilitate identifying both known and unknown security threats based on large volumes of data stored by the system 102. The enterprise security application provides the security practitioner with visibility into security-relevant threats found in the enterprise infrastructure by capturing, monitoring, and reporting on data from enterprise security devices, systems, and applications. Through the use of the system 102 searching and reporting capabilities, the enterprise security application provides a top-down and bottom-up view of an organization's security posture.

An embodiment of an IT monitoring application is SPLUNK® IT SERVICE INTELLIGENCE™, which performs monitoring and alerting operations. The IT monitoring application also includes analytics to help an analyst diagnose the root cause of performance problems based on large volumes of data stored by the system 102 as correlated to the various services an IT organization provides (a service-centric view). This differs significantly from conventional IT monitoring systems that lack the infrastructure to effectively store and analyze large volumes of service-related events. Traditional service monitoring systems typically use fixed schemas to extract data from pre-defined fields at data ingestion time, wherein the extracted data is typically stored in a relational database. This data extraction process and associated reduction in data content that occurs at data ingestion time inevitably hampers future investigations when all of the original data may be needed to determine the root cause of or contributing factors to a service issue.

In contrast, an IT monitoring application system stores large volumes of minimally processed service-related data at ingestion time for later retrieval and analysis at search time, to perform regular monitoring, or to investigate a service issue. To facilitate this data retrieval process, the IT monitoring application enables a user to define an IT operations infrastructure from the perspective of the services it provides. In this service-centric approach, a service such as corporate e-mail may be defined in terms of the entities employed to provide the service, such as host machines and network devices. Each entity is defined to include information for identifying all of the events that pertains to the entity, whether produced by the entity itself or by another machine, and considering the many various ways the entity may be identified in machine data (such as by a URL, an IP address, or machine name). The service and entity definitions may organize events around a service so that all of the events pertaining to that service may be easily identified. This capability provides a foundation for the implementation of Key Performance Indicators.

As described herein, the system 102 may receive heterogeneous data from disparate systems. In some cases, the data from the disparate systems may be related and correlating the data may result in insights into client or customer interactions with various systems of a vendor. To aid in the correlation of data across different systems, multiple field definitions may be added to one or more configuration files to capture the same field or data across events generated by different sources or sourcetypes. This may enable the system 102 to search and correlate data across heterogeneous sources flexibly and efficiently.

Figure 4D:
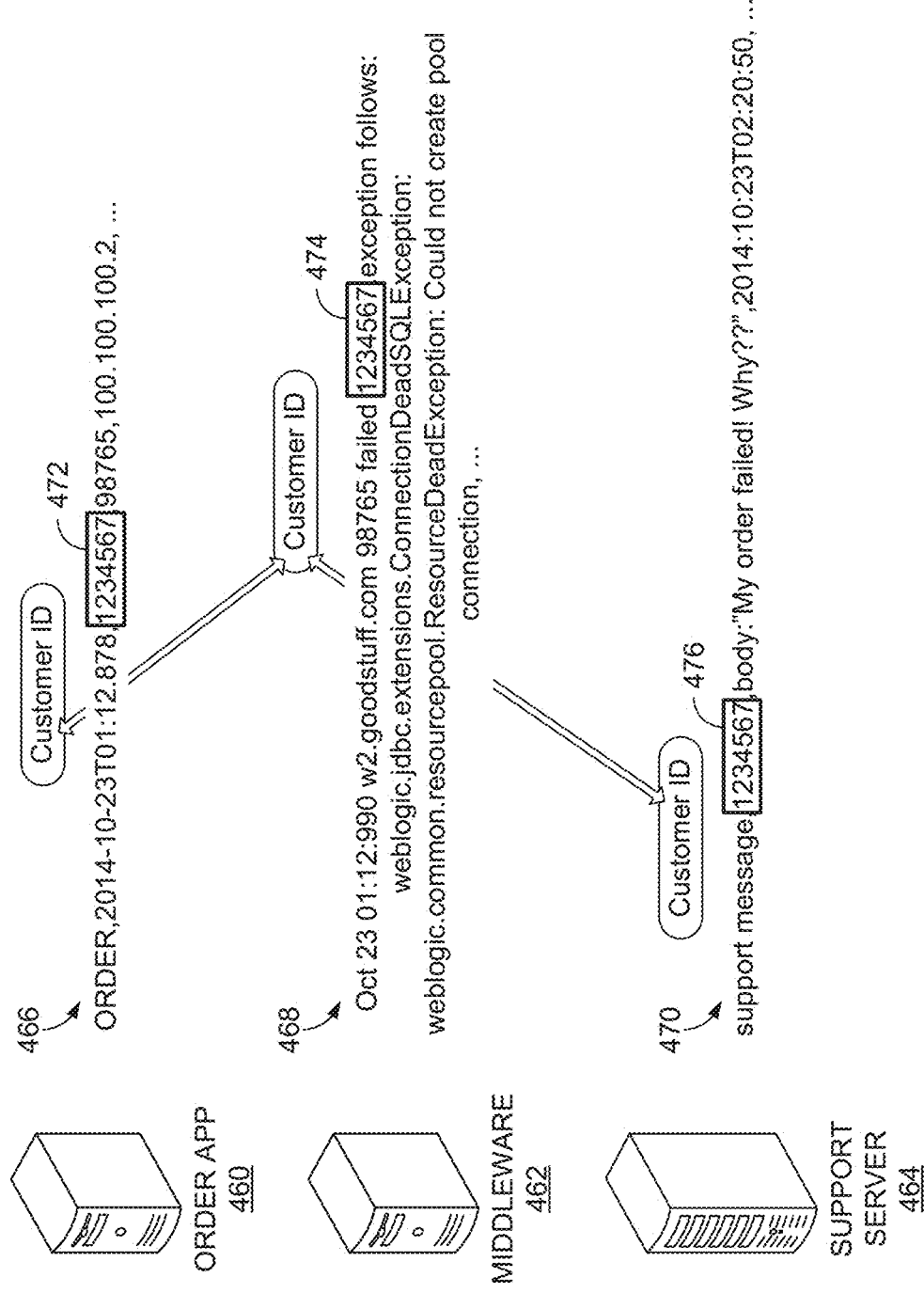
FIG. 4D is a block diagram illustrating an example scenario where a common customer identifier is found among log data received from disparate data sources.

As a non-limiting example and with reference to FIG. 4D, consider a scenario in which a common customer identifier is found among log data received from three disparate data sources. In this example, a user submits an order for merchandise using a vendor's shopping application program 460 running on the user's system. In this example, the order was not delivered to the vendor's server due to a resource exception at the destination server that is detected by the middleware code 462. The user then sends a message to the customer support server 464 to complain about the order failing to complete. The three systems 460, 462, 464 are disparate systems that do not have a common logging format. The shopping application program 460 sends log data 466 to the system 102 in one format, the middleware code 462 sends error log data 468 in a second format, and the support server 464 sends log data 470 in a third format.

Using the log data received at the system 102 from the three systems 460, 462, 464, the vendor may uniquely obtain an insight into user activity, user experience, and system behavior. The system 102 allows the vendor's administrator to search the log data from the three systems 460, 462, 464, thereby obtaining correlated information, such as the order number and corresponding customer ID number of the person placing the order. The system 102 also allows the administrator to see a visualization of related events via a user interface. The administrator may query the system 102 for customer ID field value matches across the log data from the three systems 460, 462, 464 that are stored in the storage system 116. While the customer ID field value exists in the data gathered from the three systems 460, 462, 464, it may be located in different areas of the data given differences in the architecture of the systems. The query system 114 obtains events from the storage system 116 related to the three systems 460, 462, 464. The query system 114 then applies extraction rules to the events in order to extract field values for the field "customer ID" that it may correlate. As described herein, the query system 114 may apply a different extraction rule to each set of events from each system when the event format differs among systems. In this example, a user interface may display to the administrator the events corresponding to the common customer ID field values 472, 474, and 476, thereby providing the administrator with insight into a customer's experience. The system 102 may provide additional user interfaces and reports to aid a user in analyzing the data associated with the customer.

5.0. User Interface Environment Overview

Given the amount of data ingested by a data intake and query system 108 (e.g., gigabytes of data, terabytes of data, etc.) and the myriad of ways in which the data may be identified, searched, and processed, it may be difficult for a user to know where to begin. In addition, some users of a data intake and query system 108 may be unfamiliar with the architecture of the data intake and query system 108 or the query language used to query the ingested data. These obstacles may make it difficult for a user to obtain meaningful insights from the data.

Queries displayed on a user interface, such as a graphical user interface (also referred to herein as a GUI) may span many lines of code and be complex and difficult to understand or parse. While the query may include comments or an outline, they are written by a user and static in that they do not dynamically change without user input. In addition, depending on how they are written, the outline or comments may not improve the understanding of the query commands themselves. Moreover, the comments or data processing package outline do not enable a user to modify the query indirectly (e.g., by modifying the outline).

The content of a user interface that displays a query may also be relatively static or unidirectional. For example, the user interface may provide a data processing package outline to help understand the structure of a query or display the results of the query but require direct editing of the query to make any changes to the query, data processing package outline, or search results. Alternatively, a user interface may allow a user to click on one or more display objects, and, based on the selection, run a predetermined back-end query that the user does not see and therefore may not understand or modify.

Given the amount and complexity of the data being ingested and the complexity of corresponding queries, such limitations may make it difficult to create a meaningful query that searches and transforms the data in a meaningful way. Moreover, given the amount of data to be searched and complexity of a query, one query may take several minutes, hours, or even days to complete. Thus, running additional queries or inefficient queries may create a bottleneck or burden on the underlying hardware resources.

To address these issues, a bi-directional user interface may be provided that enables a user to view and directly modify a query and/or modify the query via interaction with other portions of the GUI, such as a models panel or search results panel. In some cases, to implement the bi-directional GUI interface, multiple systems may communicate with each other to perform different tasks. In certain cases, these systems may be remotely located from each other and communicate by sending messages via a network. The messages may be HTTP messages or other internet protocol messages that enable the underlying computing devices to interpret and act on the message.

In some cases, the GUI may enable a user to view a data processing package that includes one or more data processing statements (non-limiting examples: import statements, function statements, search-related statements, export statements, etc.) and/or generate search-related statements for execution by a data intake and query system (also referred to herein as a search service). In certain cases, the GUI may enable a user to create, modify, or use interactive charts that result in the generation of one or more search-related statements and/or in the execution of one or more searches in a data intake and query system. In some cases, as a result of one or more interactions with the GUI, the system may generate a child search-related statement (e.g., using a parent search-related statement and/or one or more chart parameters), and append the generated search-related statement to a data processing package for execution by the data intake and query system. The GUI may also enable different time ranges to be applied to different statements of a data processing package.

Moreover, by generating/providing a bi-directional GUI interface, the system may enable a user to modify one or more search-related statements and/or a data processing package in a variety of ways, increasing productivity and improving the queries executed by the system.

Further, the system may generate one or more action models that correspond to one or more commands of a search-related statement, statement models that correspond to one or more search-related statements, and/or package models that correspond to a data processing package. The GUI may display the model summaries to improve the understandability of a search-related statement and/or data processing package.

The model summaries may be interactive to enable indirect editing of the search-related statements and/or data processing package. For example, an interaction with an action model display object may cause the system to determine modifications for a command or search-related statement and then implement those modifications without the user having to write code or understand the syntax of the underlying query language of the search-related statement.

The system may also automatically initiate execution of the search-related statement that is updated based on the user interactions with the action model display object and/or the data processing package to which the search-related statement belongs. This may result in the system generating improved and more efficient queries that require less time to parse or that use fewer resources. In addition, this may reduce the number of queries executed by the system, and therefore the amount of compute resources used.

Figure 5:
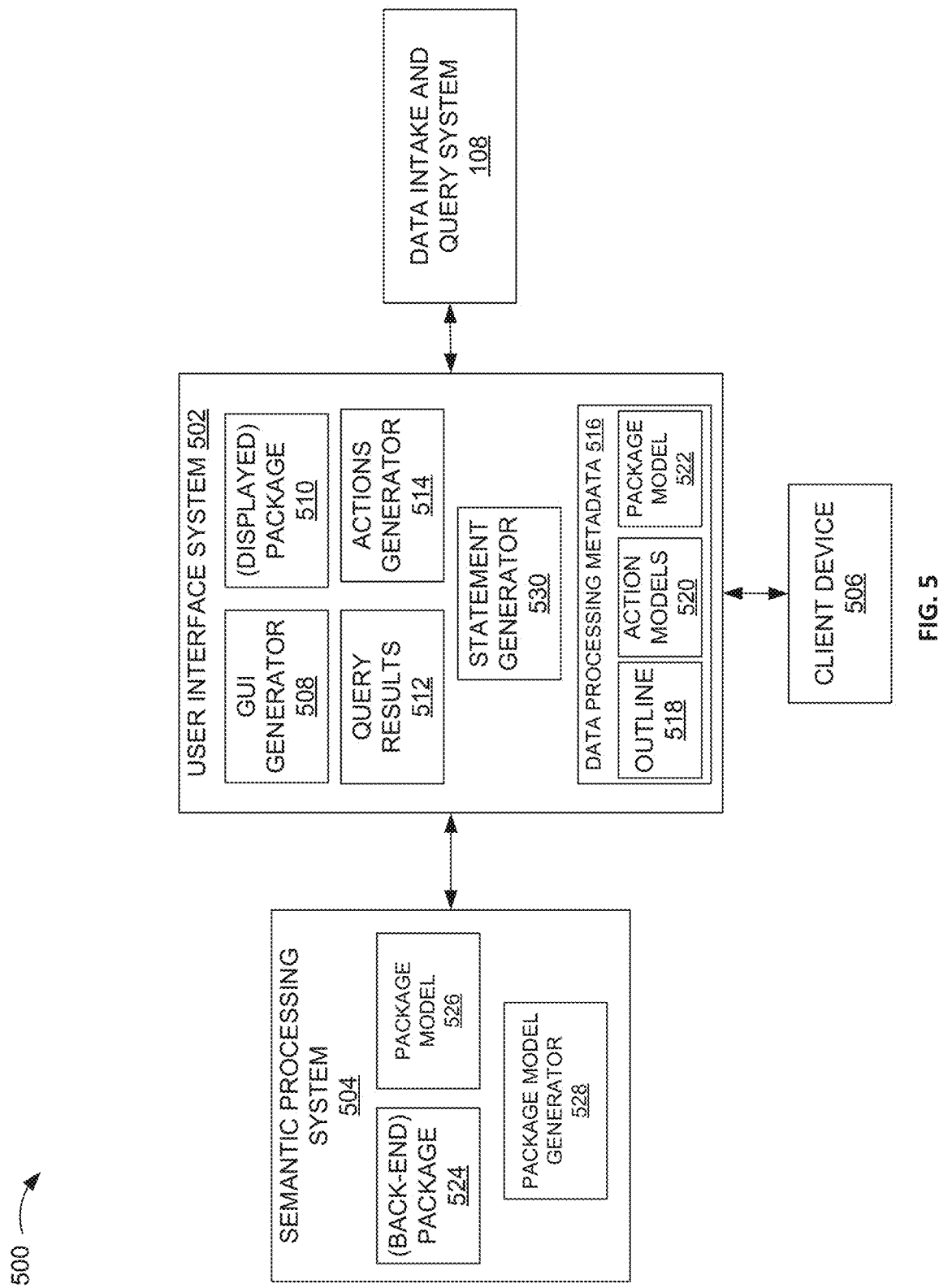
FIG. 5 is a block diagram of an embodiment of a user interface generation environment.

FIG. 5 is a block diagram of an embodiment of a user interface generation environment 500. In the illustrated embodiment, the environment 500 includes the data intake and query system 108 (also referred to herein as a search service), a user interface system 502, semantic processing system 504, and a client device 506. In some cases, the various systems may communicate with each other via one or more networks, such as a wide area network (e.g., the internet), local area network, etc. For example, the various systems may communicate using internet protocol (IP) messages, such as HTTP, that enable the underling computing devices to understand and act on the messages. In some cases, the systems may send hundreds, thousands, or millions of IP messages each minute, hour, or day, and the IP messages may cause the underlying computing devices to generate or modify data structures stored in non-transitory computer readable media, conduct distributed searches across multiple remotely located computing devices, modify graphical user interfaces displayed on a screen, etc.

In cases where one or more components are implemented on the same computing device, such as where the client device 506 and portions or all of the user interface system 502 or where the user interface system 502 and semantic processing system 504, the corresponding components may communicate via a message bus. Similar to the IP messages, the messages sent via a message bus may use a computer protocol that enables the underlying computing devices to understand and act on the messages.

The user interface system 502, semantic processing system 504, and/or client device 506, may be implemented, without limitation, using one or more smart phones, tablet computers, handheld computers, wearable devices, laptop computers, desktop computers, servers, portable media players, gaming devices, or other device that includes computer hardware (e.g., processors, non-transitory, computer-readable media, etc.) and so forth. In certain cases, the user interface system 502, semantic processing system 504, and/or client device 506 may include a hosted, virtualized, or containerized device, such as an isolated execution environment, that shares computing resources (e.g., processor, memory, etc.) of a particular machine with other isolated execution environments. The isolated execution environment may be configured to perform one or more functions of the user interface system 502, semantic processing system 504, and/or client device 506.

In the illustrated example, the user interface system 502 includes a GUI generator 508 that may generate user interface data for rendering as a graphical user interface (GUI) on the client device 506, an AMG 514, a statement generator 530, and one or more data stores, RAM, or cache (generically referred to herein as "memory"). The memory may store a data processing package 510 for display in the GUI (also referred to herein as the "display data processing package 510" or "displayed data processing package 510"), search results 512 received from the data intake and query system 108, and data processing metadata 516. It will be understood that the user interface system 502 may include fewer or more components as desired. For example, although not illustrated, the user interface system 502 may include a package editor that enables editing of the displayed data processing package 510 and/or a package model generator 528.

In some cases, some, or all of the components of the user interface system 502 may reside on the client device 506. For example, some or all of the user interface system 502 may be implemented as a client-side application, such as a web browser executing on one or more processors of the client device 506. In some such cases, the data processing package 510, search results 512, and data processing metadata 516 may be stored in the cache of the browser.

In certain cases, the user interface system 502 may be implemented in a distributed fashion with some functions being performed at one location and other portions being performed at one or more different locations. For example, part of the user interface system 502, such as the GUI generator 508, may be implemented as a client-side application (e.g., on the client device), and other parts, such as the AMG 514 and/or package editor, may be implemented as one or more server-side applications. In such cases, the different portions of the user interface system 502 may communicate via a network using one or more IP messages.

In some cases, the GUI generator 508, AMG 514, and/or the statement generator 530 may be implemented using software modules, threads, or computer-executable instructions executing on one or more processors or in one or more isolated execution environments of the user interface system 502 (or client device 506).

The statement generator 530 may be configured to generate one or more query commands and/or search-related statements based on one or more system query parameters and/or user query parameters received via the GUI. For example, as described herein, the user interface system 502 may generate one or GUIs or GUI windows associated with different query commands, such as an aggregation command. The GUI windows may include one or more interactive fields that enable a user to select or enter data field identifiers (corresponding to data fields), functions, keywords, or values, or other user query parameters or system query parameters. Using the input from the interactive fields and an understanding of the associated query command (e.g., what argument of a query command each interactive field corresponds to), the statement generator 530 may generate a statement, such as a search-related statement. For example, if the GUI window is associated with an aggregation command, and the GUI window includes interactive fields for the user to specify a data field from which to obtain data for a function, a function to perform on the data, a data field by which to group the data, and a data field by which to split the groups, the statement generator 530 may generate one or more query commands and an aggregation-related statement. Moreover, the user interface system 502 may include the generated aggregation-related statement in the GUI or as part of a displayed data processing package 510.

As another example, the statement generator may receive a first search-related statement and one or more additional parameters (e.g., parameters received in association with a chart). Using the query commands of the first-search related statement and the received parameters, the statement generator 530 may generate a (child) second search-related statement. In some cases, the statement generator 530 may generate one or more query commands using the received parameters (e.g., the parameters may include a function or other command token and data fields to use for the functions) and an understanding of query commands (e.g., what arguments (and their order) are used for what query commands, etc.), and append the generated query commands to the (parent) first search-related statement to provide a child search-related statement. In some cases, the user interface system 502 may communicate the child-related statement to the DATA INTAKE AND QUERY SYSTEM 108 to execute a search.

The data processing package model 522 may correspond to a data processing package model 526 generated by the semantic processing system 504. As described herein in greater detail, the semantic processing system 504 may use a version of the data processing package 510 to generate the data processing package model 526, and communicate the generated data processing package model 526 to the user interface system 502. The user interface system 502 may store the received data processing package model 526 as the data processing package model 522 and/or use the received data processing package model 526 (or data processing package model 522) to generate the data processing package outline 518 and/or the models 520.

The client device 506 may render the GUI for display and enable a user to interact with the GUI. As described herein, the GUI may include, in different areas of the GUI, a package editor panel to display the displayed data processing package 510, a models panel (also referred to herein as an actions panel) to display one or more of the models 520, a data processing package outline panel to display the data processing package outline 518, and a search results panel to display the search results 512 of the data processing package 510 (or search-related statements of the data processing package 510) being executed by the data intake and query system 108. In some cases, within the package editor panel, a package editor may be implemented to enable a user to edit the displayed data processing package 510.

As a user interacts with the various portions of the GUI (e.g., clicks on, hovers, selects, types, highlights, etc.), the user interface system 502 may communicate messages to the semantic processing system 504 and/or the data intake and query system 108. For example, if an interaction with the GUI indicates that a data processing package is to be executed, the user interface system 502 may communicate the data processing package (or one or more statements) to the data intake and query system 108 for execution and display the search results 512 in the GUI.

In some cases, as a user edits the displayed data processing package 510 (or search-related statements of the displayed data processing package 510) or interacts with the models 520, search results 512, or charts, the user interface system 502 may send package modification messages to the semantic processing system 504. The semantic processing system 504 may process the package modification messages and respond with display modification messages. Based on the display modification messages, the user interface system 502 may, for example, edit the displayed data processing package 510, edit the data processing package model 522, generate updated models 520 and/or an outline 518 and/or communicate the displayed data processing package 510 to the data intake and query system 108 (or one or more search-related statements of the displayed data processing package 510) for execution. As described herein, the package modification messages and the display modification messages may be implemented as IP messages or other computer protocol messages that enable the underlying computing devices to receive, understand, and perform computer functions based on the messages.

In the illustrated example of FIG. 5, the semantic processing system 504 includes a package model generator 528 and one or more data stores, RAM, or cache (generically referred to herein as "memory"). The memory may store a data processing package 524 (also referred to herein as the back-end data processing package 524) that is associated with the displayed data processing package 510 and a data processing package model 526. In certain cases, the semantic processing system 504 may be implemented in a distributed fashion with some functions being performed at one location and other portions being performed at one or more different locations.

In some cases, the displayed data processing package 510 and back-end data processing package 524 match or are identical. In certain cases, when the displayed data processing package 510 and back-end data processing package 524 do not match the semantic processing system 504 and the user interface system 502 communicate with each other to address any differences. As a non-limiting example, as described herein, edits or changes to the displayed data processing package 510 may be propagated to the back-end data processing package 524 and vice versa. In some such cases during the time in which the changes from the displayed data processing package 510 are not yet reflected in the back-end data processing package 524, the displayed data processing package 510 and the back-end data processing package 524 may be referred to as being out-of-sync. And when the displayed data processing package 510 and the back-end data processing package 524 match or are identical they may be referred to as being in-sync or synchronized.

The package model generator 528 may be implemented using one or more software modules, threads, or applications executing on one or more processors or in one or more isolated execution environments of the semantic processing system 504. In some cases, the package model generator 528 updates the back-end data processing package 524 based on the package modification messages received from the user interface system 502. For example, a package modification message may indicate that a user has added a new command to the displayed data processing package 510. In some such cases, the semantic processing system 504 may update the back-end data processing package 524 with the change.

The manner in which the semantic processing system 504 updates the back-end data processing package 524 may vary depending on the package modification message. For example, if the package modification message includes an indication of an edit to the displayed data processing package 510, the semantic processing system 504 may update the back-end data processing package 524 based on the edit. In certain cases, the semantic processing system 504 receives a complete copy of the updated version of the displayed data processing package 510. In some such cases, the semantic processing system 504 may replace the back-end data processing package 524 with the received updated version of the displayed data processing package 510. In some cases, the semantic processing system 504 compares the received updated version with the back-end data processing package 524 to determine the differences. Based on the differences, the semantic processing system 504 updates the back-end data processing package 524.

In certain cases, the semantic processing system 504 may receive an instruction in a package modification message to edit the back-end data processing package 524. These instructions may not correspond to changes to the displayed data processing package 510. Rather, in some cases, the semantic processing system 504 may receive an instruction to edit the back-end data processing package 524 before the displayed data processing package 510 has been modified. In some such cases, the package modification message may be generated based on a user interaction with an action model 520 displayed in a GUI (e.g., an action model display object) and/or a user interaction with the search results 512.

As a non-limiting example, based on a user interaction with certain search results, the package modification message may indicate that a particular command is to be added to a particular location of the package, search-related statement, or query command. Based on the package modification message, the semantic processing system 504 may update the back-end data processing package 524.

As another example, the package modification message may include certain query parameters, such as a field identifier, field value, and associated action (e.g., "filter by") or command token (e.g., identifier for a particular command, such as "where"). Based on the package modification message, the semantic processing system 504 may determine the command to be added (and its location) to the package, search-related statement, or query command. Based on the received information, the semantic processing system 504 may update the back-end data processing package 524.

As described herein, the package model generator 528 may generate a data processing package model 526 based on the back-end data processing package 524. In some cases, the data processing package model 526 may be a parsed representation of the data processing package that identifies the various parts of the data processing package with metadata and/or identifiers. For example, the data processing package model 526 may include identifiers for distinct system query parameters and user query parameters. In some cases, the data processing package model 526 may include categorization information for the different query parameters. For example, the data processing package model 526 may categorize system query parameters as command tokens, functions, grammar, clauses, Boolean operators, etc. and/or provide the type of a particular command token, such as streaming, generating, transforming, orchestrating and/or dataset processing, etc. In certain cases, the data processing package model 526 is stored as a data structure and in a format that is more readily understood by a computing device. For example, the data processing package model 526 may be stored in a JSON format.

In addition, the data processing package model 526 may include contextual information about the data processing package, such as the location of particular query parameters within the data processing package, location of commands within the data processing package, location of grammar within the data processing package, identification and location of related or statements, etc.

In some cases, the data processing package model 526 may include a command model that corresponds to one or more commands in the data processing package or multiple commands that correspond to one command in the data processing package. The command model may include references to system query parameters and user query parameters of a particular command(s) in the data processing package or other characters in the data processing package, as well as contextual information, such as the location of the system query parameters or user query parameters (or other characters) within the data processing package or the location of the command within the data processing package, etc.

The semantic processing system 504 may communicate updates to the back-end data processing package 524 and/or data processing package model 526 to the to the user interface system 502 via a display modification message. As described herein, the display modification message may include the entire back-end data processing package 524 or just the changes to synchronize the displayed data processing package 510 with the back-end data processing package 524. Similarly, the display modification message may include the entire data processing package model 526 or just the changes to synchronize the data processing package model 522 with the data processing package model 526. In addition, the display modification messages may provide instructions for the user interface system 502. For example, the display modification messages may include instructions to modify the displayed data processing package 510, update the data processing package model 522, generate an updated outline 518 and/or models 520 based on the data processing package model 526. Based on the display modification messages, the user interface system 502 may update the displayed data processing package 510, outline 518, models 520 and/or package model 522.

In certain cases, based on an update to the displayed data processing package 510 and/or the data processing metadata 516, the user interface system 502 may automatically communicate the displayed data processing package 510 to the data intake and query system 108 for execution and may receive and display the search results 512 received from the data intake and query system 108.

Although described herein as being separate systems, in some cases one or more components of the semantic processing system 504 may be included with the user interface system 502. In certain cases, the functionality of the semantic processing system 504 may be implemented in the user interface system 502. For example, the user interface system 502 may generate a data processing package model 522 from the displayed data processing package 510 and then use the data processing package model 522 to generate the models 520 (e.g., action models and/or statement models; for simplicity, also referred to herein as action/statement model(s)).

In certain cases, the semantic processing system 504 may be omitted. In some such cases, the user interface system 502 may generate the models 520 based on the displayed data processing package 510. For example, the AMG 514 may use one or more rules or policies, similar to the rules or policies to identify the different query parameters and commands in the data processing package and generate action/statement models based on the query parameters and commands. As described herein, in some cases, one data processing package command may result in one or more action/statement models, or multiple data processing package commands may result in one action model. Furthermore, as a user interacts with one of the displayed data processing package 510, the search results 512, outline 518, and/or models 520, the user interface system 502 may update the others, such as, by generating an updated data processing package model 522, or directly updating the various components of the user interface system 502, etc.

Figure 6:
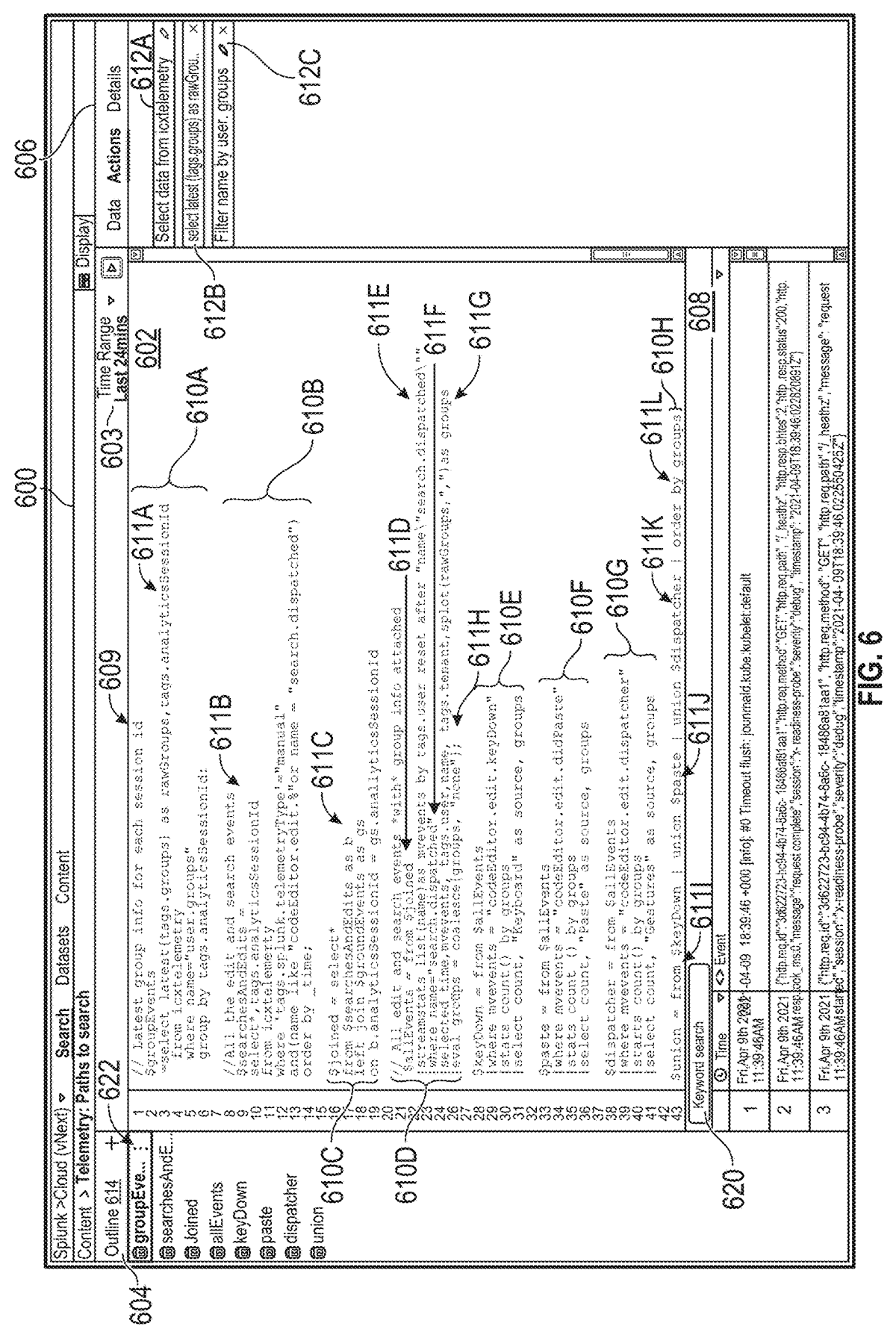

FIG. 6 is a non-limiting example of a GUI 600 that may be generated by the GUI generator 508 of the user interface system 502. In the illustrated example, the GUI 600 includes a package editor panel 602, time range selector 603, models panel 606, outline panel 604, and search results panel 608 located in different areas of the GUI 600, any combination of which may be displayed concurrently in the GUI 600. The following description of FIG. 6 will also serve to illustrate examples of and the interplay between the various components of the environment 500.

The package editor panel 602 may enable a user to edit the data processing package 609 (non-limiting example of the displayed data processing package 510). In some cases, the underlying package editor of the package editor panel 602 may be implemented in a distributed fashion with one or more functions being performed locally on a client device 506 and one or more functions being performed remotely on a server. In certain cases, the package editor may be implemented using the opensource program Monaco Editor.

In the illustrated example of FIG. 6, the data processing package 609 includes 43 lines of query parameters. Within the data processing package 609, there are eight statements 610A-610H (individually or collectively referred to as statement 610) identified as "groupEvents," "searchesAndEdits," "joined," "allEvents," "keyDown," "paste," "dispatcher," and "union," respectively. In the illustrated example, each of the statements 610 is a search-related statement as it relates to a search that may be performed via the DATA INTAKE AND QUERY SYSTEM 108. As described herein, the 609 may include different types of statements, such as import statements to import data, function statements to perform functions, search-related statements including aggregation statements to search/process data, pipeline statements to process (streaming) data and direct it to a particular destination, and/or export statements to export data.

In the illustrated example, each statement 610 is separated by an additional hard return, a semi-colon, and/or an identifier for the statement 610 (e.g., $[identifier]). Each statement 610 may span multiple lines or be located on a single line. In the illustrated example, the statement 610H "union" is located on a single line, whereas the other statements 610A-610G are located on multiple lines.

Further, each statement 610 (or statement 610) includes at least one command (individually or collectively referred to as command(s) 611). The commands 611 in a data processing package may be separated by a delimiter. In the illustrated example of GUI 600, the commands are separated by a '|."

The statements 610A-610C include one command each, identified as commands 611A-611C, respectively, while the statements 610D-610H include multiple commands. For example, the statement 610D "allEvents" has five commands 611D-611H and the statement 610H has four commands 611I-611L. Similar to the statements 610, one command 611 may span one or more lines in a data processing package or multiple commands 611 may be located on one data processing package line. For example, the commands 611A-611C span multiple lines, whereas the commands 611I-611L are on a single line.

Each command 611 in a statement 610 has multiple query parameters. Generally speaking, the commands 611 of a data processing package may be made up of different kinds of query parameters, including system query parameters and user query parameters. The system query parameters may refer to query parameters that are defined by the data intake and query system 108, such as command tokens (e.g., "from," "select," "where," "join," "streamstats," "stats," etc.), functions (e.g., "count," "average," etc.), clauses (e.g., "by," "order by," "group by" etc.), Boolean operators (e.g., "and," "or," etc.), command delimiters (e.g., 'I' etc.) or statement delimiters (e.g., ';' etc.) and/or query parameters that maintain their meaning across tenants. For example, the manner in which the data intake and query system 108 interprets "from," "|," "stats," "avg," and "by," is determined by the data intake and query system 108 and maintains its meaning across different users and tenants.

The user query parameters may refer to query parameters that are defined by the user or the user's data, such as the name of search terms in the data processing package, the time range for a search-related statement, field names, keywords, dataset identifiers, etc. In some embodiments, the user query parameters are user or tenant specific such that a user query parameter for one user or tenant may have a different meaning (or no meaning at all) or apply to different data for another user or tenant. For example, even if two tenants have a "main" dataset, the data associated with the "main" dataset for one tenant is different from the data associated with the "main" dataset from the other tenant. Similarly, the data to which user query parameters correspond to may be based on the tenant's data, such as the data in a particular index and/or based on one or more regular expression rules for a particular sourcetype. As such, the same dataset identifiers may refer to different data for different datasets or for different tenant data. Accordingly, the meaning or what is referenced by the user query parameters may be user or data specific and may not be universally applicable to users of different tenants.

The user query parameters and system query parameters may be further categorized based on type and subtypes. In some cases, the user query parameters may include query parameters of the types of datasets, field, and keyword tokens, and the system query parameters may include query parameters of type functions and command tokens, clauses, Boolean operators, etc. Some system query parameters may include subtypes. For example, command tokens may include streaming command tokens (e.g., command tokens that operate on events as they are returned by a search, such as "append," "bin," or "join," "streamstats," etc.), generating command tokens (e.g., command tokens that generates events or reports from one or more dataset sources without transforming the events, such as "from," "tstats," etc.), transforming command tokens (e.g., command tokens that order results into a data table and transform specified cell values for each event into numerical values for statistical purposes, such as "stats," "table," "top," etc.), orchestrating command tokens (e.g., command tokens that control some aspect of how a search is processed, such as whether to enable search optimization, such as "lookup," "redistribute," etc.), and/or dataset processing command tokens (e.g., commands that use or require the entire dataset to run, such as "sort," "tail," etc.). In some cases, a command token may be part of multiple categories or be part of different categories depending on the mode or settings of the data intake and query system 108 or data processing package. For example, in some cases, "bin," "append," and "join" may be streaming command tokens and/or dataset processing command tokens.

A combination of user query parameters and system query parameters may be used to form commands or query commands. For example, the query command 611I "from $keyDown" includes one system query parameter, "from," and one user query parameter "$keyDown." The system query parameter "from" may further be categorized as a "command word" or "command token" of the generating type and the user query parameter $keyDown may be further categorized as a dataset or dataset identifier. In this case the dataset "$keyDown" may correspond to the results output by the statement "keyDown".

With continued reference to FIG. 6, the outline panel 604 may display a data processing package outline 518 (also referred to herein as outline 518) that corresponds to the displayed data processing package 510 in the package editor panel 602. In the illustrated example of FIG. 6, the outline panel 604 includes an outline 614 that corresponds to the data processing package 609.

In some cases, the AMG 514 may generate the outline 614. In certain cases, the AMG 514 generates the outline 614 based on identifiers for statements in the data processing package 609 or identifiers in the data processing package model 526. For example, as described herein, the data processing package 609 includes eight identifiers for eight different statements 610. As such, the package model generator 528 may include the identifiers in the data processing package model 526 for the different statements. The AMG 514 may use the identifiers from the data processing package model 526, the data processing package 609 itself, or some other identifier for each statement 610, to create the outline 614.

In some cases, the GUI 600 may enable a user to interact with the outline 614 to change what is displayed in the GUI. For example, in the illustrated example of FIG. 6, "groupEvents" is selected from the outline 604. As such, the "groupEvents" statement is shown at the top of the package editor panel 602 and/or information about "groupEvents" is displayed in the results panel 608 and/or models panel 606. For example, model display objects 612A-612C associated with the commands in the "groupEvents" statement are shown in the models panel 606.

Selecting a different identifier within the outline 614 may cause the package editor to scroll down to that statement. In addition, depending on the selected statement, the models panel 506 may include the action/statement models associated with the statement. For example, selecting "union" from the outline 614 may cause the package editor to scroll down so that the "union" statement is displayed at the top of the package editor panel 602. Similarly, the models panel 606 would be updated to show action summaries associated with the "union" statement.

In some cases, the GUI 600 may enable the user to use the outline 614 to modify the data processing package 609. For example, the GUI 600 may enable the user to delete the "keyDown" statement by interacting with the "keyDown" identifier in the outline 614. Based on the interaction, the user interface system 502 may send a package modification message to the semantic processing system 504 instructing the semantic processing system 504 to delete the "keyDown" statement. Based on the package modification message, the semantic processing system 504 may remove the "keyDown" statement from the back-end data processing package 524, generate an updated data processing package model 526, and communicate a display modification message to the user interface system 502 that includes the changes to the back-end data processing package 524 and updated data processing package model 526. The user interface system 502 may use the received changes and updates to modify the displayed data processing package 609, re-generate any models 520 (and summaries) associated with the modified data processing package 609, and update the outline 518.

As another example, the GUI 600 may enable the user to add a statement 610 by presenting a user with one or more GUI windows to select parameters for the statement, enable a user to generate a chart by presenting the user with one or more panels or GUI windows to select parameters for the chart, etc.

Similarly, the GUI 600 may enable a user to move statements to different locations within the package editor using the outline 614 (518) (or models panel 606), perform other package edits, etc. As with other changes, the user interface system 502 may perform the change itself and/or send a package modification message to the semantic processing system 504. The semantic processing system 504 may process the package modification message and respond with a display modification message. The user interface system 502 may use the display modification message to update the displayed data processing package 609 (510), models 520, and the outline 614 (518).

The time range selector 603 may enable a user to select a time range (or package time range) to limit the data that is to be searched for different statements. For example, as various search-related statements are executed, the data intake and query system 108 may use the time range specified by the time range selector 603 (or package time range) to identify the data that is to be searched/processed. In this way, the time range specified by the time range selector 603 may be used as a filter to identify the data that is to be the subject of a search.

As described herein, in some cases, the user interface system 502 may enable a user to specify different time ranges for different statements 610, such as different search-related statements (also referred to herein as statement time ranges). In some such cases, the user interface system 502 may append different time ranges to different statements 610 before communicating the data processing package 609 and/or the statement 610 to the data intake and query system 108. For example, the user interface system 502 may generate an enriched data processing package 609 using the different time ranges and communicate the enriched data processing package 609 to the data intake and query system 108 for execution. In this way, the user interface system 502 may not edit or modify the data processing package 609 itself.

The models panel 606 may display summaries of or display objects associated with the models 520 generated by the AMG 514. In addition, the models panel 606 may enable a user to modify the models 520. For example, the models panel 606 may enable a user to delete, edit the content of, or rearrange action/statement models summaries, which may result in changes to the underlying models 520.

In the illustrated example of FIG. 6, the models panel 606 displays the model display objects 612A-612C (non-limiting examples of summaries of the models 520) corresponding to the selected statement (the "groupEvents" statement). It will be understood that the models panel 606 may include fewer or more model display objects 612A-612C (individually or collectively referred to as model display objects 612). In some cases, the models panel 606 may display all of the model display objects corresponding to a query command, statement, and/or the data processing package 609.

The search results panel 608 may be used to display one or more search results 512 received from the data intake and query system 108. In the illustrated example of FIG. 6, the results panel 608 includes three events. Each event includes a timestamp and machine data or raw machine data. In some cases, the results 512 may be referred to as interactive search results given that a user may interact with the search results 512 to update the data processing package 609 and/or model display objects 612.

The search results panel 608 includes a keyword search field 620 that enables a user to enter keywords that may be used to filter the search results. In some cases, entering a keyword into the keyword search field 620 causes an update to the data processing package 609 (e.g., user interface system 502 communicates the keyword to the semantic processing system 504, which updates the back-end data processing package 524 and/or generates an updated data processing package model 526 and sends back a display modification message to the user interface system 502 to update the data processing package 609 and/or the model display objects 612). In certain cases, entering the keyword into the keyword search field 620 does not result in any updates to the data processing package 609. For example, the search results 512 may be stored in a browser cache and the keyword may be used to filter those results without sending a new data processing package to the data intake and query system 108, whereas updating the data processing package 609 may result in the updated data processing package being sent to the data intake and query system 108 for execution.

Although not displayed in FIG. 6, it will be understood that the GUI 600 may include fewer or more panels or components. In some cases, the GUI 600 may include additional search results based on additional queries generated by the user interface system 502. In certain cases, based on the identification of a particular dataset within the data processing package 510, the user interface system 502 may generate one or more additional search-related statements to obtain data about the dataset. For example, the user interface system 502 may generate a search-related statement to identify field identifiers for fields in the dataset or keywords in the dataset, etc. The results of these additional search-related statements may be displayed on the GUI 600 to enable the user to add additional query parameters or search-related statements. Based on interactions with the additional search results, additional query parameters may be added to one or more search-related statements.

In some cases, the user interface system 502 may generate the additional query parameters (e.g., using the statement generator 530). In certain cases, the additional query parameters may be added by the user interface system 502 communicating a package modification message similar to the package modification message generated in response to interactions with the search results 512 to the semantic processing system 504, receiving edits for the displayed data processing package 510, and update the data processing package 510 based on the received edits. In addition, as described herein the user interface system 502 may receive an updated data processing package model 526, generate action/statement models based on the data processing package model 526, and update the model display objects based on the action/statement models.

5.1. Data Processing Models and Action Models

As described herein, the data processing package 609, which is an example of a displayed data processing package 510, may include various types of system query parameters, user query parameters, commands, statements (e.g., import statement, export statement, search-related statements (including aggregation-related statements), pipeline statements, function statements, etc.), etc. The back-end data processing package 524 may include that same or similar content.

With reference to FIGS. 5 and 6, in certain cases, the data processing package 609 and/or a back-end data processing package 524 that corresponds to the data processing package 609 may be used to generate a data processing package model (e.g., data processing package model 522, 526—also referred to herein as a package model 522, 526. The generated data processing package model may be used to generate the action and/or statement models (e.g., models of actions or commands and models of statements, respectively) and model display objects 612 displayed in the models panel 606.

5.1.1. Data Processing Package Models

As described herein, the data processing package model 526 may be generated by the semantic processing system 504 based on the back-end data processing package 524 and/or the package modification messages received from the user interface system 502. For example, once the back-end data processing package 524 is updated in response to a package modification message, the semantic processing system 504 may generate the data processing package model 526 based on (e.g., using or from) the updated back-end data processing package 524. In some cases, each time the back-end data processing package 524 is updated, the semantic processing system 504 may generate an updated data processing package model 526. In certain cases, the semantic processing system 504 may update the back-end data processing package 524 and data processing package model 526 concurrently. For example, based on a package modification message, the semantic processing system 504 may determine that one or more statements or (query) commands is to be added to the back-end data processing package 524. As the semantic processing system 504 updates the back-end data processing package 524 with the one or more statements or commands, it may concurrently generate one or more statement models or command models, respectively, that correspond to the added one or more statements or commands and add the statement model or command model to the data processing package model 526.

To generate the data processing package model 526, the package model generator 528 may parse the back-end data processing package 524, or in some cases, the displayed data processing package 510 (e.g., data processing package 609) (generically referred to as the data processing package 510). As it parses the data processing package 510, the package model generator 528 may identify and/or categorize different query parameters of the data processing package 510. For example, the package model generator 528 may identify and/or categorize different system query parameters and user query parameters. In addition, the package model generator 528 may identify related commands or statements. As the package model generator 528 parses the data processing package 510, it may generate the data processing package model 526.

The data processing package model 526 may include a parsed representation of the data processing package 510. In some cases, the data processing package model 526 may be in a JSON format. For example, the data processing package model 526 may include symbols or representations for the various query parameters, as well as contextual information, such as the location of different query parameters within the data processing package.

In some cases, the data processing package model 526 may include command models that correspond to or are generated from (query) commands of the data processing package. In certain cases, a command model may include a reference or otherwise identify, the command(s) or portion of a command to which it corresponds. The command model may include an identifier for system query parameters (e.g., command tokens, functions, grammar, etc.) and/or user query parameters within the query command that corresponds to the command model. In some cases, the command model may also include categorization information for the different query parameters of the command. For example, the command model may indicate the type of a command token in the command or the type of a user query parameter. The command model may also indicate the placement of each system query parameter and user query parameter within the query command and the placement of the query command within a search-related statement or data processing package.

In some cases, each query command in the data processing package may have a corresponding command model in the data processing package model 526. With reference to data processing package 609, a corresponding data processing package model 526 may have twenty-four command models or more (or fewer). In some such cases, the package model generator 528 may identify each command based on a command delimiter (e.g., '|') and generate a command model for each command.

In certain cases, the data processing package model 526 may include a command model for only some of the commands in the data processing package. For example, the data processing package model 526 may include a command model for system query parameters of a particular type (e.g., command tokens) or subtype (e.g., streaming commands), etc. In some cases, the package model generator 528 may use a lookup table or other data structure to determine whether to generate a command model for a particular command. The lookup table may indicate what should be included in a command model for each system query parameter. For example, the lookup table may indicate that for the command token "WHERE" a new command model should be created. Similarly, the lookup table may indicate that the clause "group by," should be included as part of a current command model (e.g., the command model that is being edited/created). In other words, the lookup table may indicate that no new command model should be created for the clause "group by." Similarly, the package model generator 528 may include rules and/or policies for each system query parameter. In certain cases, the package model generator 528 may include rules or policies for system query parameters based on their type or subtype. These rules or policies may indicate that the package model generator 528 is to create a new command model for some system query parameter, include certain system query parameters as part of a command model of another system query parameter (e.g., the system query parameter that (immediately) precedes it or (immediately) follows it), or generate a new command model for a particular system query parameter based on its location within a search-related command or the data processing package and based on which query parameters precede it or follow it. Accordingly, the package model generator 528 may use different policies and rules to generate command models for the commands in the data processing package.

In some cases, the package model generator 528 may use different policies and rules to generate command models based on the type or subtype of a query parameter. For example, the package model generator 528 may include a rule that user query parameters are to be included as part of a current command model (e.g., do not create a new command model when a user query parameter is encountered as the data processing package is parsed). However, it will be understood that the package model generator 528 may use different rules or policies to create command models as desired. For example, the package model generator 528 may include a rule to sometimes or always create a new command model for a user query parameter. The rule may indicate that the package model generator 528 should create a new command model for a user query parameter based on its location within a query command, search-related statement, or the data processing package 526.

As another example in which the package model generator 528 may use different policies or rules to generate command models, in certain cases, the package model generator 528 may include a rule that each command token should be part of its own command model or that clauses are always part of the same command model as the command token that (immediately) precedes the clause in the data processing package. As another example, the package model generator 528 may include a rule that certain command tokens are to be part of their own command model, while others are to be part of the command model of a command token that (immediately) precedes it or (immediately) follows it. In some cases, the package model generator 528 may make this determination based on a specific command token and/or based on types of command tokens.

Accordingly, when building the data processing package model 526, the package model generator 528, may identify a command in the data processing package and determine whether it should generate one or more command models for the command or whether it should generate one command model from multiple commands.

In certain cases, one command model may correspond to multiple commands in the data processing package or multiple command models may correspond to one command in the data processing package. For example, if the data processing package 524 uses multiple commands to perform a particular action, such as to generate a trend line, the package model generator 528 may generate a single command model for the multiple commands. In some cases, to generate one command model from multiple commands, the semantic processing system 504 may analyze the combination of commands to determine if they perform a particular action. For example, the semantic processing system 504 may compare the combination of commands with known patterns of commands that result in the particular action. If the combination of commands matches the known pattern, the semantic processing system 504 may determine that one command model should be generated from the combination of commands.

As another example, if a command in the data processing package 524 is relatively complicated, includes a Boolean operator, or may be factored into multiple parts (e.g., could have been written as distinct commands), the package model generator 528 may generate multiple command models for the single command. For example, for the command "WHERE sourcetype='kube' AND host='app_default_pool'" the package model generator 528 may determine that based on the presence of the Boolean operator "AND," the command could have been written as two separate commands (e.g., "WHERE sourcetype='kube'" and "WHERE host='app_default_pool,'"). Accordingly, the package model generator 528 may generate two command models for the command (e.g., a command model for filtering data based on the source "kube" and a second command model for filtering data based on the host "app_default_pool."). In some cases, the package model generator 528 may include a rule or policy to not factor commands into multiple command models or it may include a rule or policy to sometimes factor commands into multiple command models for some system query parameters, but not for others. Again, these rules may apply to individual system query parameters or based on a type or subtype of the relevant system query parameter or user query parameter.

In some cases, the package model generator 528 may include a rule or policy that a new command model based on the presence of a command delimiter. For example, for each '/' in the data processing package 609, the package model generator 528 may create a new command model. Thus, in some cases, where the package model generator 528 may not have created a new command model based on a system query parameter, the presence of the command delimiter may make the system query parameters part of a new command model. For example, consider the command 611L "order by groups." The command 611L includes the system query parameter "order by," which is a clause, and a user query parameter "groups" and is immediately preceded by the system query parameter '|,' which is a command delimiter. Based on the clause "order by," the package model generator 528 may determine no new command model is to be created, however, because the command delimiter '|' immediately precedes (excluding spaces) the clause "order by," the package model generator 528 may create a new command model for the command. In contrast, with reference to the "groupEvents" command 611A "select latest (tags.groups) as rawGroups, tags.analyticsSessionID from icxtelemetry where name='user groups' group by tags.analyticsSessionId;" the package model generator 528 may not create a new command model for the clause "group by" because there is not a command delimiter that immediately precedes it.

With continued reference to the command 611A, the package model generator 528 may create multiple command models. For example, in the illustrated example, the package model generator 528 created command model for each of the command tokens "select," "from," and "where" within the command 611A. Accordingly, the package model generator 528 may generate command models based on the type and/or subtype of a query parameter and its location within the data processing package.

In some cases, the package model generator 528 may group command models together as a statement model. For example, as the package model generator 528 parses a data processing package 524, it can distinguish between different statements in the data processing package 524 (e.g., based on statement delimiters). The package model generator 528 may then parse the commands of individual statements to generate command models for those commands. The resulting command models may be grouped or related together as a statement model, similar to the way in which multiple commands are grouped together as a statement. With reference to FIG. 6, the package model generator 528 may generate eight statement models corresponding to statements 610A-610H.

In certain cases, the data processing package model 526 may include identifiers for related commands or statements. For example, with reference to FIG. 6, the data processing package 609 includes eight statements 610A-610H, identified as "groupEvents," "searchesAndEdits," "joined," "allEvents," "keyDown," "paste," "dispatcher," and "union," respectively. Accordingly, a data processing package model 526 for the data processing package 609 may include an identifier for each of the distinct statements.

5.1.2. Action Models

With continued reference to FIGS. 5 and 6, the data processing package model 510 (or 524) may be used to generate the action and/or statement models 520 (also referred to herein as models 520) and/or corresponding model display objects displayed in the models panel 606 (although reference is made to the data processing package model 526 being used to generate action/statement models, it will be understood that the data processing package model 522 may be used). The relationship between the data processing package model 526 and models 520 may be similar to the relationship between the data processing package 524 and the data processing package model 526 in that the AMG 514 may parse the data processing package model 526 to generate the models 520. In some cases, such as where the data processing package model 526 is stored as a parsed representation of the data processing package (e.g., as a data structure and/or in a format that is more readily interpreted by a computing device, such as a JSON format), parsing the data processing package model 526 may be relatively easier than parsing the data processing package 524.

Accordingly, the AMG 514 may use the structure and/or metadata of the data processing package model 526 to generate a data processing package actions model, which may be made up of individual action/statement models. In some cases, the AMG 514 may generate an action model for each command model. For example, if the rules and policies of the package model generator 528 and AMG 514 are similar in terms of how different parts of the data processing package are to be parsed and interpreted, the AMG 514 may generate an action model for each command model.

In certain cases, the AMG 514 may generate multiple action models from one command model or combine multiple command models as one action model. For example, similar to the way in which the package model generator 528 uses rules and policies to determine whether to generate one or multiple command models from one command or to generate one command model from multiple commands, the AMG 514 may use rules and policies to determine whether to generate one or multiple action models from one command model or to generate one action model from multiple command models.

As a non-limiting example, the AMG 514 may identify command models that perform multiple actions and create multiple action models from the command model, or the AMG 514 may determine that a particular sequence of command models performs a particular action and generate an action model for the sequence of command models. Similar to the package model generator 528, the AMG 514 may identify the sequence of commands using pattern matching. For example, the AMG 514 may compare command tokens from the sequence of command models with known patterns of command tokens that perform different actions. If the command tokens in the sequence of command models matches a known pattern, the AMG 514 may generate an action model from the sequence of command models.

In some cases, the rules and policies of the package model generator 528 and AMG 514 may diverge. For example, where the rules and policies of the package model generator 528 may be focused on creating a data structure with granular information about each query parameter that is more readily understood by a computing device, the AMG 514 may be focused on creating a data structure with a summary that is more readily understood by a human. Accordingly, the package model generator 528 may break down the data processing package into as many command models as possible to aid a computing device in understanding the data processing package 524, whereas the AMG 514 may seek to combine command models in a way that aids a human in understanding the actions that will occur as a result of the data processing package 510.

In certain cases, the generation of the command model may be relatively simple in that the package model generator 528 may generate a command model for each command, without attempting to perform higher-level parsing tasks, such as splitting commands into multiple command models or combining commands into one command model. In some such cases, the AMG 514 may perform the higher-level tasks by splitting command models and/or combining command models. In certain cases, these higher-level functions may be split between the semantic processing system 504 and the user interface system 502. For example, the semantic processing system 504 may split commands into multiple command models and the user interface system 502 may combine commands into multiple action models (e.g., by combining command models of the data processing package model 526 that correspond to the commands).

Although the package model generator 528 and AMG 514 may have a different purpose and therefore use different rules and polices, the AMG 514 may use similar mechanisms to generate the action models. For example, AMG 514 may create action models based on the type/subtype of query parameters and/or context (location of the query parameters within the command, search-related statement, or data processing package; location of command within the data processing package). Accordingly, the AMG 514 may treat system query parameters of the same type/subtype a similar way and/or include rules for particular system query parameters. In addition, the AMG 514 may use contextual information to determine how to generate action models from the data processing package model 526.

In some cases, each action model may be linked to or reference the command model(s) of the data processing package model 526 (or commands of the data processing package 524) used to generate the action model. In addition, the action model may include a short statement or summary of the action that occurs as a result of the relevant query command. The summary may identify the relevant command token and/or summarize the process that is being performed on the data based on the associated query command(s). For example, the summary may identify the system query parameter that initiates the action (e.g., the command token or another term that summarizes what the command token is intended to do) and the user query parameter that identifies the object (or data) on which the action is to be performed. In certain cases, the summary may provide a description of an action that results from execution of the query commands that correspond to or are associated with the action model. The GUI 600 may display the action model in the models panel 606 as a display object (also referred to herein as an action model display object or model display object).

As a non-limiting example and with reference to the models panel 606 of FIG. 6, three action model display objects 612A, 612B, 612C are shown. These action model display objects 612A, 612B, 612C correspond to the "groupEvents" command 611A in lines 3-6 of the data processing package 609. As described herein, the package model generator 528 may have broken the "groupEvents" command into three command models (e.g., a command model for each command token "select," "from," and "where"). The AMG 514, in this example, created three action models from the generated command models. The first action model (and corresponding action model display object 612A) corresponds to the portion of the "groupEvents" command on line 3 ("select latest (tags.groups) as rawGroups, tags.analyticsSessionID"), action model (and corresponding action model display object 612B) corresponds to the portion of the "groupEvents" command on line 4 ("from icxtelemetry"), and the third action model (and corresponding action model display object 612C) corresponds to the portion of the "groupEvents" command on lines 5 and 6 ("where name='user.groups' group by tags.analyticsSessionId").

As described herein, the action models may include reference to the command models used to generate the action models and/or reference to the commands used to generate the command models that are used to generate the action models. As shown in FIG. 6, the model display objects 612A-612C may include a brief description of the action performed by the corresponding portions of the command 611A. For example, the action model display object 612A ("Select data from icxtelemetry") identifies the action (select data from) that will result from the command token (from) and identifies the dataset (icxtelemetry) on which the action will be performed. Similarly, the action model display object 612C ("Filter name by user.groups") identifies the action (filter by) that will result from the command token (where) and identifies the data (events with the field-value "user.groups" for the field "name") on which the action will be performed.

Notably, the model display objects 612A, 612C may be more than a mere recitation of the command or command token. Rather, the model display objects 612A, 612C may include a synopsis of the command token in a more human-comprehensible form. Put another way, the model display objects 612A, 612C may use different terms for some of the query parameters found in the corresponding command 611A or command model. In certain cases, the action models may include the same terms as the corresponding command or a subset of the same terms without adding different terms.

As described herein, interacting with model display objects 612 may result in updates to the displayed data processing package 510. For example, deleting the action model display object 612A may result in the deletion of the command(s) or portion of the command that correspond to the action model display object 612A.

If the action model corresponds to a portion of a command in the data processing package, then when the corresponding action model display object is deleted, that portion of the command may be deleted from the data processing package 510. Similarly, if an action model corresponds to multiple commands in the data processing package 510, then when the respective action model display object is deleted, all of the commands that correspond to the action model may also be deleted.

In some cases, the corresponding command(s) or portion of a command in the data processing package 510 are deleted based on the user interface system 502 sending a package modification message to the semantic processing system 504 that identifies the changes to be made, the semantic processing system 504 updating the back-end data processing package 524 and sending edits to the user interface system 502 to update the data processing package 510 to reflect the changes made to the back-end data processing package 524, and the user interface system 502 using the edits to delete the corresponding commands from the data processing package 510. In certain cases, the user interface system modifies the data processing package 510 without communicating with the semantic processing system 504. For example, the user interface system 502 may track which commands of the data processing package correspond to which action model display objects and remove them based on the removal of a respective action model display object.

In addition, rearranging the data processing model display objects 612A-612C may result in the corresponding commands to be moved or rearranged. For example, with reference to FIG. 7C, based on a user moving the data processing action model display object 712D to between data processing model display objects 712B and 712C, the user interface system 502 may generate a package modification message indicating the change and send the generated package modification message to the semantic processing system 504. The semantic processing system 504 may use the package modification message to update the back-end data processing package 524, generate an updated data processing package model 526, and communicate the relevant edits for the data processing package 709B (510) to the user interface system 502 via a display modification message. The user interface system 502 may update the data processing package 510/709B based on the display modification message.

In certain cases, the user interface system 502 may disable the rearranging of the model display objects 612A-612C if such a rearrangement would create an error in the data processing package (e.g., an error in the query language used to form the data processing package).

Given the various combinations of one or more commands being used to generate one or more command models and one or more command models being used to generate one or more action models, statement models, and model summaries, it will be understood that there may be many different types of relationships between commands, command models, and action models as summarized by the following table, where "1" indicates one command, one command model, or one action model and "multiple" indicates multiple commands, multiple command models or multiple action models. Thus, the second row indicates that one command may result in one command model in the data processing package model 526, which may result in one action model in the data processing package model, whereas the fifth row indicates that one command may result in multiple command models and multiple action models.

TABLE 1

| Number of Commands | Number of Command Models | Number of Action Models | Number of Statement Models |
|---|---|---|---|
| 1 | 1 | 1 | 1 |
| 1 | 1 | Multiple | 1 |
| 1 | Multiple | 1 | 1 |
| 1 | Multiple | Multiple | 1 |
| Multiple | 1 | 1 | 1 |
| Multiple | 1 | Multiple | 1 |
| Multiple | Multiple | 1 | 1 |
| Multiple | Multiple | Multiple | 1 |

As described herein command models may reference the commands from which they were generated. Similarly, action models may reference the command models and/or commands from which they were generated. Accordingly, in instances where one action model results from multiple commands (or command models), the action model may reference or be associated with the multiple commands (or command models). In instances where one command (or command models) corresponds to one action model, the action model may reference or be associated with the one command (or command models). Similarly, in instances where multiple action models result from one command (or command model), each action model may reference the command (or command model) and may also reference the particular portion of the command (or command model) from which the action model was generated.

In some cases, the action models may not reference the commands with which they are associated. In some such cases, an action model may reference the command model(s) or portion thereof used to generate the action model, and the command model may reference the command(s) or portion thereof used to generate the command model. In this way the user interface system 502 and/or semantic processing system 504 may identify relationships between action models (and summaries) and commands in the data processing package.

Using the references and/or associations between action models, command models and commands, the user interface system 502 may determine, based on a modification to an action model display object, which command(s) are affected, and communicate an appropriate package modification message to the semantic processing system 504 that identifies the relevant commands and the changes to be made to the commands.

For example, if an action model display object associated with a portion of a command is edited, the user interface system 502 may use the relationships between action models, command models, and commands to identify the portion of the command that is to be edited and include that information in the package modification message. Similarly, if an action model display object associated with multiple commands is deleted, the user interface system 502 may use the relationships between action models, command models, and commands to identify the commands that are to be deleted and include that information in the package modification message.

In some cases, editing one action model display object may affect multiple commands, some of which may not have an indicated relationship with the action model. For example, editing an action model (e.g., the action model that corresponds to the action model display object) may transform a corresponding command in the data processing package. Other commands in the data processing package may have referred to and/or relied on the transformed command. In some such cases, the package model generator 528 may use its knowledge of the query language to modify the other commands and generate an updated data processing package model 526. The AMG 514 may generate updated models 520 based on the updated data processing package model 526. Although described as being performed by the package model generator 528, it will be understood that a component of the user interface system 502 may perform a similar modification to a data processing package and send an updated data processing package to the semantic processing system 504 as part of a package modification message. In some such cases, the package model generator 528 may generate an updated data processing package model 526 based on the package modification message.

As a non-limiting example, consider the following search-related statement: $q=from main|rename a as b|where b=1. If an action model display object corresponding to "rename a as b" is deleted, a package modification message identifying the change may be communicated to the semantic processing system 504. Based on the change, the package model generator 528 may determine that the command "where b=1" will be affected because it includes reference to "b." As such, the package model generator 528 may revise the command "where b=1" to "where a=1" resulting in the following search-related statement "$q=from main|where a=1." The package model generator 528 may then generate a data processing package model 526 based on the updated search-related statement. As mentioned, it will be understood that a component of the user interface system 502 may perform a similar modification to the search-related statement and send an updated search-related statement ($q=from main|where a=1) to the semantic processing system 504 as part of a package modification message.

5.1.3. Statement Action Models and Package Action Models

The AMG 514 may also generate statement action models and/or package action models. As described herein, a package model may include command models generated from commands of a statement in a data processing package. The command models generated from commands of a particular statement may be related or grouped together as a statement model corresponding to the particular statement. Similarly, action models that correspond to commands from a particular statement may be grouped together as a statement action model. Moreover, the action models and/statement action models generated from a particular data processing package model may be referred to as a package action model.

In certain cases, the AMG 514 may generate a statement action model in a manner similar to the way in which it generates action models, e.g., by parsing a package model.

In some cases, the AMG 514 may relate action models generated from the commands of a particular statement of the data processing package to generate the statement action model. For example, as described herein, a statement in a data processing package 510 may include multiple commands. The semantic processing system 504 may generate one or more command models from the commands of a particular statement, and the AMG 514 may generate one or more action models from the command models. In some such cases, the AMG 514 may relate the generated action models to form a statement action model that corresponds to the statement in the data processing package used to generate the actions models. Similarly, the AMG 514 may relate the statement action models to a data processing package action models that corresponds to the data processing package used to generate the actions models and statement action models.

5.2. Example User Interfaces

To illustrate the interactions between the user interface system 502 and the semantic processing system 504, consider the following non-limiting examples in reference to FIGS. 7A-7D and 8A-8D in which 1) an interaction with one or more search results causes the displayed data processing package 510 and model display objects to be updated, 2) an interaction with one or more model display objects causes the data processing package 510 to be updated, and 3) edits to the displayed data processing package 510 causes the model display objects to be updated.

Figure 7B:
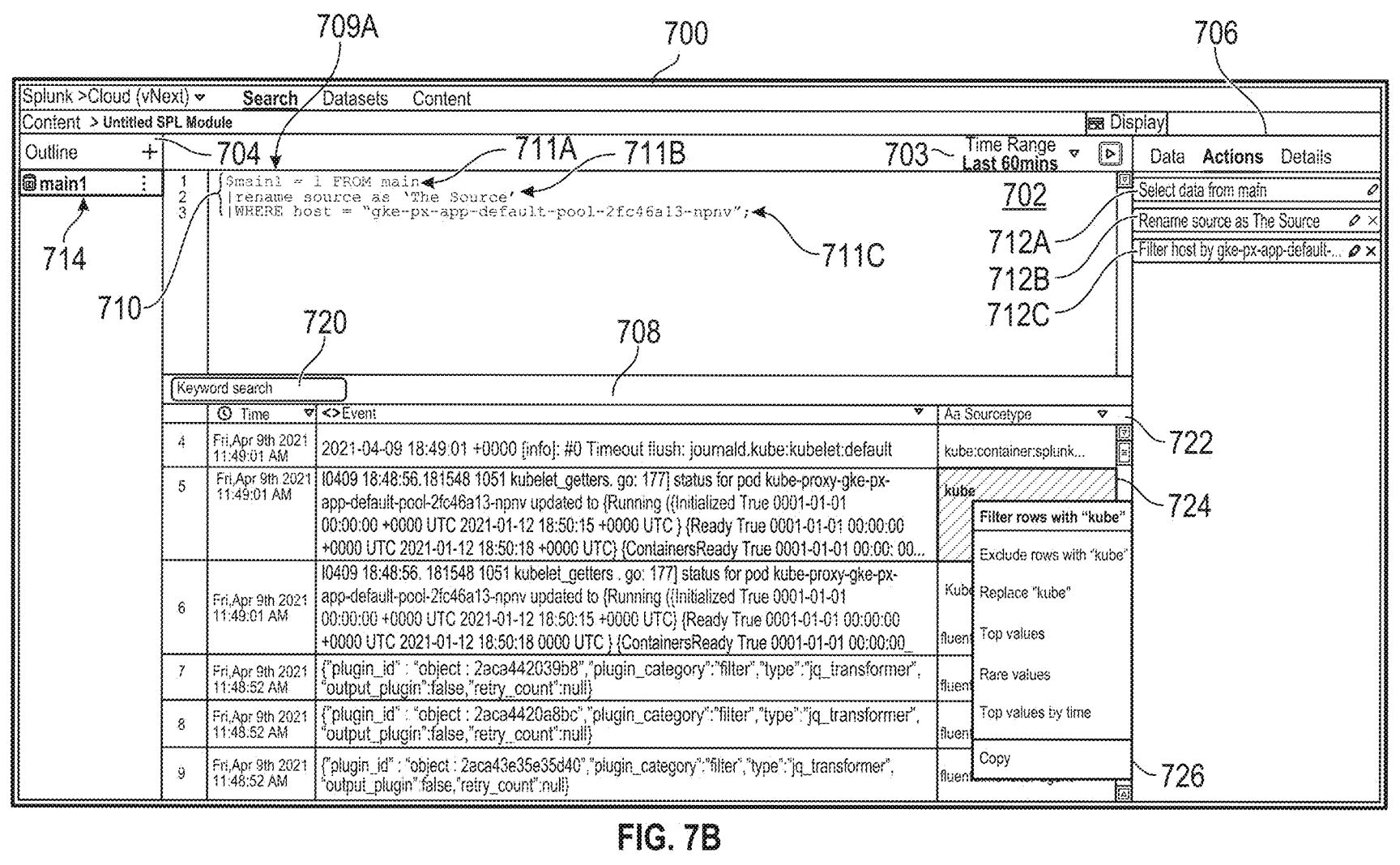
Figure 7C:
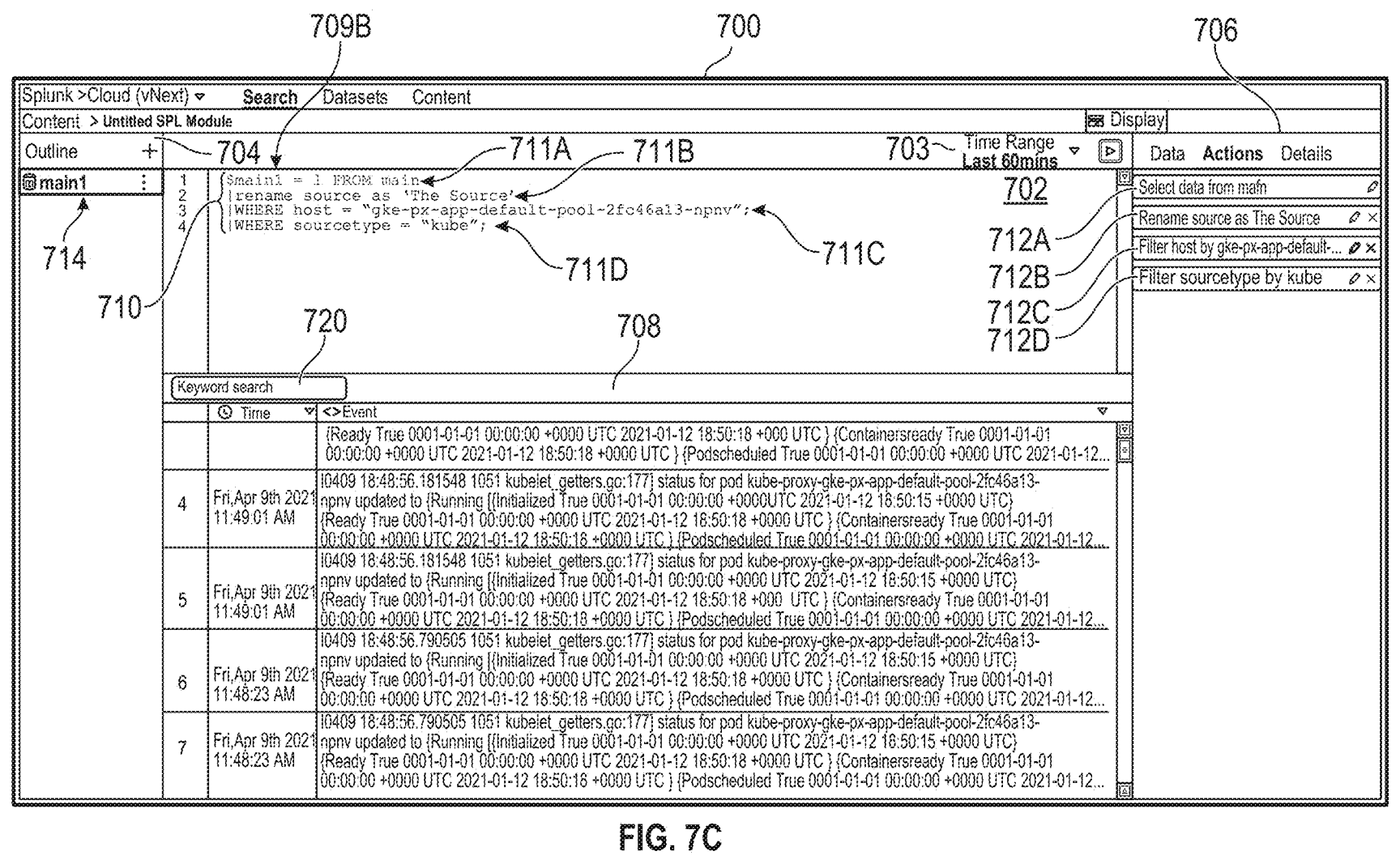
Figure 7D:
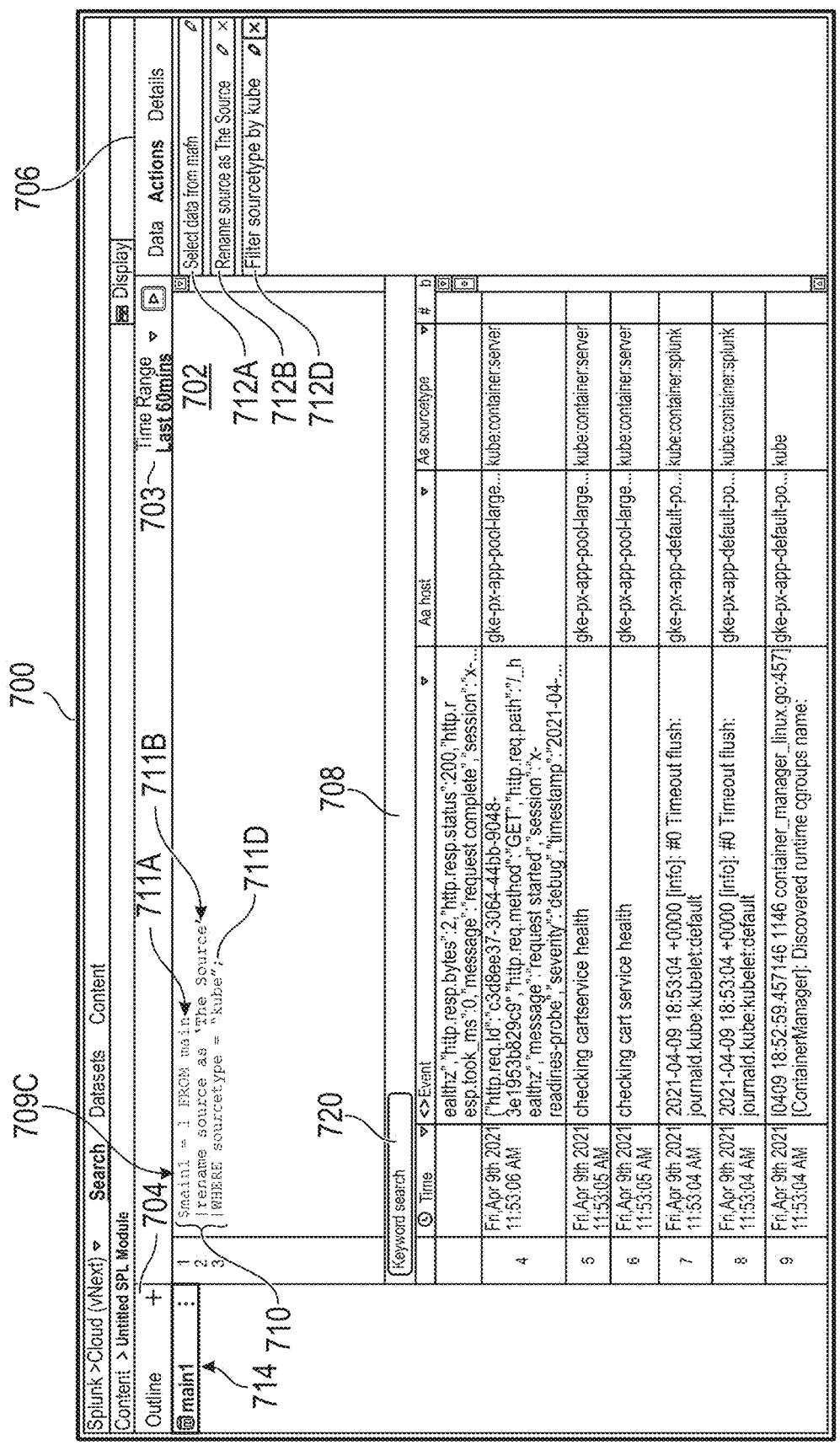

FIG. 7A illustrates an example of a GUI 700. The GUI 700 may be similar to GUI 600 in that it includes a package editor panel 702, time range selector 703, outline panel 704, and search results panel 708 with a keyword search field 720), any combination of which may be displayed concurrently in the GUI 700. The GUI 700 illustrated in FIG. 7A differs, in some respects from GUI 700 in that it includes a data panel 718 in place of a models panel. However, based on a user interaction, the GUI 700 may display a models panel 706, as illustrated in FIGS. 7B-7D. In addition, the GUI 700 displays a different data processing package 709A (non-limiting example of the displayed data processing package 510) than the GUI 600. Specifically, the data processing package 709A includes one statement 710 "main1," which has three commands 711A-711C separated by the delimiters '|.' Accordingly, the outline 714 is different from the outline 614 as are the model display objects 712A-712C (shown in FIG. 7B), which correspond to the commands 711A-711C, respectively.

In certain cases, the data panel 718 may be filled based on one or more queries executed by the data intake and query system 108. The queries may be different from the data search-related statement 710 and may be generated by the user interface system 502 and/or data intake and query system 108. In some cases, the queries may include query parameters to identify additional information about datasets identified in the search-related statement 710. For example, one additional search-related statement (which may be generated by appending one or more query commands to one or more query commands of the search-related statement 710) may instruct the data intake and query system 108 to identify some (e.g., most common, most rare, top 10, etc.) or all of the fields within the dataset "main." Another additional search-related statement may instruct the data intake and query system 108 to identify some (e.g., most common, most rare, top 10, etc.) or all keywords found within the dataset "main." Yet other queries may instruct the data intake and query system 108 to calculate averages, sums, or other information about the dataset "main." For example, a search-related statement may request the dataset to provide the number of different fields in the dataset "main."

In some cases, interactions with the data panel 718 may result in the search results (and search results panel 708) being updated. For example, based on the selection of the field "sourcetype" in the data panel, the search results are updated to show the field value for the sourcetype field in the various events. Similar to adding keywords to the keyword search field 720, adding fields via the data panel 718 may or may not cause an update to the data processing package 709A. For example, in some cases, adding a field via the data panel 718 may cause the search results panel 708 to merely update the manner in which the search results are displayed, such as, by showing an additional field of an event. In certain cases, interactions with the data panel 718 may cause the data processing package 709A to be updated. For example, based on an interaction with a result from the additional queries, the user interface system 502 may generate a package modification message and update the data processing package 709A and model display objects 712, similar to the way in which the user interface system 502 does when a user interacts with the search results 512.

FIG. 7B illustrates an example of the GUI 700 in which the models panel 706 has been selected for display. Accordingly, model display objects 712A-712C (e.g., corresponding to models 520) are displayed. As described herein, the action model display objects 712A-712C may correspond to commands in the data processing package 709A. For example, the action model display object 712A may correspond to the command "FROM main," the action model display object 712B may correspond to the command "rename source as 'The Source,'" and the action model display object 712C may correspond to the command "WHERE host='gke-ox-app-default-pool-2fc46a13-npnv.'"

In addition, a user has interacted with the search results displayed in the search results panel 708, for example, by clicking on the "sourcetype" field (column) 722, hovering over "kube" in the first pop-up window 724, and then hovering over and clicking the display object associated with "Filter rows with 'kube'" in the second pop-up window 726.

Based on this interaction, the user interface system 502 may determine that the corresponding search results 512 should be filtered based on the selected field value (sourcetype="kube") and generate and communicate a package modification message to the semantic processing system 504. The instructions may be based on the display object selected within the second pop-up window. For example, each display object may be associated with a different command or action, and the user interface system 502 may determine what action is to take place (and therefore what command or parameters to send to the semantic processing system 504) based on the selected display object.

In some cases, the package modification message may include a command line that is to be added to the back-end data processing package 524 and displayed data processing package 709A. For example, the package modification message may include the command "WHERE sourcetype='kube'" with an instruction that it should be added to the end of the back-end data processing package 524 that corresponds to the displayed data processing package 709A.

In certain cases, the package modification message may include certain parameters based on the interaction. For example, the package modification message may (only) include parameters for the relevant command and corresponding field(s), and field value(s), such as "filter, sourcetype, kube." In some such cases, the semantic processing system 504 may determine the exact query parameters or command to add to the back-end data processing package 524 and displayed data processing package 709A. Accordingly, in some cases, the user interface system 502 is unaware of the edits that will be made to the displayed data processing package 510 based on a user's interaction with the search results 512. Furthermore, in certain, the back-end data processing package 524 may be updated before the displayed data processing package 510. In some such cases, the back-end data processing package 524 may include the most current version of the data processing package and the displayed data processing package may include an outdated version of the data processing package (until it is updated) in response to a display modification message.

The semantic processing system 504 may process the package modification message. In this example, as part of processing the package modification message, the semantic processing system 504 may update the back-end data processing package 524 to include a command corresponding to "Filter rows with 'kube,'" generate a data processing package model 526 based on the updated back-end data processing package 524 and respond to the user interface system 502 with a display modification message.

FIG. 7C is a diagram illustrating an example GUI 700 showing the results after the user interface system 502 has processed the display modification message. Specifically, the display modification message may include edits for the displayed data processing package 709A, and an updated data processing package model 526. The user interface system 502 may use the edits to update the displayed data processing package 709A to become displayed data processing package 709B, initiate execution of the updated data processing package 709B, and display the updated search results in the search results panel 708. In addition, the user interface system 502 may use the updated data processing package model 526 to generate an updated data processing package model and update the model display objects 712A-712D.

The edits for the data processing package 709A may correspond to the command that is to be added to the displayed data processing package 709A. In this example, the edits for the data processing package 709A may include an instruction to add "WHERE sourcetype='kube'" to the displayed data processing package 709A. Depending on where the command is to be added, the display modification message may include additional edits to the data processing package 709A. For example, the display modification message may indicate grammatical changes (e.g., the addition of a delimiter, such as 'I' before or after the command to be added), rearranging or modification of existing query command lines, etc. In certain cases, the display modification message may include a replacement data processing package that is to replace the data processing package 709A. For example, rather than providing the user interface system 502 with the differences between the updated and now current back-end data processing package 524, the semantic monitoring system 504 may provide user interface system 502 with the entire data processing package and instruct the user interface system 502 to replace the displayed data processing package 709A with the received data processing package. As a result of processing the display modification message, the user interface system 502 may display an updated data processing package 709B that includes a new command 711D "|WHERE sourcetype='kube" at the end.

The display modification message may, in some cases, instruct the user interface system 502 to execute the updated data processing package. In certain cases, the user interface system 502 may automatically execute the updated data processing package based on a determination that the data processing package has changed. In some cases, the user interface system 502 may wait for a user interaction instructing it to execute the data processing package. The GUI 700 may display the results of the updated data processing package 709B in the search results panel 708.

As described herein, the user interface system 502 may use the received data processing package model 526 to generate an updated outline 518 and/or updated models 520. In the illustrated example of FIG. 7C, the added command 711D "WHERE sourcetype='kube" resulted in a new action model and a corresponding action model display object 712D being displayed in the models panel 706.

Similar to the way in which a user interaction with the search results displayed in the search results panel 708 may result in an updated data processing package 709B and a new action model display object 712D, user interactions with the models panel 706 or model display objects 712A-712D may result in updates to the data processing package 709B.

FIG. 7C illustrates an example of the results of user interaction with the action model display object 712C. Specifically, a user clicks the 'X' proximate the action model display object 712C. Based on the interaction, the user interface system 502 may determine that the command 711C, which corresponds to action model display object 712C, should be deleted from the data processing package 709B. Accordingly, the user interface system 502 may generate and communicate a package modification message to the semantic processing system 504 to delete the command 711C from the back-end data processing package 524 that corresponds to the data processing package 709B.

In some cases, the package modification message may include a copy of the command 711C that is to be deleted. For example, the package modification message may include the command 711C "WHERE host='gke-ox-app-default-pool-2fc46a13-npnv."" with an instruction that it should be added to the end of the back-end data processing package 524 that corresponds to the displayed data processing package 709A. In certain cases, the package modification message may also include any grammar or delimiters that are to be deleted, such as the 'I' before the command 711C.

In certain cases, the package modification message may include certain parameters based on the interaction. For example, the package modification message may (only) include parameters for the relevant command to be deleted, such as "delete, filter, host, gke-ox-app-default-pool-2fc46a13-npnv." In some cases, the package modification message may include an identifier for the command 711C or its corresponding command model(s). For example, as the action model display object 712C is generated from one or more command models, which in turn were generated from the command 711C, the package modification message may include an identifier for the command models used to generate it and/or an identifier for the command 711C. In some cases, the user interface system 502 may include a lookup table or other data structure that tracks the relationship between query commands, command models, and action models. In some such cases, the user interface system 502 may use the lookup table or reference thereto to identify the command 711C for deletion in the package modification message.

In certain cases, the semantic processing system 504 may determine the query parameters or command to delete from the back-end data processing package 524 and displayed data processing package 709A based on the identifiers received via the package modification message. Accordingly, in some cases, the user interface system 502 is unaware of the edits that will be made to a displayed data processing package 510 (non-limiting example data processing package 609B) based on a user's interaction with the models panel 706. Furthermore, in certain cases, the back-end data processing package 524 may be updated before the displayed data processing package 510. In some such cases, the back-end data processing package 524 may include the most current version of the data processing package and the displayed data processing package 510 may include an outdated version of the data processing package (until it is updated).

The semantic processing system 504 may process the package modification message. In this example, as part of processing the package modification message, the semantic processing system 504 may update the back-end data processing package 524, generate a data processing package model 526 based on the updated back-end data processing package 524, and respond to the user interface system 502 with a display modification message.

FIG. 7D is a diagram illustrating an example GUI 700 showing the results of the user interface system 502 processing the display modification message. Specifically, the display modification message may include edits for the data processing package 709B and an updated data processing package model 524. The user interface system 502 may use the edits to update the data processing package 709B to data processing package 709C, update the model display objects 712A-712D to remove action model display object 712C, initiate execution of the updated data processing package 709C, and display the updated search results in the search results panel 708.

FIGS. 8A-8D illustrate examples of the GUI 700 with a different data processing package 809A (non-limiting example of the displayed data processing package 510). Specifically, the data processing package 809A includes one statement 810 (also referred to herein as a data processing statement 810) "main1," which has three commands 811A-811C separated by the delimiters '|.' Accordingly, the outline 814 is different from the outlines 614, 714 as are the model display objects 812A-812C (non-limiting examples of summaries of the models 520), which correspond to the commands 811A-811C, respectively.

Figure 8A:
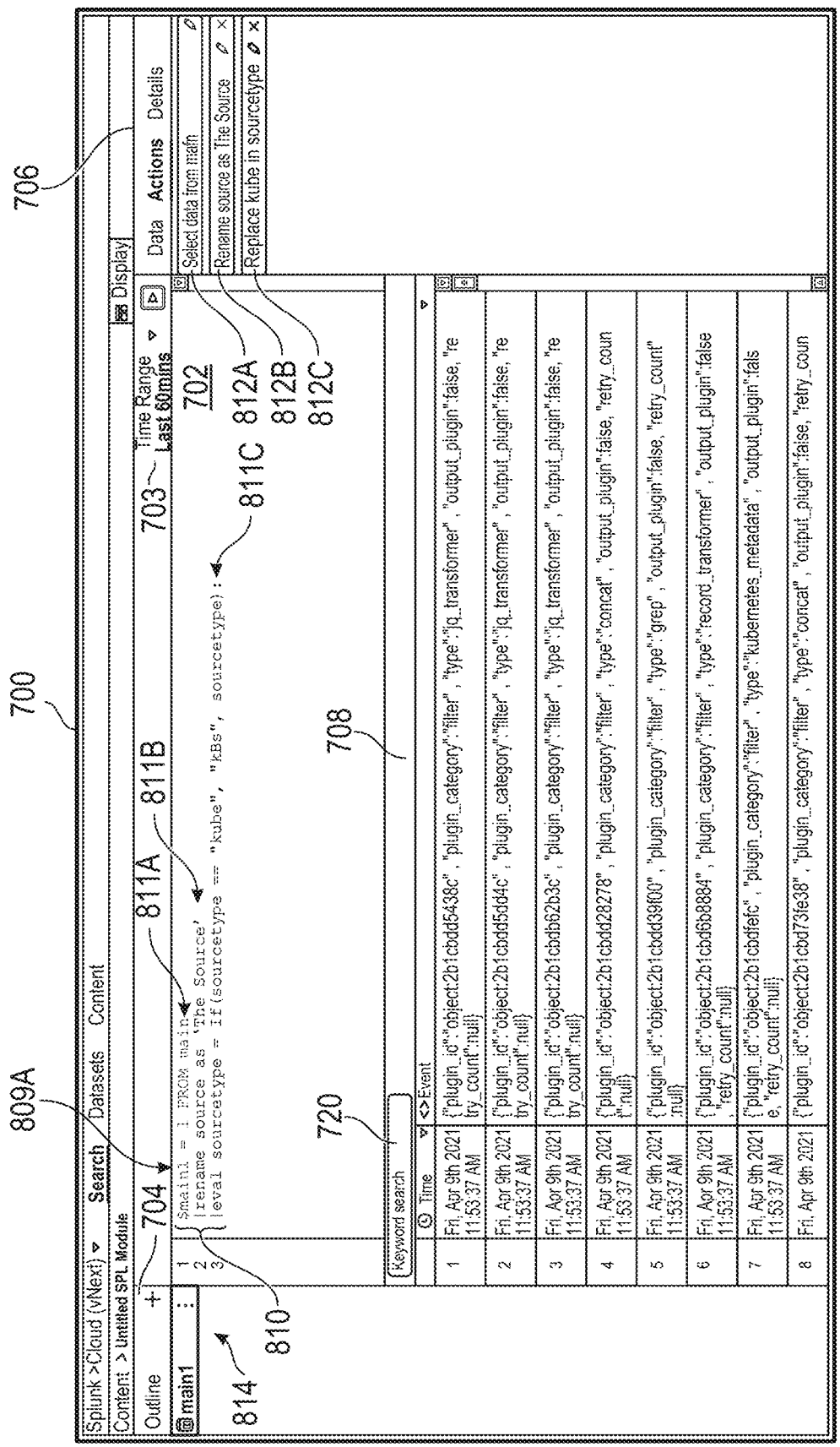
Figure 8B:
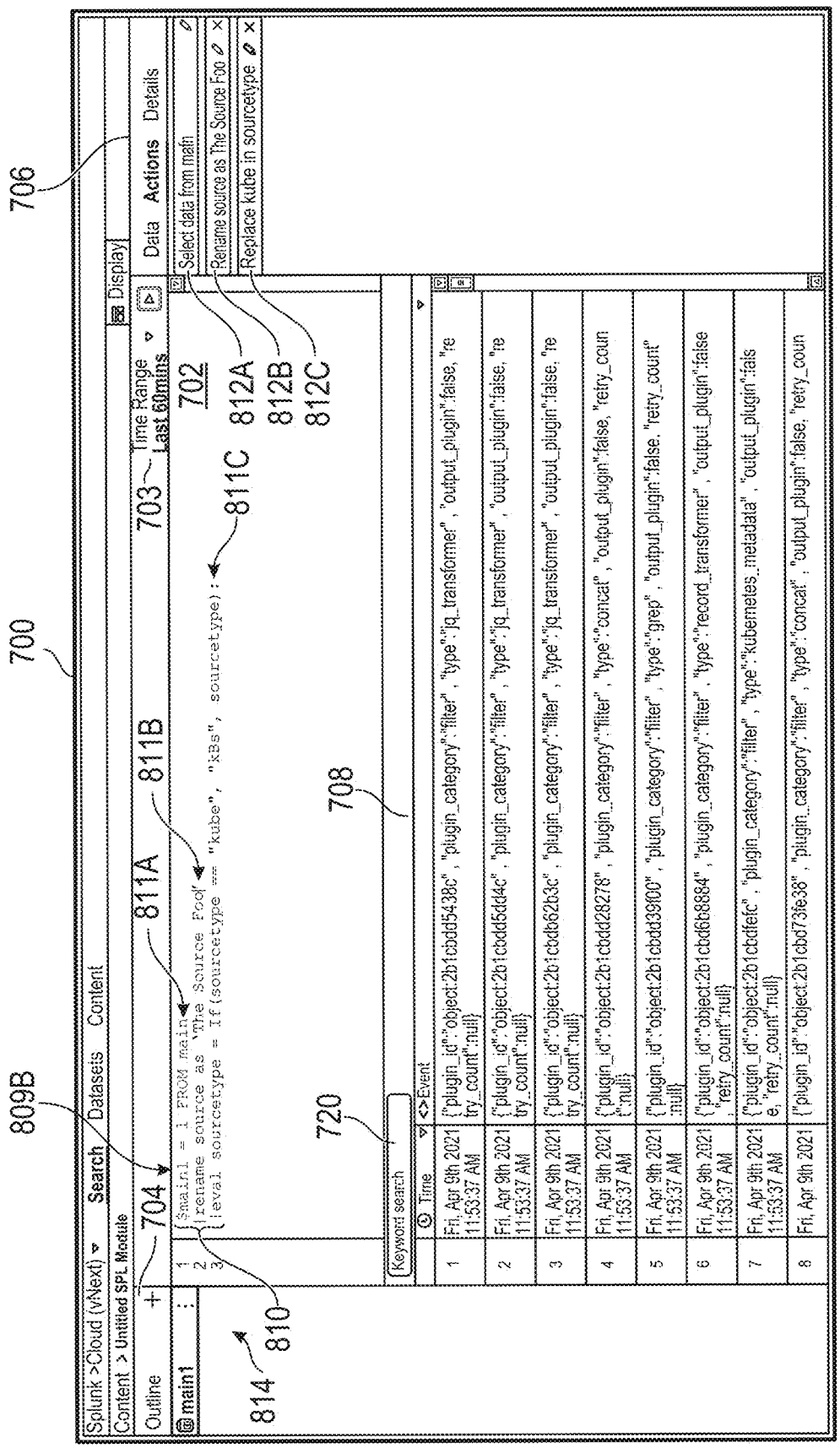

FIGS. 8A and 8B illustrate an example of the results of a user interacting with and/or editing the data processing package 809A, which results in updates to the models panel 706 and/or model display objects 812A-812C. Specifically, a user edits the command 811B "rename source as "The Source" to read "rename source as "The Source Foo." The user interface system 502 may update the data processing package as it is being edited, which results in data processing package 809B (shown in FIG. 8B). In addition, based on the detected change, the user interface system 502 may generate and communicate a package modification message to the semantic processing system 504 to modify the back-end data processing package 524 that corresponds to the data processing package 809B.

In some cases, as the data processing package 809A was directly edited, the package modification message may include the changes made to the data processing package 809A and/or the complete data processing package 809B. The semantic processing system 504 may process the package modification message. In this example, as part of processing the package modification message, the semantic processing system 504 may update the back-end data processing package 524, generate a data processing package model 526 based on the updated back-end data processing package 524, and respond to the user interface system 502 with a display modification message.

As the data processing package 809A has been updated to data processing package 809B, the display modification message may not include any changes for the data processing package 809B, however, the display modification message may include an updated data processing package model 526. As described herein, the user interface system 502 may use the updated data processing package model 526 to update the outline 814 and/or the models panel 706. As shown in FIG. 8B, the action model display object 812B is updated to reflect that the source has been renamed "The Source Foo."

Figure 8C:
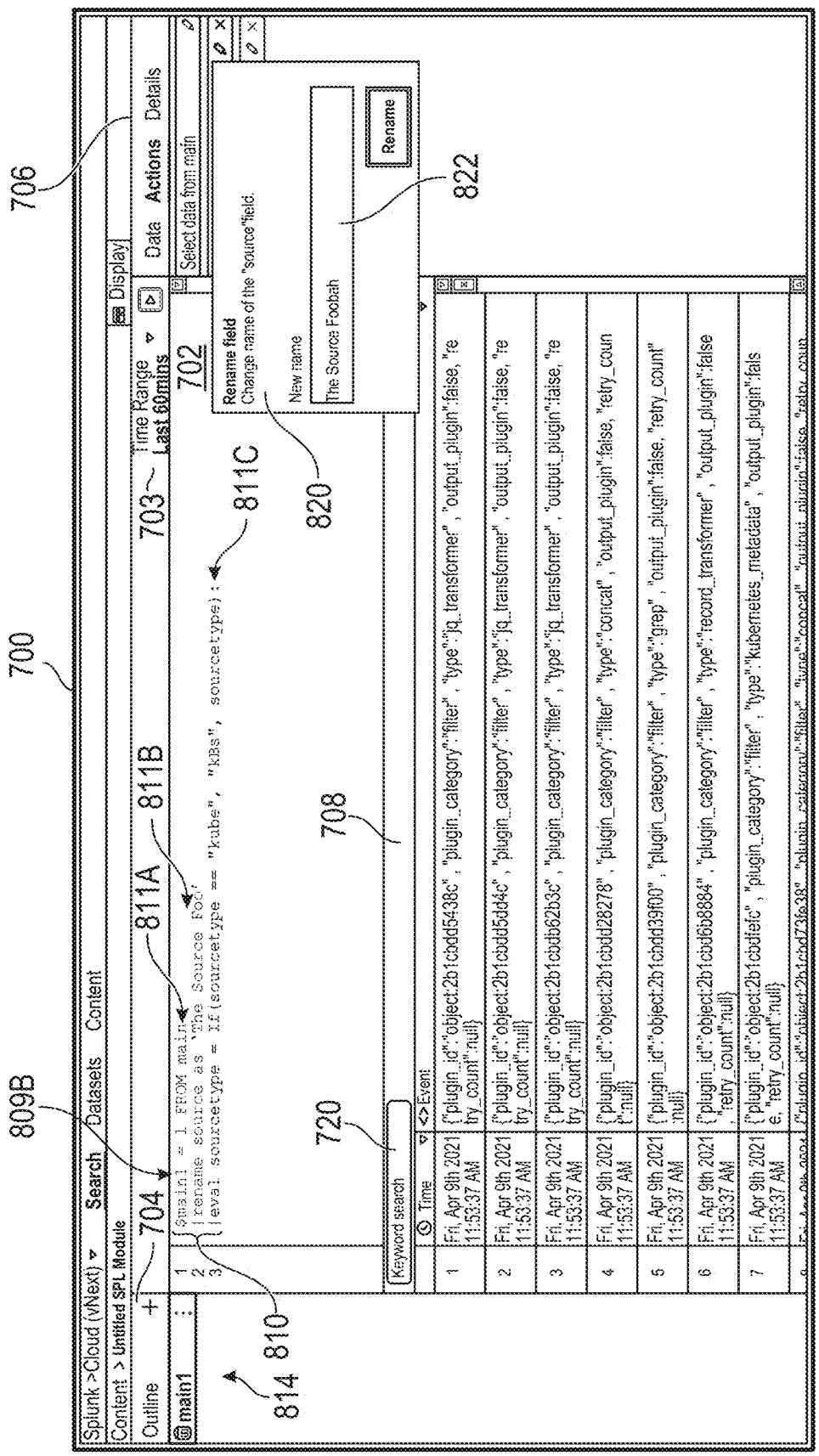
Figure 8D:
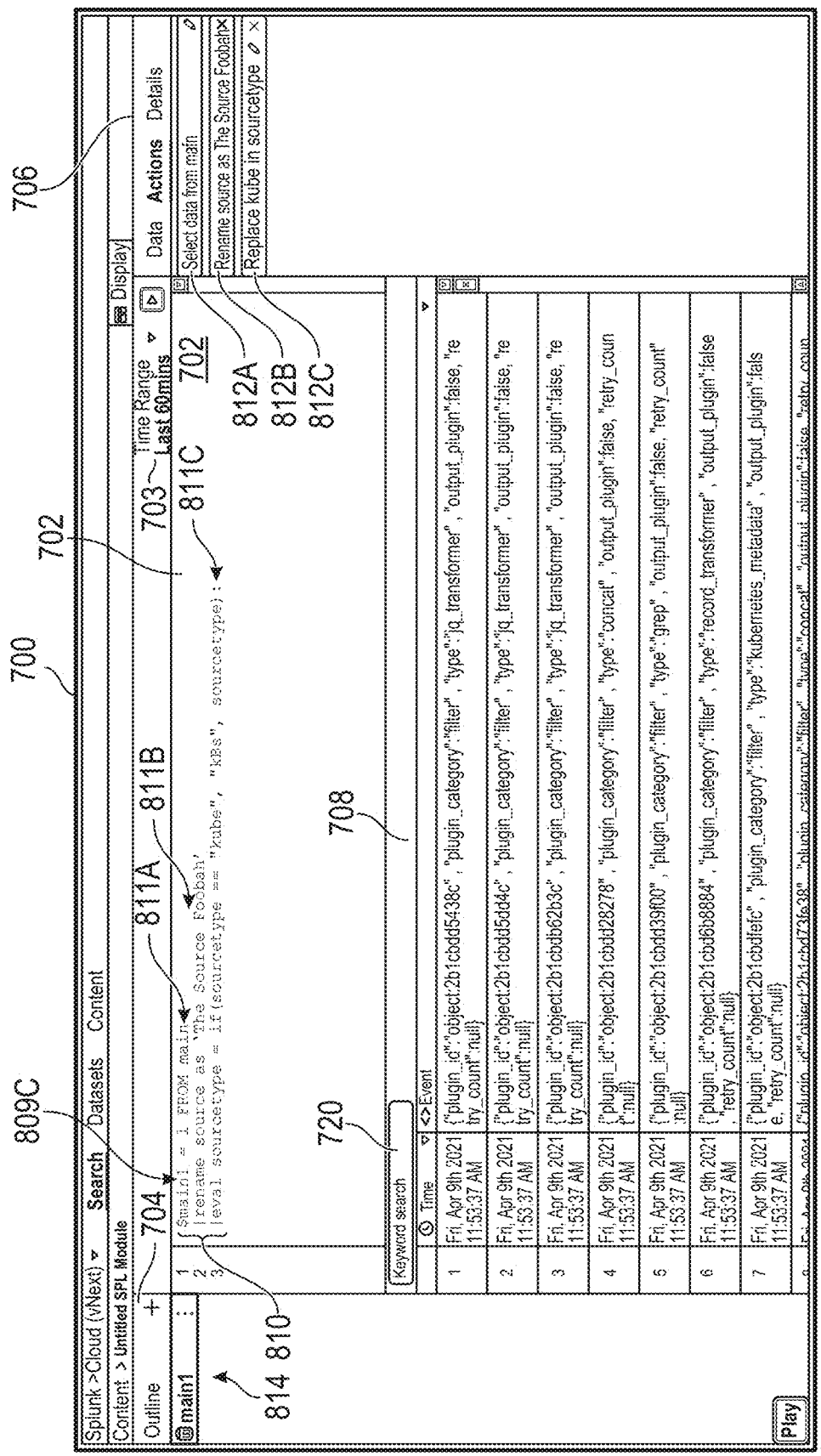

As described herein, changes to the models panel 706 may be reflected in the data processing package 510. FIGS. 8C and 8D illustrate an example of changes made to the data processing package 809B based on a user interaction with the models panel 706. Specifically, a user has clicked on an icon indicating they would like to modify the action model display object 812B, which results in the pop-up box 820 being displayed with the new name field 822. The user has entered "The Source Foobah" as the new name for the "source" field in the new name field 822.

Based on this interaction, the user interface system 502 may update the action model display object 812B with the new name and generate and communicate a package modification message to the semantic processing system 504 to modify the back-end data processing package 524. As described herein, the package modification message may include a copy of the command to be inserted in the data processing package 809B (including an identification of the statement associated with the command to be inserted), or parameters that may be used by the semantic processing system 504 to generate the command.

The semantic processing system 504 may process the package modification message. In this example, as part of processing the package modification message, the semantic processing system 504 may update the back-end data processing package 524, generate a data processing package model 526 based on the updated back-end data processing package 524, and respond to the user interface system 502 with a display modification message.

FIG. 8D is a diagram illustrating an example of the GUI 800 showing the results of the user interface system 502 processing the display modification message. Specifically, the display modification message may include edits for the data processing package 709B but may not include an updated data processing package model 526 given that the user interface system 502 may have already edited the models panel 706. The user interface system 502 may use the data processing package edits to update the data processing package 809B to data processing package 809C, initiate execution of the updated data processing package 809C, and display the updated search results in the search results panel 708.

In some cases, in response the interaction with the with the action panel 706, the user interface system 502 may not update the action model display object 811B. Instead, it may wait to update the action model display object 811B until it receives an updated data processing package model 526 from the semantic processing and generates and updated actions/statement models based on the updated data processing package model 526. In this way, the user interface system 502 may use a similar process path to update the action model display object 811B as with other updates.

The various systems and GUIs described herein may be used to generate a chart associated with a particular statement of a data processing package 510. To illustrate an example data flow for creating, displaying, and modifying a chart based on a data processing package, consider the following non-limiting examples in reference to FIGS. 9A-9I.

Figure 9A:
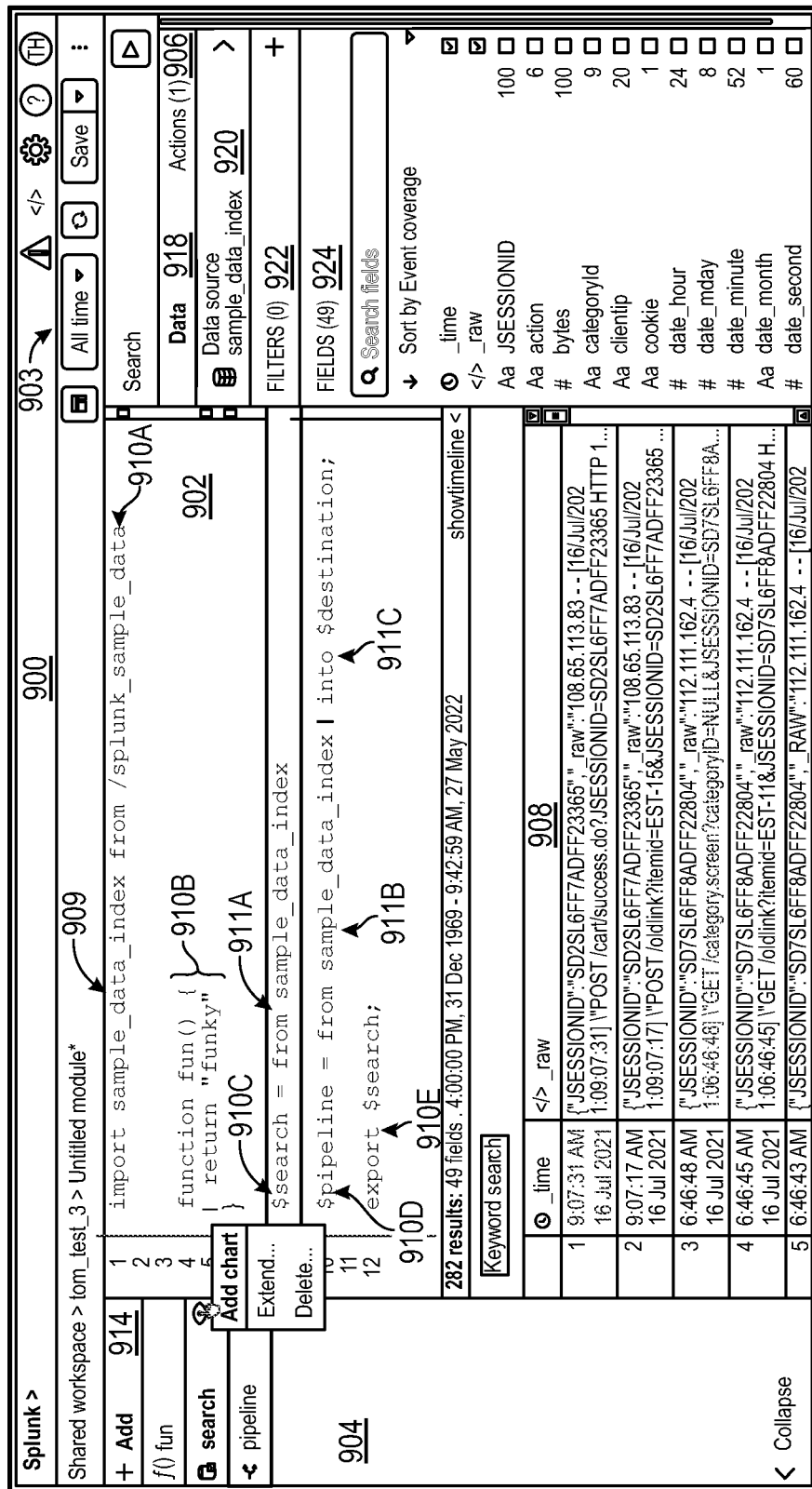

FIG. 9A illustrates an example of a GUI 900. The GUI 900 may be similar to GUI 700 and include a package editor panel 902, time range selector 903 to select a package time range to associate with one or more statements of the data processing package, outline panel 904, outline 914, search results panel 908, and data panel 918, any combination of which may be displayed concurrently in the GUI 900.

The package editor panel 902 displays a different data processing package 909 (non-limiting example of the displayed data processing package 510) than the GUI 700. Specifically, the data processing package 909 includes five statements 910A, 910B, 910C, 910D, 910E (individually or collectively referred to herein as statement(s) 910). In the illustrated example, the statements 910 are separated by multiple hard returns and/or a semi-colon, however, it will be understood that the statements 910 may be separated in a variety of ways as desired.

The first statement 910A is an import statement that includes a command that indicates from where data is to be imported as part of the data processing package 909 (e.g., identifies the data source from which to obtain the data that is to be processed). The second statement 910B is a function statement that includes one or more commands to execute a particular function. The third statement 910C is a search-related statement that includes a query command 911A to execute a search on at least some of the data referenced in the first statement 910A. The fourth statement 910D is a pipeline statement that includes a first command 911B to process at least some of the data from the source specified in statement 910A and a second command 911C to direct the results of processing the data to a particular destination. The fifth statement 910E is an export statement that includes a command to enable the export of results from the statement 910C.

The outline 914 may be generated using a data processing package model (which may be generated by the user interface system 502 or semantic processing system 504) that corresponds to the data processing package 909. Specifically, the outline 914 may reference (e.g., include an identifier for) some or all of the different statements 910. In certain cases, the outline 914 may include reference to search-related statements, pipeline statements, and/or function statements, but not other statements In the illustrated example, the outline 914 does not include a reference for the import statement 910A or the export statement 910E.

The outline 914 may also include status indicators for the different statement(s) 910 to indicate a status of the statements 910 and/or a status of the processing of data associated with the respective statements 910. The status indicators may include but are not limited to statement executed (and results received), statement in process of execution (e.g., search in progress or data being processed but results not received), and/or statement not executed (e.g., most recent version of statement has not been communicated to the data intake and query system 108 for execution and/or any results shown may be stale). In the illustrated example, the outline 914 indicates that the statement 910B and the statement 910D have not been executed and that the statement 910C has been executed and results have been received (as shown in the search results panel 908).

As the 910C is selected, the data panel 918 displays information related to the (selected) statement 910C. In the illustrated example, the data panel 918 includes a data source identifier 920 for the data source that was searched as part of the 910C. The data panel 918 also includes a filter section 922 that indicates fields that have been applied to the data (in the illustrated example no filters have been applied) and a fields section 924 that includes additional information about the data that was searched and/or processed.

The fields section 924 includes information about the quantity (49) and identity of data fields found in the data, data fields extracted (or extractable, e.g., using a regex rule) from the data, and/or other information that may be used to filter the data, such as keyword (the selection of which could result in a keyword filter being applied to the data), metadata associated with the data (e.g., host, source or sourcetype), and/or time (e.g., a timestamp associated with events of the data), etc.). The fields section 924 also includes a selector associated with each potential field that, if selected, may result in the display of that field in the search results panel 908 or a listing or highlight of a selected keyword. In the illustrated example, the data panel 918 uses different icons to indicate the type of data associated with the potential field, such as whether the field includes a numerical value (#), a string (Aa), time or raw machine data. As described herein, in some cases the additional information in the fields section 924 may be obtained by generating and executing one or more search-related statements or query commands using the data intake and query system 108.

The GUI 900 enables a user to generate a chart by selecting different data objects of the GUI 900. In the illustrated example, based on the selection of a display object associated with the statement 910C in the outline panel 904, the GUI 900 displays one or more options in association with the statement 910C. In the illustrated example, the GUI 900 displays the options of adding a chart based on the statement 910C, extending the statement 910C and/or deleting the statement 910C. Based on the selection of "add chart," the GUI 900 may provide one or more options to a user to generate a chart.

Figure 9B:
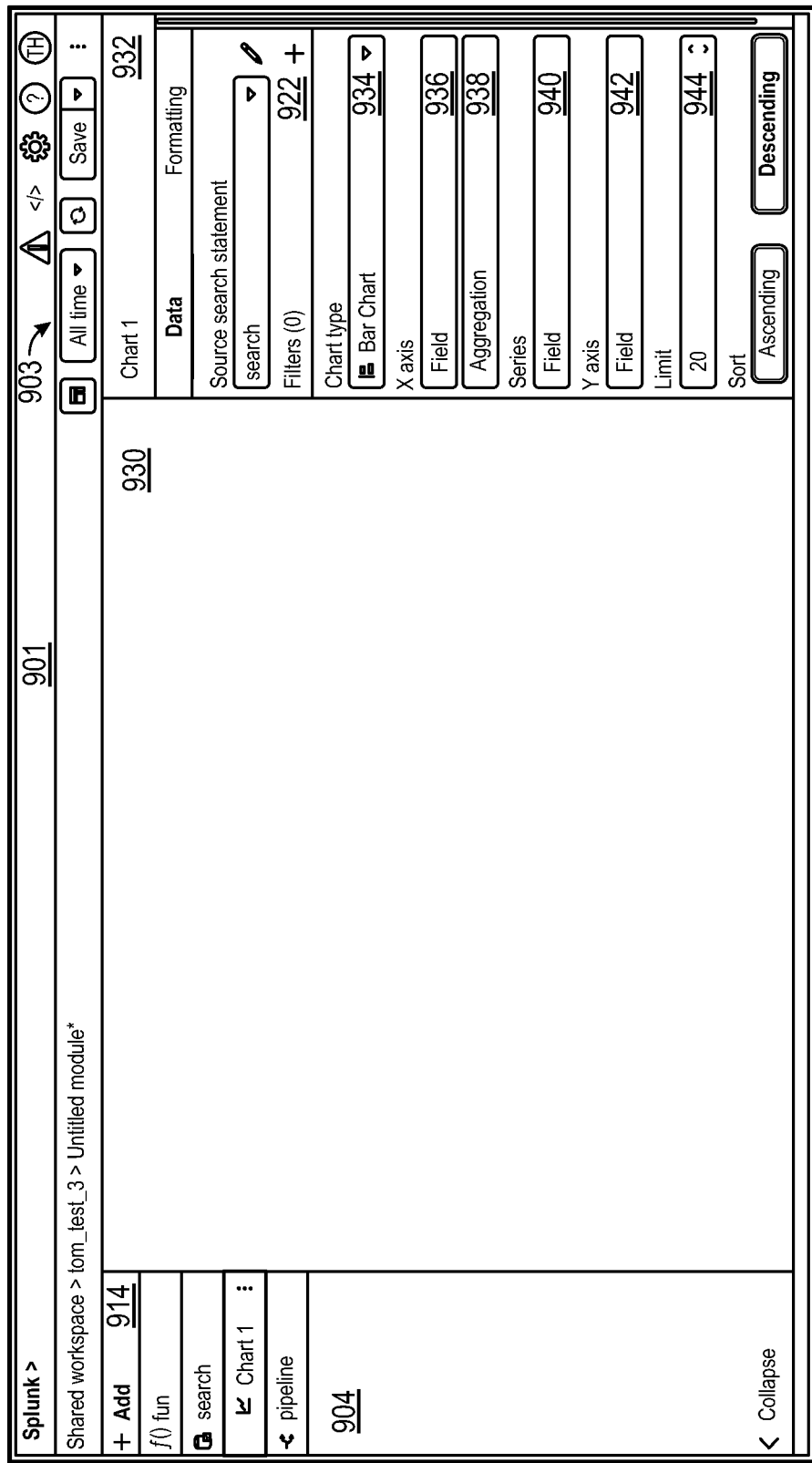

FIG. 9B illustrates an example of a GUI 901 that may be generated based on the selection of the "add chart" in GUI 900. The GUI 901 may be viewed as a progression from or an update to the GUI 900 based on a user interaction in the GUI 900. In the illustrated example, the GUI 901 includes the outline panel 904, a chart panel 930, and a chart parameter panel 932, any combination of which may be displayed concurrently in the GUI 901 or GUI 900. The chart panel 930 may be used to display the chart once generated and the chart parameter panel 932 may be used to select and/or modify one or parameters used to generate the chart (also referred to herein as chart parameters).

Based on the selection to "add chart," the user interface system 502 updates the outline panel 904 to indicate a chart related to the statement 910C is being added. As data for the chart has not been obtained, a status indicator for the chart indicates that the related tasks have not been initiated or completed and/or the chart is not ready for generation/display.

In some cases, although the outline panel 904 is updated, the data processing package 909 (or corresponding back-end data processing package 909) may not be updated. For example, in some cases, the user interface system 502 may track the various properties or parameters of the chart without updating the data processing package 909 (and/or communicating with the semantic processing system 504). In this way, the user interface system 502 may enable a user to use/modify a chart without editing the underlying data processing package 909. In some cases, this may be done as part of a view mode such that a user is able to interact with a chart without changing the underlying data processing package 909. Put another way, a user generating a chart may be granted read-only access to the data processing package 909. As such, any changes to the chart may not be saved or accessed after a user has exited the GUI 900.

In certain cases, the data processing package 909 and/or a corresponding back-end data processing package 909 may be updated as changes are made and/or once a search is executed. In this way, the semantic processing system 504 may track how a user is interacting with data associated with the data processing package 909.

The chart parameter panel 932 presents a user with various options to generate a chart that is associated with the statement 910C. In the illustrated example, the chart parameter panel 932 includes a filter section 922 that indicates filters applied (or to apply) to the data for the chart and a number of interactive fields 934-944 to enable a user to select one or more parameters for the chart, including a chart type and one or more filters to apply to the data.

The interactive fields include a chart type field 934, an X axis field selection field 936, aggregation field 938, series field 940, Y axis field selection field 942, and a limit field 944. Fewer, more, or different interactive fields may be used as desired. Moreover, the fields may provide drop down menus and/or enable a user to select options. In some cases, based on selections within the GUI 901 may provide the user with additional interactive fields and/or options.

The chart type field 934 enables a user to select the type of chart for the chart. The X axis field selection field 936, enables a user to select a parameter (e.g., data field, keyword, or other type of data that may be used to group events or used in conjunction with a function) to use to group events on the X-axis of the chart. The aggregation field 938 enables a user to select a function to execute on events. The series field 940 enables a user to select a parameter (e.g., data field, keyword, or other type of data that may be used to group events) to determine a series for the events. The Y axis field selection field 942, enables a user to select a parameter (e.g., data field, keyword, or other type of data that may be used to group events) to use to group events on the Y-axis of the chart. The limit field 944 enables a user to apply one or more limits to the amount of data, the size of the chart, steps for the chart, or other limit to the chart. As a user interacts with the different options or interactive fields, the GUI 901 may provide the user with various options. For example, depending on the type of chart and/or data fields selected for different interactive fields, the chart parameter panel 932 may include fewer, more, or different interactive fields.

Figure 9C:
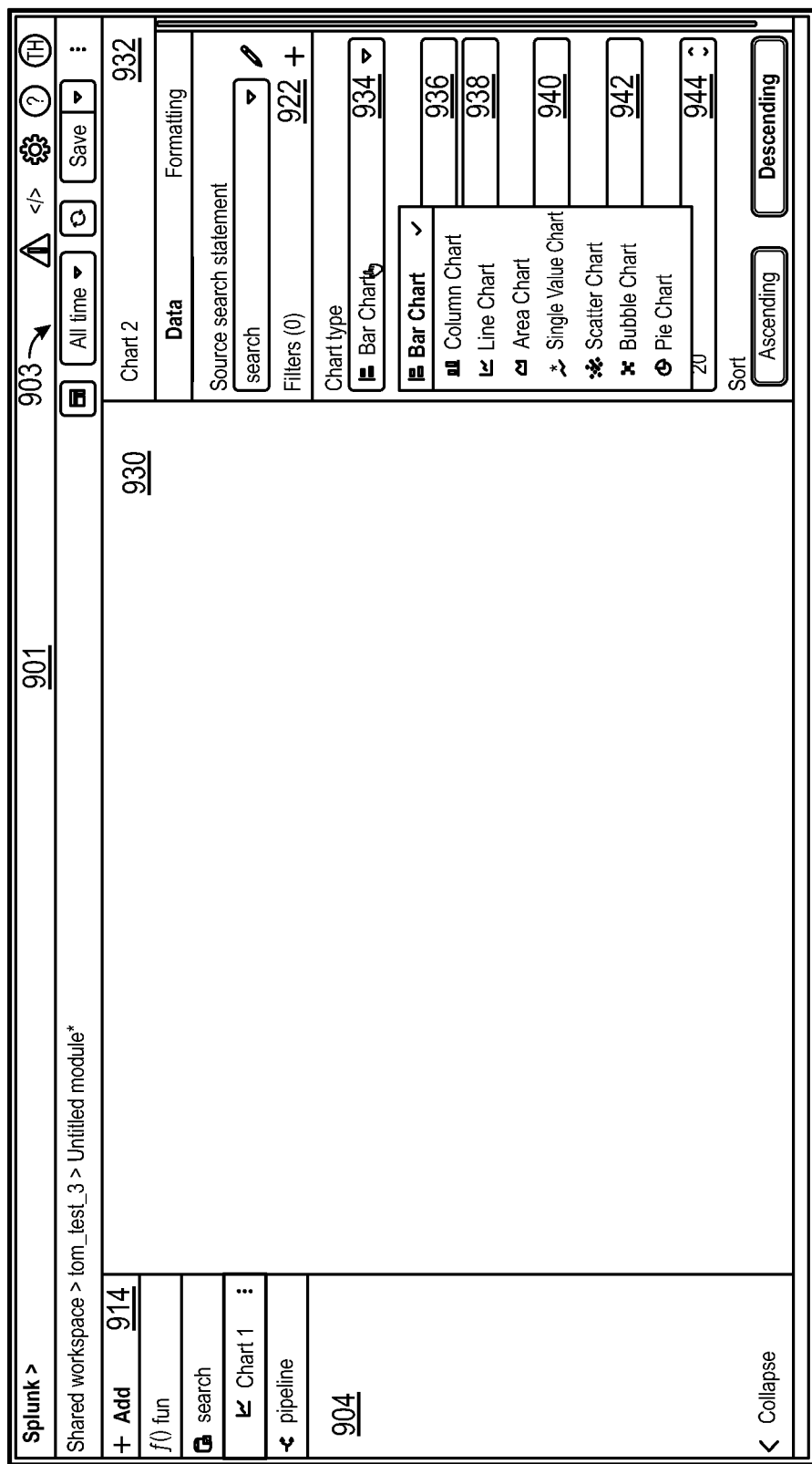

FIG. 9C illustrates an example of the GUI 901 showing options for different types of charts based on an interaction with the chart type field 934. In the illustrated example, the GUI 901 provides a drop-down menu that enables a user to select between a number of different kinds of charts including, but not limited to, bar chart, column chart, line chart, area chart, single value chart, scatter chart, bubble chart, pie chart, etc. The provided charts may be based on a predetermined selection of charts that the user interface system 502 is configured to provide data for. In some cases, the selection may be retained by the user interface system 502 (and may or may not be communicated to the semantic processing system 504 or used to update the data processing package 909). In certain cases, the user interface system 502 may communicate the selection to the semantic processing system 504 or other system.

Figure 9D:
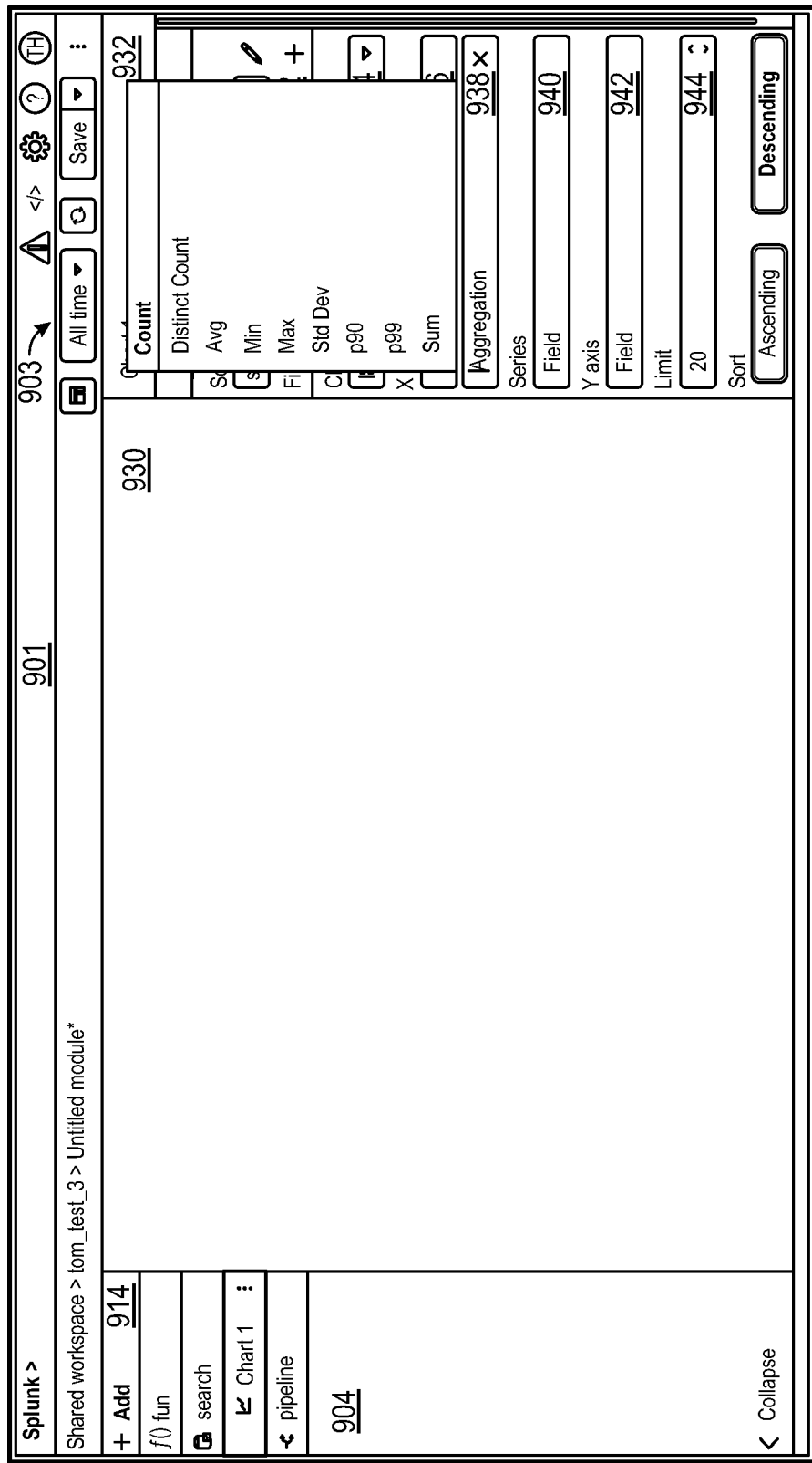

FIG. 9D illustrates an example of the GUI 901 showing options for different command tokens based on an interaction with the aggregation field 938. In the illustrated example, the GUI 901 enables a user to select or type a command token corresponding to a command (e.g., function) that may be used to further process or aggregate the data of the statement 910C. In some cases, the GUI 901 may highlight or suggest command tokens based on the data. In the illustrated example, the GUI 901 shows available command tokens based on what the user has typed in the aggregation field 938, and includes the following command tokens which correspond to different commands or functions: count, distinct count, average, minimum, maximum, standard deviation, p90, p99, sum, etc. It will be understood that fewer, more or different command tokens may be presented or selected.

In some cases, the command tokens available to the user may be based on one or more command tokens in the statement 910C and/or one or more administrator-selected limitations. For example, if the statement 910C indicates that a particular command token is to be applied to the data, the aggregation field 938 may be limited to showing those command tokens as available for use. As such, the options and/or parameters for the chart may be limited based on the statement 910C. Moreover, an administrator for a user (e.g., in a view mode) may limit command tokens available to process the data.

Figure 9E:
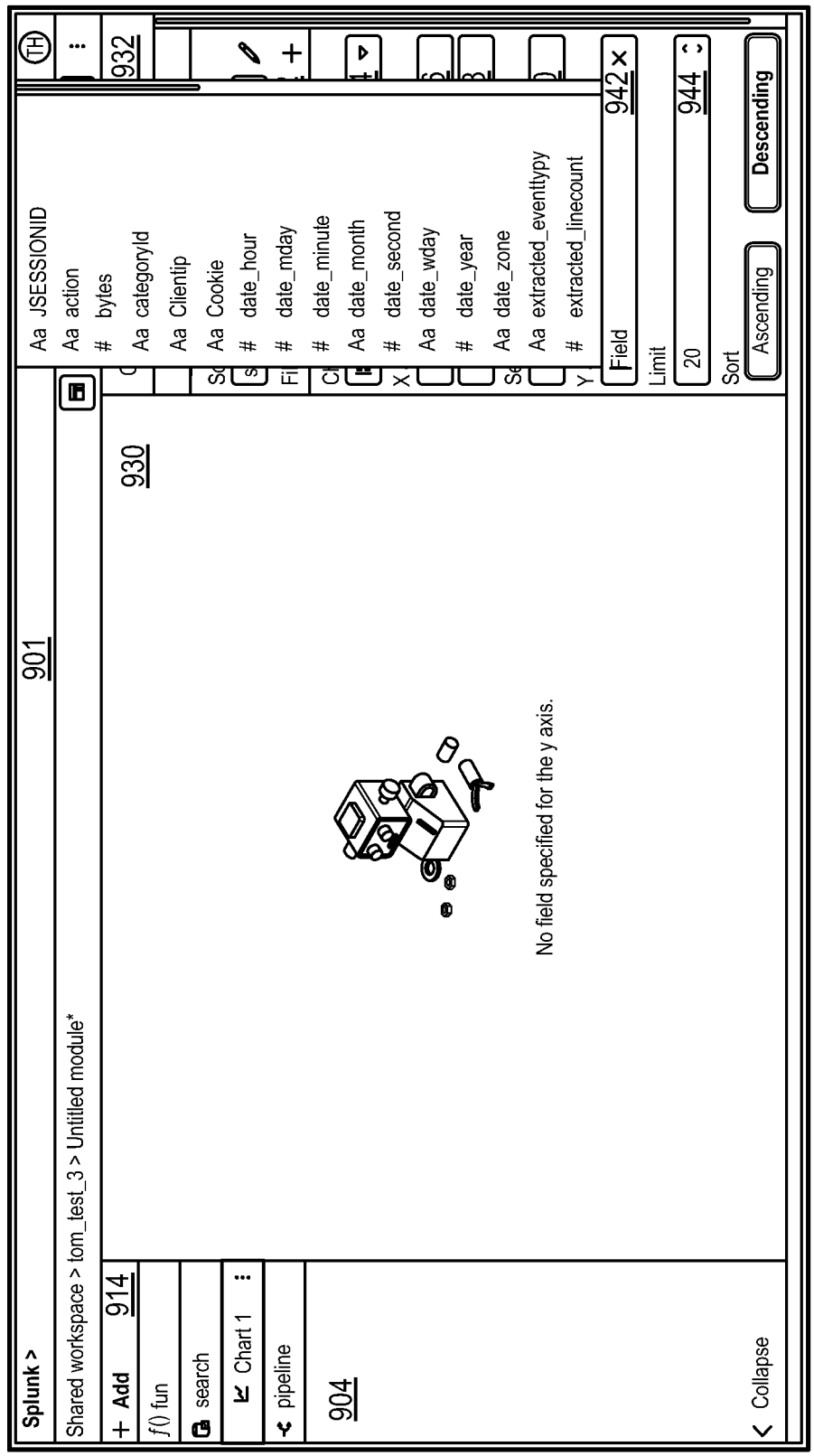

FIG. 9E illustrates an example of the GUI 901 showing options provided to a user when interacting with the Y axis field selection field 942. In the illustrated example, the GUI 901 enables a user to select or type a parameter (e.g., keyword, data field, number, etc.) to use to group the data. The options may be determined from the data itself. For example, the options may be provided based on one or more queries on the data or other information known about the data, such as, metadata associated with the data (e.g., host, source, sourcetype), data fields found in or extracted from the data (or data fields typically found in data), keywords of the data, numerical values from the data, etc.). The options may also indicate the type of data to be returned (e.g., numerical or a string).

Figure 9F:
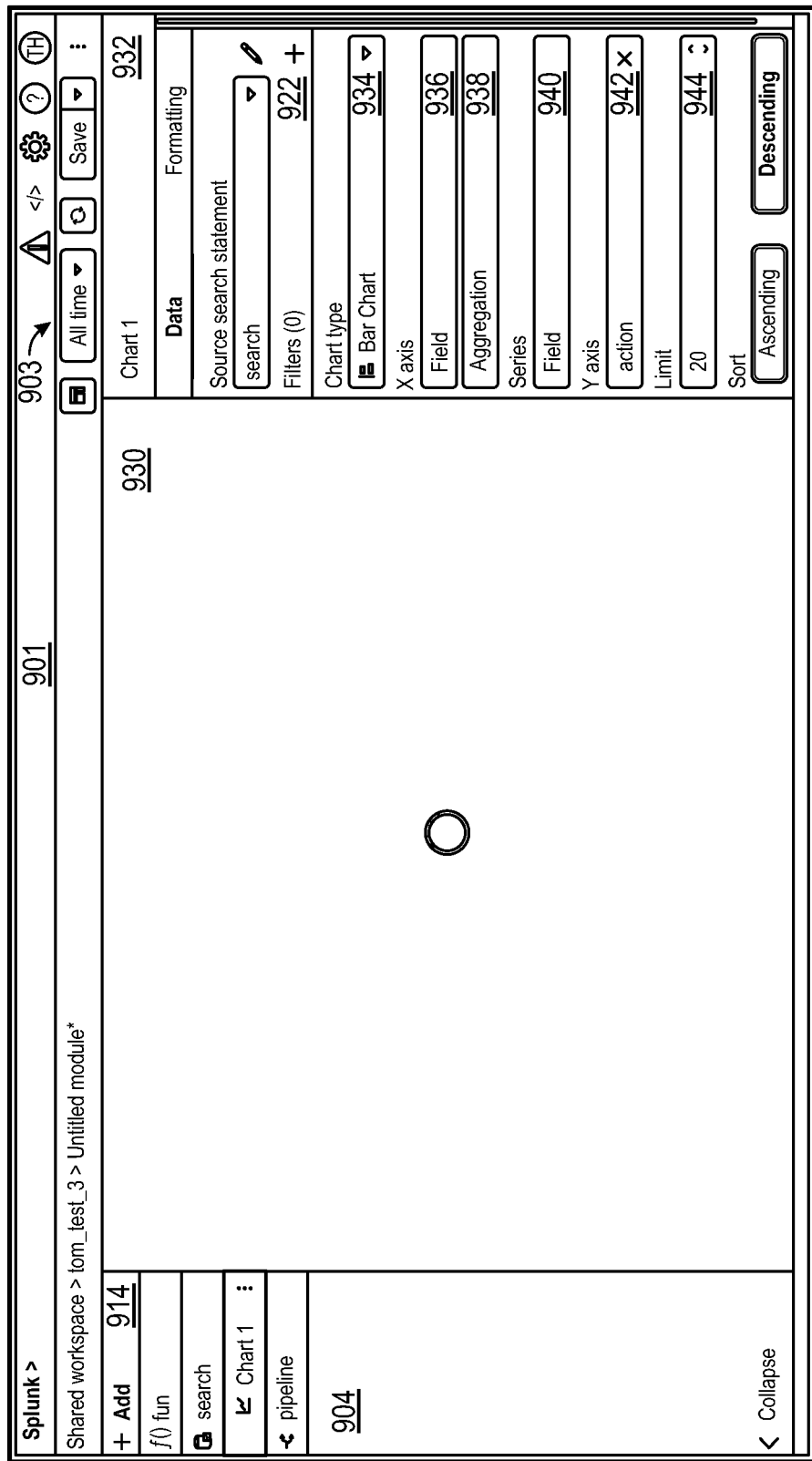

FIG. 9F illustrates an example of the GUI 901 once the parameters are selected in FIGS. 9C-9E. In certain cases, the GUI 901 of FIG. 9D may appear as a result of a user interacting with a display object associated with execution of the data processing package (e.g., a user selecting a "execute search" button or "execute data processing package" button). The selected parameters for the chart are shown in the chart parameter panel 932. Moreover, as the user interface system 502 has initiated execution of the data processing package 909 (e.g., by communicating it to the data intake and query system 108), the status indicator in the outline 914 associated with the statement 910C and the chart have been updated to indicate that a search is being executed and/or data is being retrieved/processed.

In some cases, once the user interface system 502 determines that the chart is ready to be generated (e.g., the relevant parameters have been received and/or an indication to execute has been received), the user interface system 502 may use the statement 910C and the selected parameters to generate a search-related statement. In some cases, a search-related statement generated using another search-related statement may also be referred to a child search-related statement, and the search-related statement used to generate the child search-related statement may be referred to a parent search-related statement. Similar to a parent-child relationship, a child search-related statement may inherit one or more parameters of the parent search-related statement, such as but not limited to a time range associated with the parent search-related statement (which may be a default or package time range or a statement time range specific to the parent search-related statement or shared with other search-related statements), administrative properties or limits (e.g., search size, time, frequency, etc.).

In the illustrated example, the user interface system 502 may use the statement 910C ("$search=from sample_data_index"), the command token "count" (selected from the aggregation field 938), and the field "action" (selected from the Y axis field selection field 942) to generate a search-related statement. Specifically, the selection of "count" in the aggregation field 938 may indicate that a count command is to be used and the selection of "action" in the Y axis field selection field 942 may indicate that events (or other data) are to be counted based on the field value for the "action" field. Accordingly, the user interface system 502 may generate a search-related statement such as "$chart1=| from $search|stats count( ) by action;" indicating that data from 910C is to be further processed by counting events based on the action field.

Once generated, the user interface system 502 may communicate the search-related statement to the data intake and query system 108. In certain cases, the user interface system 502 communicates some of the statements 910 to the data intake and query system 108. In some such cases, the user interface system 502 may identify the statements 910 that have been modified since the last execution, that include outdated data, or that have an indication of not executed or outdated. In certain cases, the user interface system 502 communicates the statements 910 that are affected by the user's interaction with the GUI 900 or GUI 901.

In some cases, the user interface system 502 communicates the generated search-related statement by appending it to the data processing package 909, and communicating the (entire) data processing package 909 to the data intake and query system 108. In some such cases, the data intake and query system 108 may determine which search-related statements to execute from the data processing package 909 For example, the data intake and query system 108 may determine that searches should be executed for (only) search-related statements that indicate a change has been made. In some cases, the data intake and query system 108 executes a search for all of the search-related statements regardless of whether there was a change.

In some cases, the user interface system 502 appends the generated search-related statement to the data processing package 909 to form an enriched data processing package 909. The enriched data processing package 909 may be referred to as a transitory data processing package in that it may be stored in volatile memory and/or not saved to non-volatile memory, not sent to the semantic processing system 504, and/or not used to generate a data processing package model 526. Accordingly, in some such cases, the semantic processing system 504 may not have awareness of the search-related statement associated with the chart.

Figure 9G:
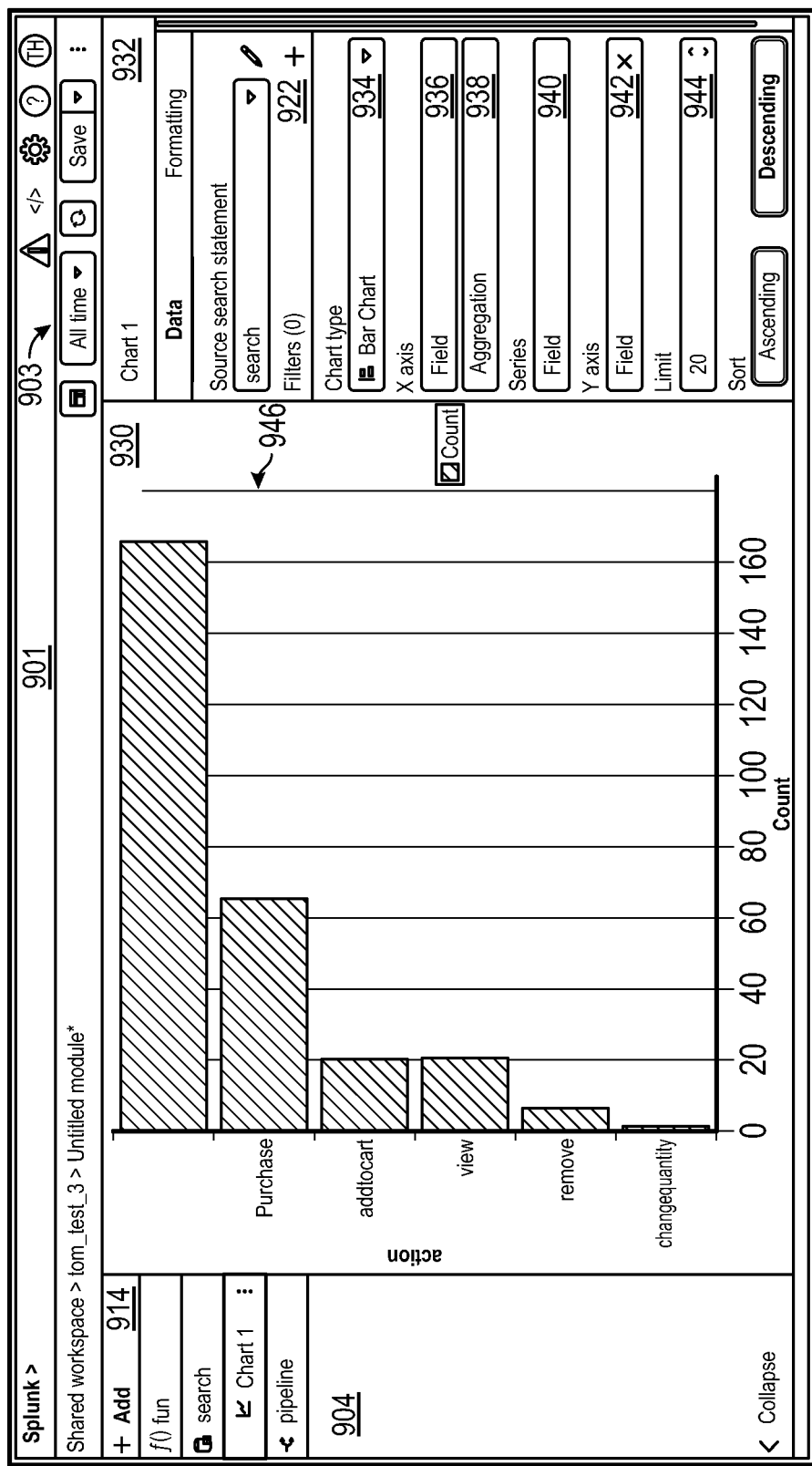

FIG. 9G illustrates an example of the GUI 901 once the results of the generated search-related statement are received. As shown, based on the generated search-related statement and time range indicated in the time range selector 903, the data from the data source sample_data_index over the time period "all time" was counted based on the field action such that events with the same field value for the action field were grouped together. The results are displayed as a (bar) chart 946 in the chart panel 930.

A user may interact with the chart 946 and change one or more parameters of the chart 946 using the chart parameter panel 932, as shown and described in FIGS. 9C-9E. Any changes to a parameter may cause the user interface system 502 to update the status indicator of the affected chart and/or the search related statement 910C, cause the user interface system 502 to generate an enriched data processing package 909 based on the updated parameters, communicate the enriched data processing package 909 to the data intake and query system 108, receive results, and display the results in the chart panel 930. In some cases, such as where the first enriched data processing package 909 is not saved, the user interface system 502 may generate the second data processing package 909 from the statement 910C in the package editor panel 902. In cases where the enriched data processing package 909 is retained or stored (e.g., enriched search-related statement is added to and retained with the data processing package 909), the previously generated search-related statement may be used to generate the new search-related statement (as opposed to the search related statement 910C).

Figure 9H:
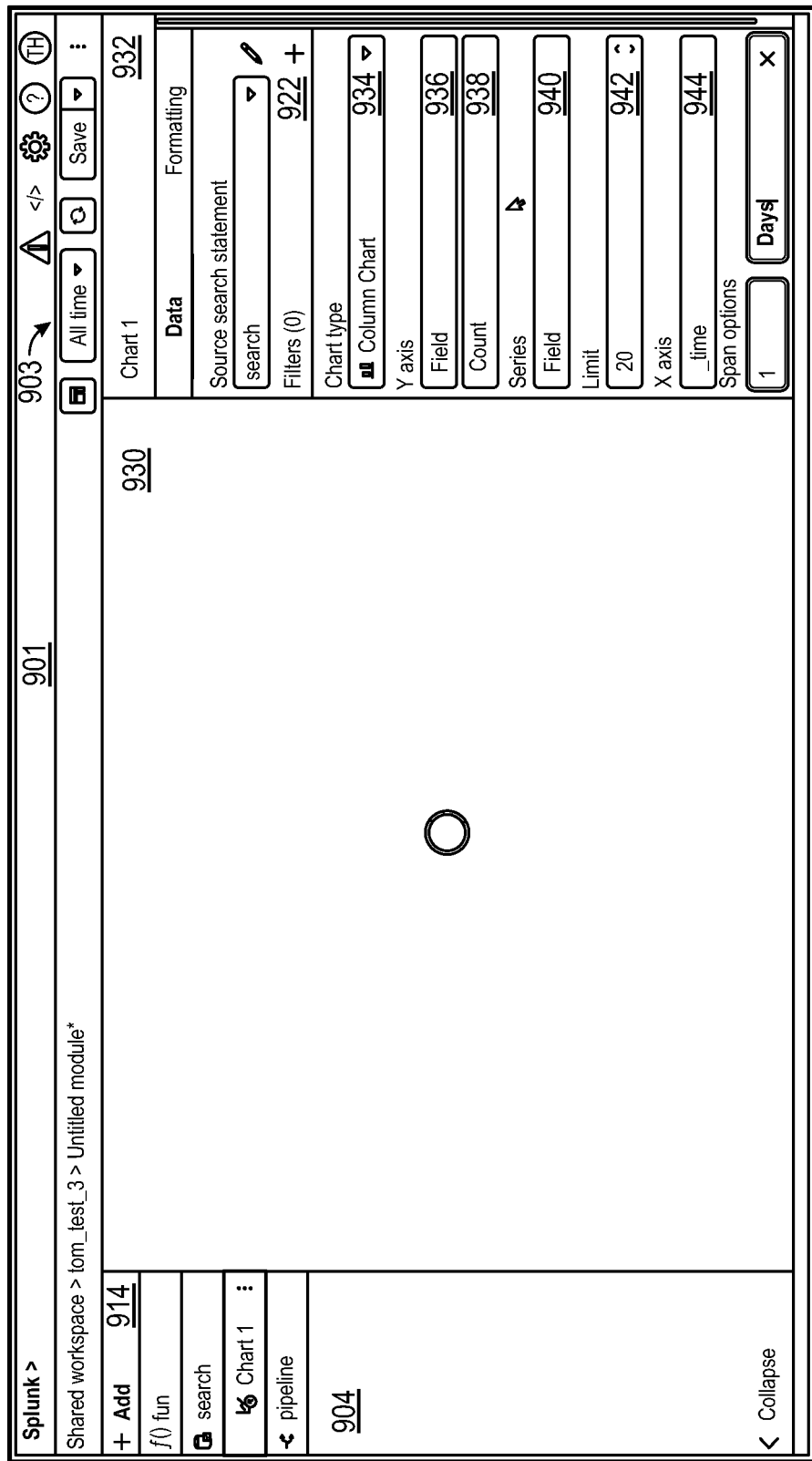

As illustrated in FIG. 9H, a user has modified the parameters of the chart 946 using the chart parameter panel 932, including using the chart type field 934 to change the chart to a "column chart" and using Y axis field selection field 942 to change the data field used to combine results to "time." Based on the selection of "_time," the chart parameter panel 932 provides additional interactive fields or span options fields 948A, 948B to enable a user to select a time range by which to group the data. The unit quantity field 948A enables a user to select the quantity of units by which to group the data and the unit type field 948B enables a user to select the units of time to group the data (e.g., second, minute, hour, day, etc.). Accordingly, it will be understood that one or more interactive fields may be added or removed from the chart parameter panel 932 based on the chart type, data field, and/or command token selected in another interactive field.

Figure 9I:
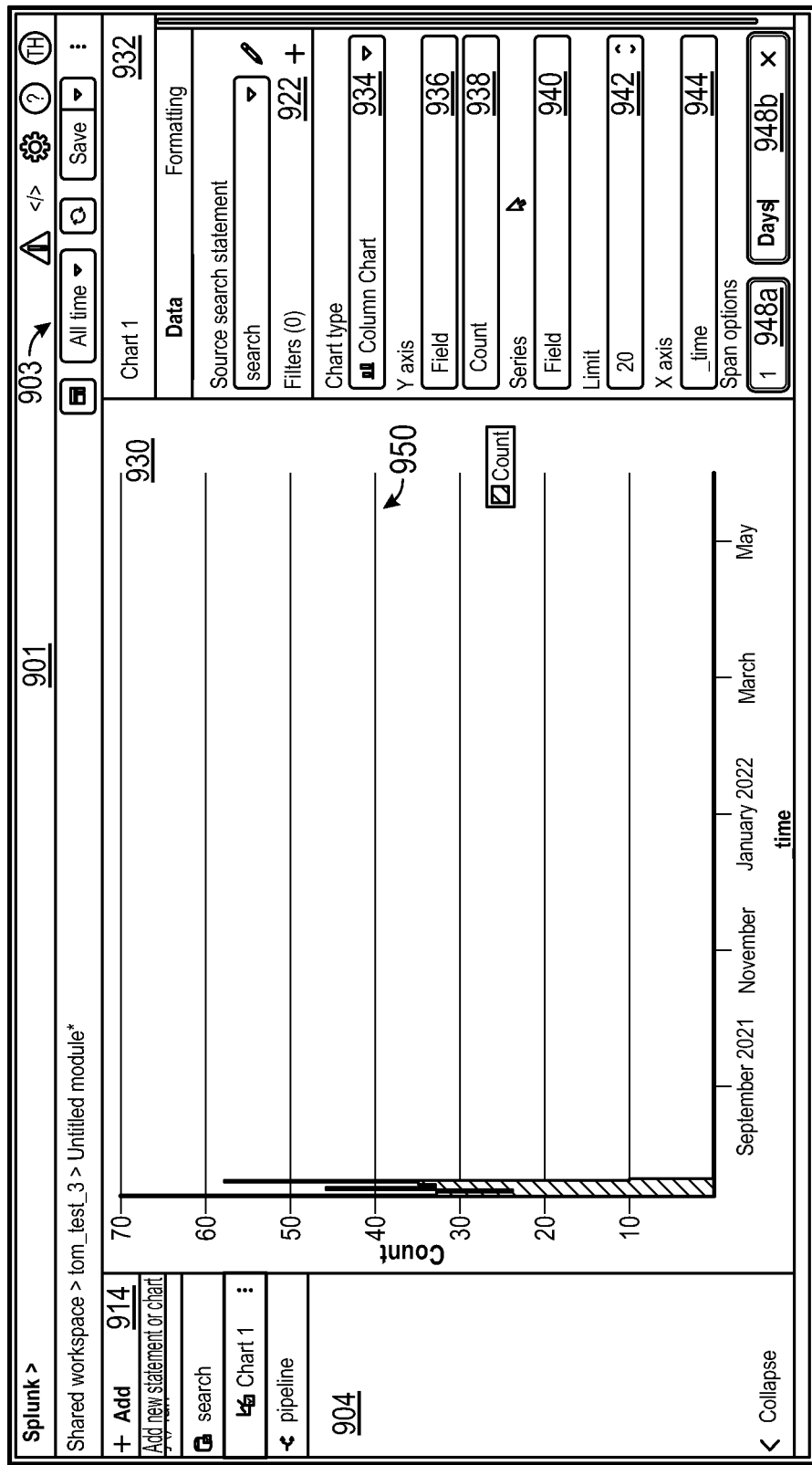

Based on the changes in the chart parameter panel 932, the user interface system 502 generates a new enriched data processing package 909 using the statement 910C and the parameters selected using the chart parameter panel 932. For example, based on the selections, the user interface system 502 may generate the following search-related statement "$chart1=| from $search|timechart span=1d count( );" and append the generated search-related statement to the data processing package 909 to form a second enriched data processing package 909, communicate the enriched data processing package 909 to the data intake and query system 108, and use the received results to populate a new (column) chart 950 as shown in FIG. 9I. As described herein, in some cases, the user interface system 502 may communicate some of the statements from the data processing package (e.g., the statements affected by the changes made in the chart parameter panel 932 or statements that have been modified since the last time an enriched data processing package was generated).

The aforementioned functionality may enable a user to create, modify, and/or use an interactive chart without having to know or understand the relevant query language. In addition, the aforementioned functionality may enable the user to interact with charts without affecting the underlying search-related statements or data processing package 510. In this way, the user may view and review the data in a variety of ways without affecting the search-related statements (or data processing package 510) used to obtain and process the data.

Moreover, the functionality may be used by an administrator to enable users to interact with charts without affecting the underlying search-related statements or data processing package 510. For example, an administrator may create a chart and provide the chart to a user in a "view-only" environment. Within the environment, the administrator may enable the user to view one or more charts and parameter panels similar to the charts 946 and 950 and the chart parameter panel 932 shown in FIG. 9G and FIG. 9I. Thus, the administrator may enable the user to modify certain parameters of the chart to view the data in different ways. For example, the administrator may enable the user to modify any one or any combination of type of chart, command token corresponding to a command or function to perform on events associated with chart, fields to use to group events associated with the chart, time ranges to use to group events, etc. Thus, the user may be able to analyze the data in a variety of ways using the chart.

The administrator may also limit which parameters may be modified by the user and/or apply other criteria to control what a user may do. For example, the administrator may apply a limit as to the amount of data that may be searched when a user makes changes to the chart, etc. As the user makes changes, the user interface system 502 may generate search-related statements and append them to the data processing package 510 to form an enriched data processing package 510, and communicate the enriched data processing package 510 to the data intake and query system 108. In this way, changes to the parameter of the chart may not affect the underlying data processing package 510 yet the user may be able to have an interactive experience with the chart. Moreover, changes by the user may result in real-time searches of the data and/or result in searches of data that were not previously searched (e.g., by changing the time range).

The various systems and GUIs described herein may be used to modify a time range for a particular statement of a data processing package (e.g., without affecting the time range associated with other statements) and/or a particular chart associated with a particular statement (e.g., without affecting the time range associated with the particular statement or other charts). To illustrate an example of the data flow for applying different time ranges to different statements and charts, consider the following non-limiting examples in reference to FIGS. 10A-10I.

Figure 10A:
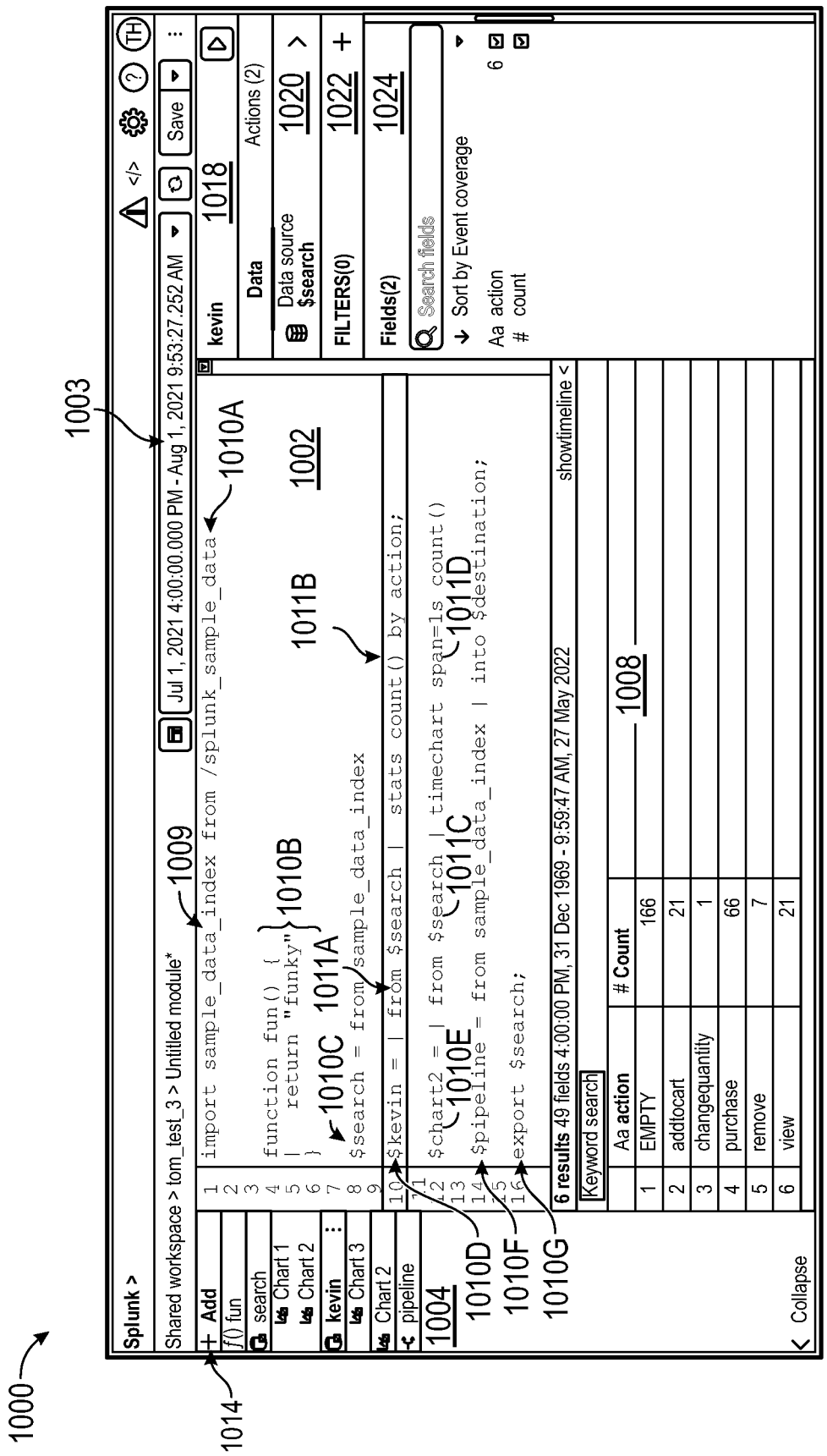

FIG. 10A illustrates an example of a GUI 1000. The GUI 1000 may be similar to GUI 900 and includes a package editor panel 1002, time range selector 1003, outline panel 1004, outline 1014, search results panel 1008, and data panel 1018 that includes a data source identifier 1020 ($search), filter section 1022 and a field section 1024 showing information related to the data generated from the selected statement 1010 (identified as "kevin"), including that there are two fields associated with the data (quantity of count and action).

The package editor panel 1002 displays a different data processing package 1009 (non-limiting example of the displayed data processing package 510) than the package editor panel 902. Specifically, the data processing package 1009 includes second statements 1010A (similar to statement 910A), 1010B (similar to statement 910B), 1010C (similar to statement 910C), 1010D, 1010E 1010F (similar to the statement 910D), 1010G (similar to the statement 910E) (individually or collectively referred to herein as statement(s) 1010). In the illustrated example, the statements 1010 are separated by multiple hard returns and/or a semicolon, however, it will be understood that the statements 1010 may be identified or separated in a variety of ways as desired.

The added statements relative to the data processing package 909, e.g., statement 1010C and statement 1010E, are search-related statements that include multiple query commands 1011A, 1011B and commands 1011C, 1011D, respectively to search and process data in different ways.

Given the differences in the data processing package 909 and data processing package 1009, the outline 1014 differs from the outline 914. Reference to three charts created from the statement 1010 are displayed in the outline 1014 (two charts from the statement 1010C and one chart from the statement 1010D). The status indicators in the outline 1014 for the charts and statements 1010 indicate that the data is up to date (e.g., searches executed and results returned).

The time range selector 1003 reflects the default time range (or package time range) used for the statement 1010 or at least the search-related statements of the statement 1010. As described herein, when searches are to be executed, the time range reflected in the time range selector 1003 may be appended to the data processing package 1009 and/or to the individual statements 1010. The data intake and query system 108 may use the time range to determine which data is to be searched and processed. Thus, the time range may be used as a filter when executing the different search-related commands.

Figure 10B:
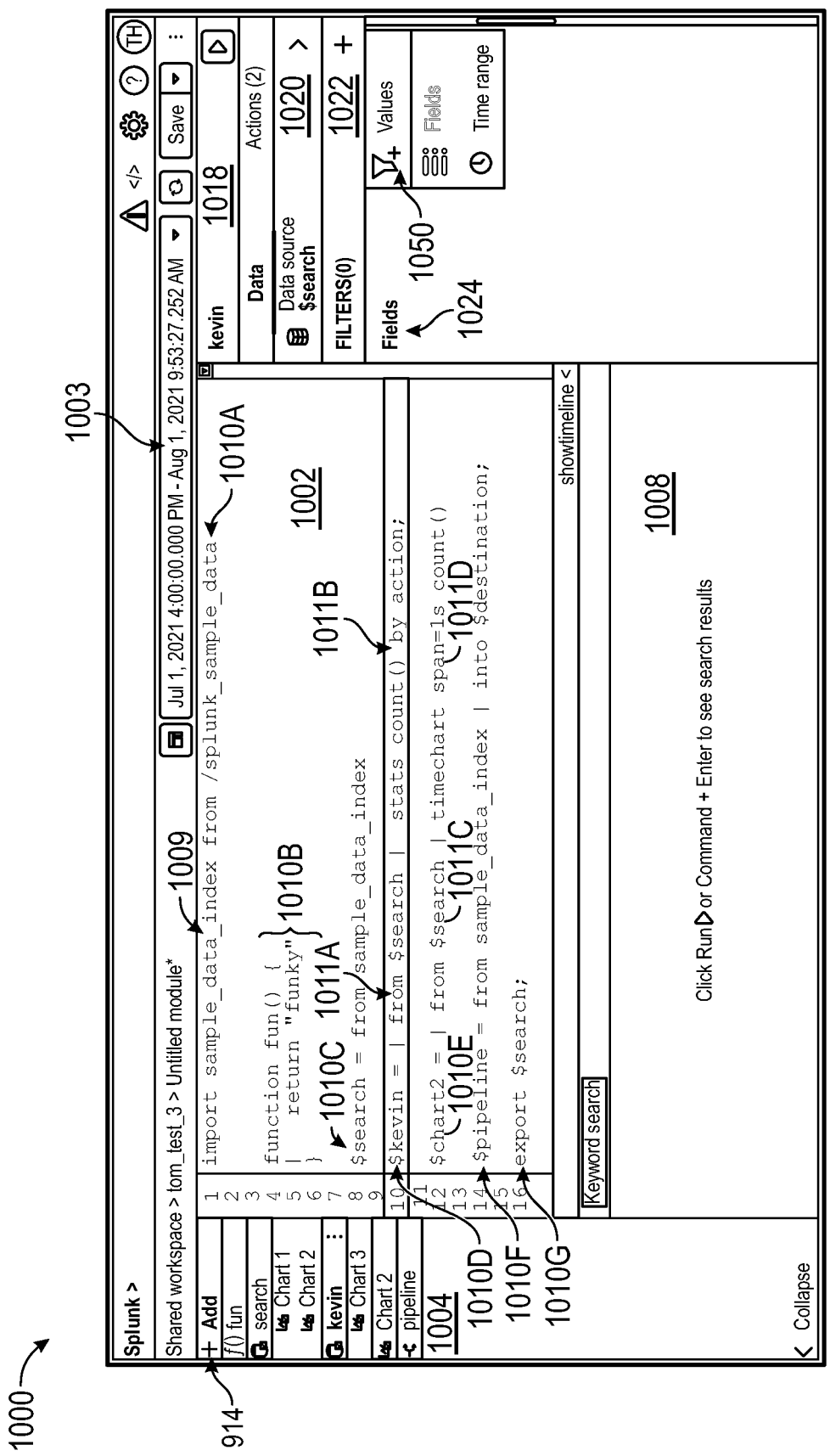

FIG. 10B illustrates an example of the GUI 1000 based on an interaction (e.g., click, hover, select) with a display object associated with the filter section 1022 to apply one or more filters to the data associated with the statement 1010D. In response to the interaction, the user interface system 502 generates a pop-up GUI window 1050 within the GUI 1000 (and within the data panel 1018) that shows various options by which a user may apply a filter to the data of the statement 1010D and/or modify a time range associated with the statement 1010D.

Figure 10C:
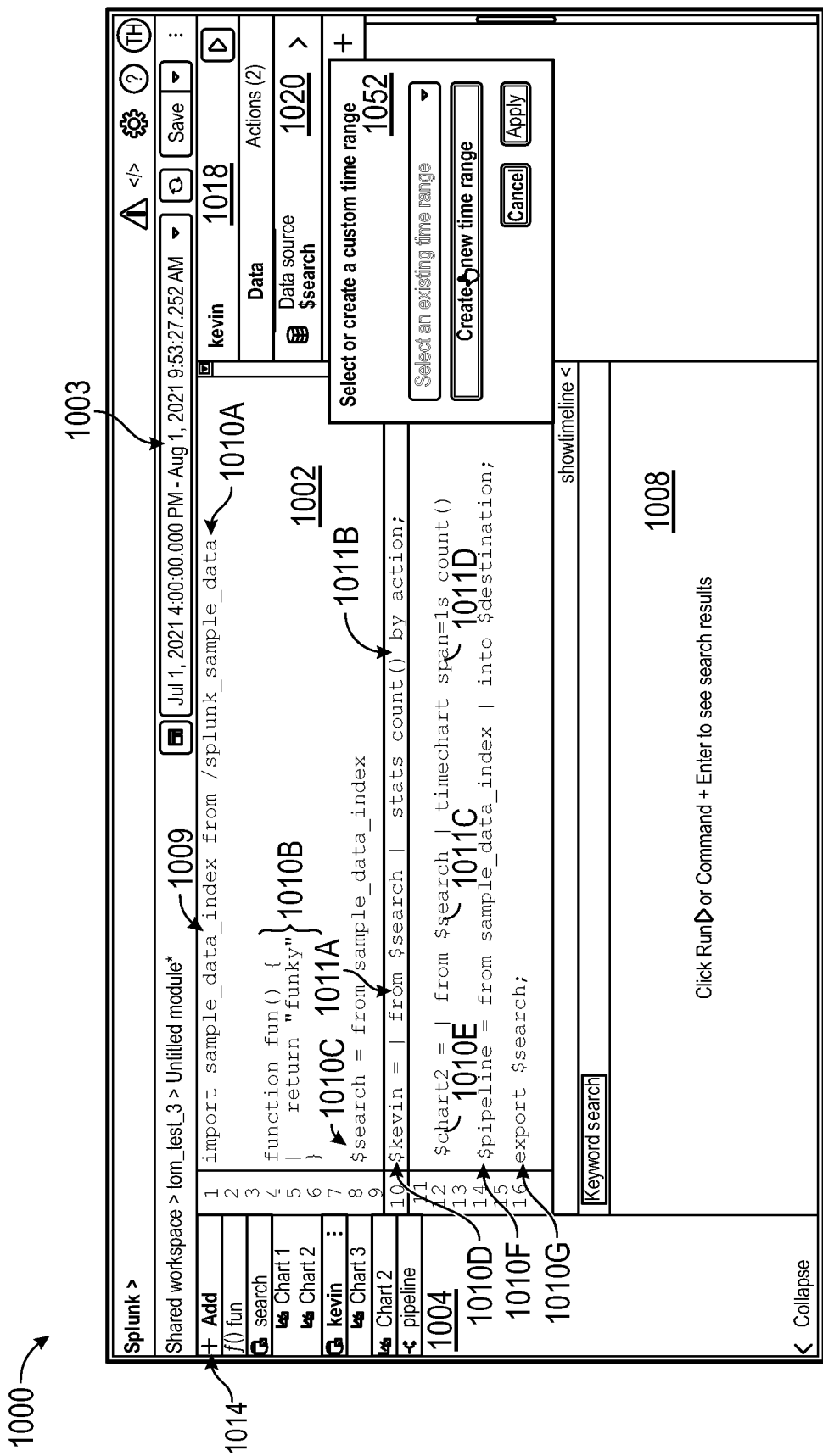

FIG. 10C illustrates an example of the GUI 1000 based on an interaction with a display object in the GUI window 1050 to modify a time range associated with the statement 1010D. In response to the interaction, the user interface system 502 generates a second pop-up GUI window 1052 within the GUI 1000 within the data panel 1018 (and removes the first GUI window 1050). The second pop-up GUI window 1052 shows various options by which a user may modify a time range associated with the statement 1010D. For example, the pop-up GUI window 1052 enables the user to select an existing time range (e.g., preselected time ranges and/or being used for different statement 1010) and/or to create a new (custom) time range.

Figure 10D:
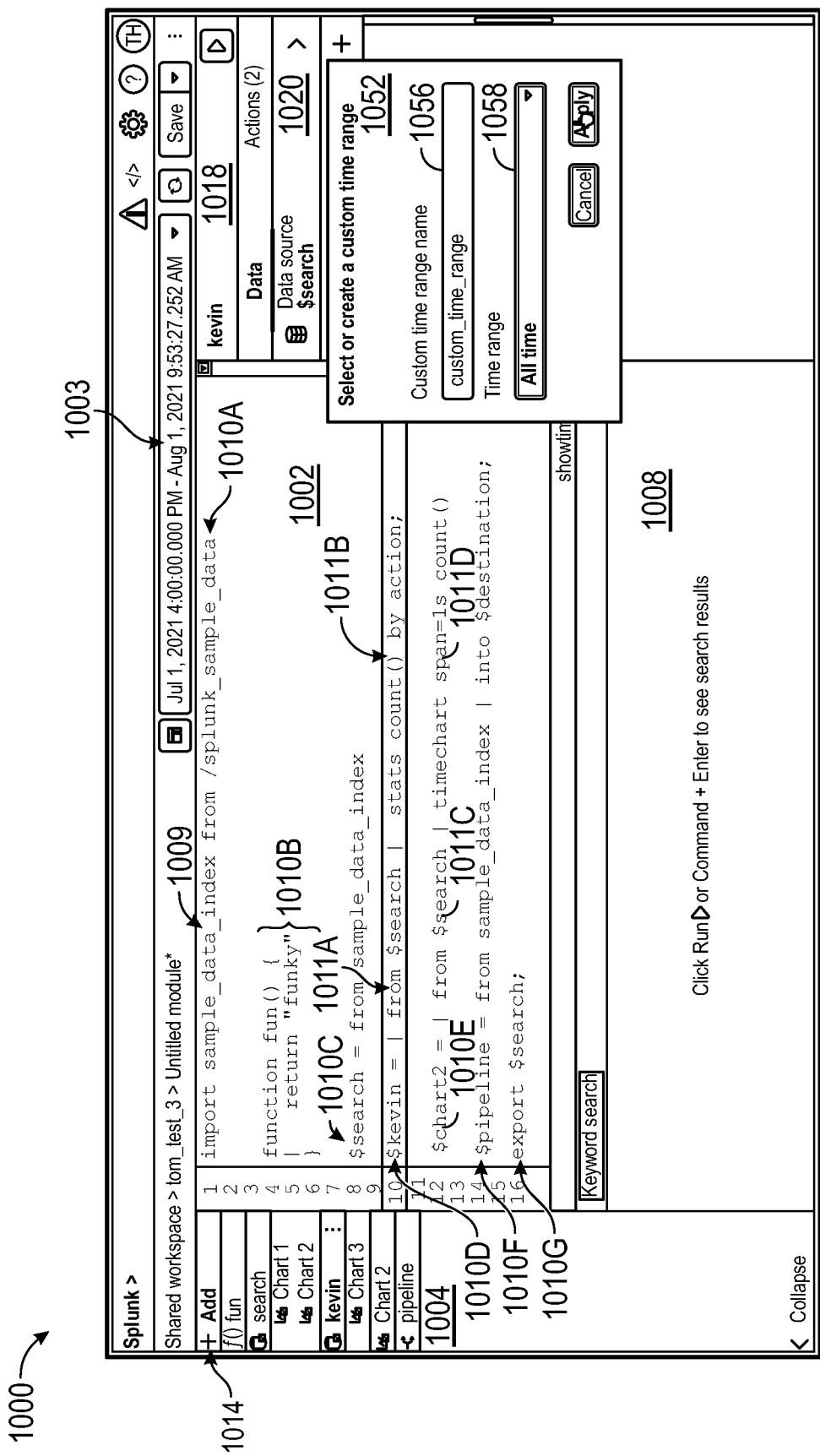

FIG. 10D illustrates an example of the GUI 1000 based on an interaction with a display object in the second pop-up GUI window 1052 to create a new (custom) time range associated with the statement 1010D. In response to the interaction, the user interface system 502 generates a third pop-up GUI window 1054 within the GUI 1000 and data panel 1018 (and removes the second GUI window 1052). The third pop-up GUI window 1054 includes an identifier field 1056 to enable a user to name the custom time range, and a time range selector field 1058 to enable a user to select the time range to be applied to the statement 1010D. In the illustrated example, the user has selected the time range "All time," indicating that no time filter is to be applied to the data from $search, which corresponds to the data source sample_data_index with regard to the statement 1010D.

Figure 10E:
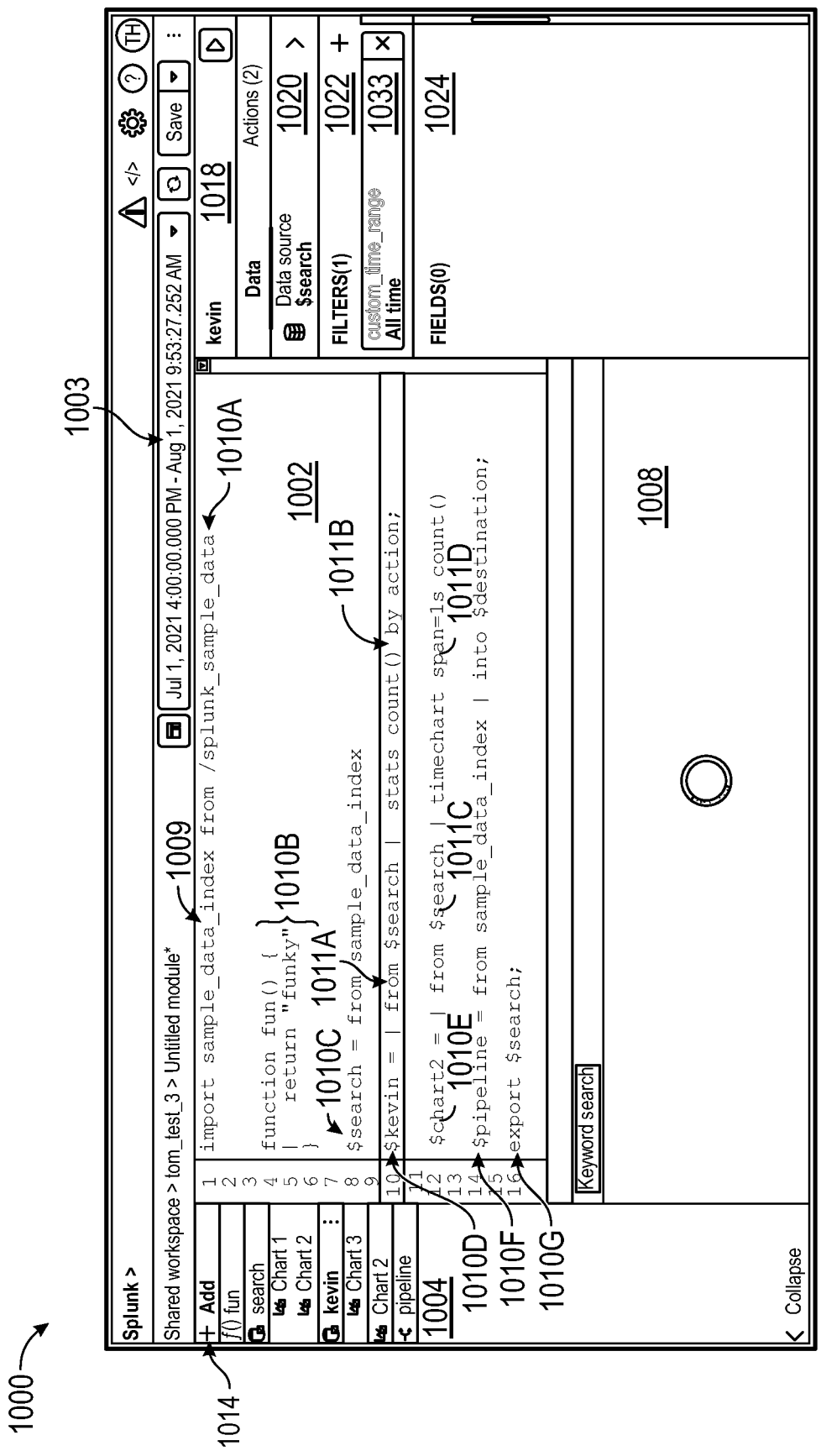

FIG. 10E illustrates an example of the GUI 1000 based on an interaction with a display object in the third pop-up GUI window 1056 to apply the changes to the time ranges to the statement 1010D. In response to the interaction, the user interface system 502 may append the selected time range to the data processing package 1009 and communicate the data processing package 1009 to the data intake and query system 108 for execution. As described herein, based on the interaction, the user interface system 502 may update the status indicators in the outline 1014 that are associated with the statement 1010D and a chart that depends from the statement 1010D to indicate that the statement 1010D is being executed.

In addition, the filter section 1022 is updated to indicate that a filter has been applied to the statement 1010D (or its data) that differs from inherited or default filters or an inherited or default time range (also known as the package time range). In the illustrated example, the filter is shown as a filter token object 1033 that enables a user to select, modify or remove the corresponding filter.

In some cases, the filter token object 1033 may be generated by the user interface system 502 and/or the semantic processing system 504 similar to the manner in which the model display objects are generated. In some cases, the filter token object 1033 is generated to indicate that a filter is being applied to the data from the statement 1010D that differs from filters applied to other statements 1010 (e.g., a different or custom time range is being used) and/or to indicate that a filter (or other processing) is being applied to the data in addition to whatever processing is to be done as a result of the corresponding statement 1010D. For example, the filter token object 1033 can indicate that an enriched data processing package will include additional query commands associated with the statement 1010D (or additional (search-related) statements) than what is shown in the data processing package 1009.

Although FIGS. 10B-10E are described with respect to the selection of a time range filter in the GUI window 1050 of FIG. 10B, it will be understood that other options may be selected using the GUI window 1050. For example, if a "values" option is selected in the GUI window 1050, one or more additional GUI windows may be displayed to enable a user to select a value to use to filter the data. The resulting filter may be displayed as a filter token object similar to the filter token object 1033. Similarly, if a "fields" option is selected in the GUI window 1050, one or more additional GUI windows may be displayed to enable a user to select a data field to use to filter the data. The resulting filter may be displayed as a filter token object similar to the filter token object 1033. Other filter options may be used to filter the data and generate the filter token objects.

As described herein, the data processing package 1009 may update the data processing package and communicate some or all of the data processing package to the data intake and query system for execution. For example, the user interface system 502 May 1) update the data processing package 1009 and communicate the updated data processing package 1009 to the data intake and query system 108, 2) generate an enriched data processing package 1009 from the data processing package 1009 using the changed time range and communicate the enriched data processing package 1009 to the data intake and query system 108, and/or 3) determine that the changes affect the statement 1010D and communicate the statement 1010D (without the other statements 1010) with the appended time range to the data intake and query system 108.

In cases where the user interface system 502 generates an enriched data processing package 1009, the user interface system 502 may append different time ranges to different statements 1010. For example, each search-related statement 1010 may have a different time range associated with it. In some cases, each statement 1010 may start by using the package time range or the time range indicated by the time range selector 1003. A user may then modify the time range associated with one or more of the statements 1010 as described herein at least with reference to FIGS. 10A-10D. For the statements 1010 that do not have their time range modified, the user interface system 502 may continue to append the package time range to the statement 1010. For the statements 1010 that have had their time range modified, the user interface system 502 may append the modified time range to the statement 1010 when communicating the statement 1010 and/or data processing package 1009 to the data intake and query system 108.

Figure 10F:
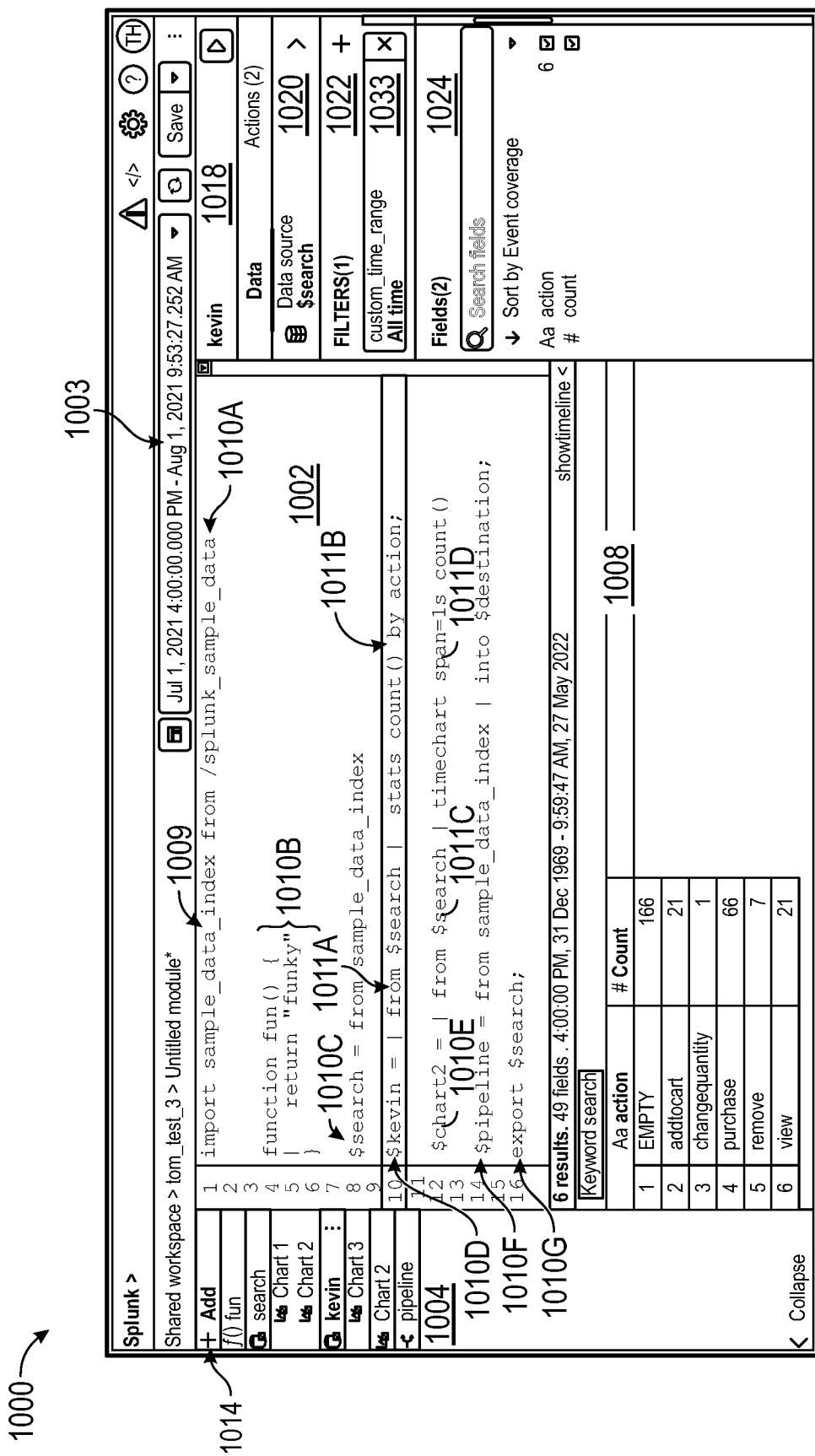

FIG. 10F illustrates an example of the GUI 1000 once the search associated with the statement 1010D has been completed and the results received. The status indicators in the outline 1014 associated with the statement 1010D are updated and results from the statement 1010D are shown in the results panel 1008.

Figure 10G:
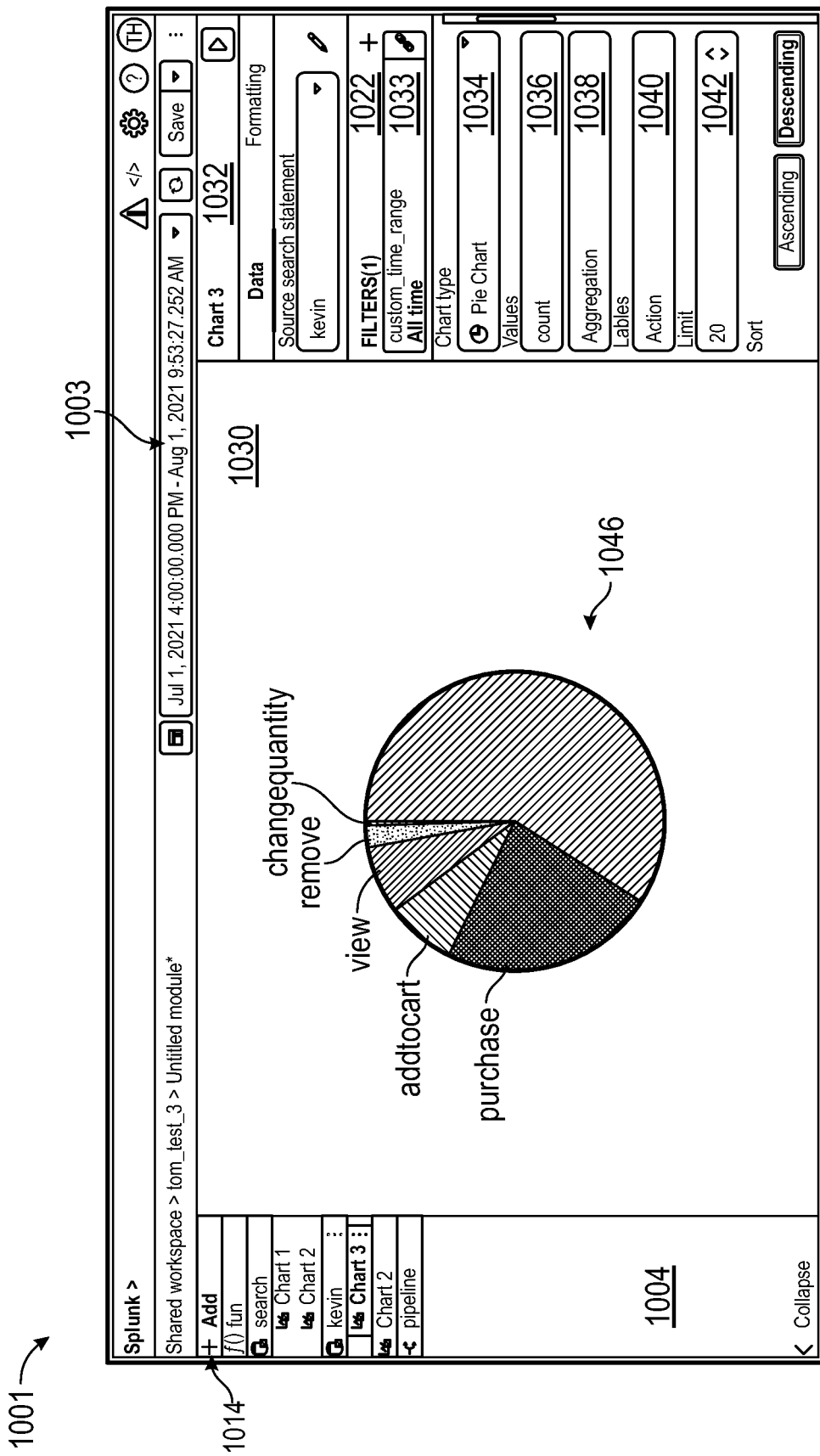

FIG. 10G illustrates an example of a GUI 1001 that may be generated based on the selection of a display object associated with "Chart 3" in the outline 1014. The GUI 1001 may be viewed as a progression from or an update to the GUI 1000 based on the selection.

The GUI 1001 may be similar to GUI 901 and include an outline panel 1004 and outline 1014, a chart panel 1030, and a chart parameter panel 1032. The chart panel 1030 may be used to display the chart 1046 and the chart parameter panel 1032 may be used to select and/or modify one or parameters used to generate the chart 1046 (also referred to herein as chart parameters).

The chart parameter panel 1032 presents a user with various options to generate a chart that is associated with the statement 1010D. The chart parameter panel 1032 may include a filter section 1022 that indicates filters applied (or to apply) to the data for the chart. In the illustrated example, the filter section 1022 indicates one filter has been applied to the data for the statement 1010D that differs from inherited or default filters or an inherited or default time range. In the illustrated example, the applied filter is shown as a filter token object 1033 that enables a user to select, modify or remove the corresponding filter. For example, by removing the filter token object 1033, the user may alter the time range applied to the data for the chart 1046. As described herein, the filter token object 1033 may indicate that the chart is using a filter that is differs from a default filter or a filter that is different from a filter found in a statement 1010. In the illustrated example, the filter token object 1033 indicates that the chart is using a time range that is different from the default or package time range.

The chart parameter panel 1032 also includes a number of interactive fields, similar to the chart parameter panel 932 to enable a user to select one or more parameters for the chart, including a chart type and one or more filters to apply to the data. In the filter section 1022, the interactive fields include the chart type field 1034, a values field selection field 1036, an aggregation field 1038, a labels field 1040, and a limit field 1042. Fewer, more, or different interactive fields may be used as desired.

In the illustrated example, the user has selected "pie chart" using the chart type field 1034. Based on the selection, some of the interactive fields 1036-1042 may differ from the interactive fields shown in chart parameter panel 932 of FIG. 9B. Moreover, the fields may provide drop down menus and/or enable a user to select parameters. In some cases, based on the selections within the chart parameter panel 1032, the GUI 901 may provide the user with additional interactive fields and/or options.

As described herein, to generate the chart 1046, the user interface system 502 may use the statement 1010D, which corresponds to the chart 1046 and the parameters selected from the chart parameter panel 1032 to generate a search-related statement, append the generated search-related statement to the data processing package 1009 (including the custom time range identified in the filter section 1022 or time range that differs from the package time range shown in time range selector 1003) to form an enriched data processing package 1009, and communicate the data processing package 1009 to the data intake and query system 108. The results from the data intake and query system 108 may be fed into a chart generating system that generates the chart 1046.

Figure 10H:
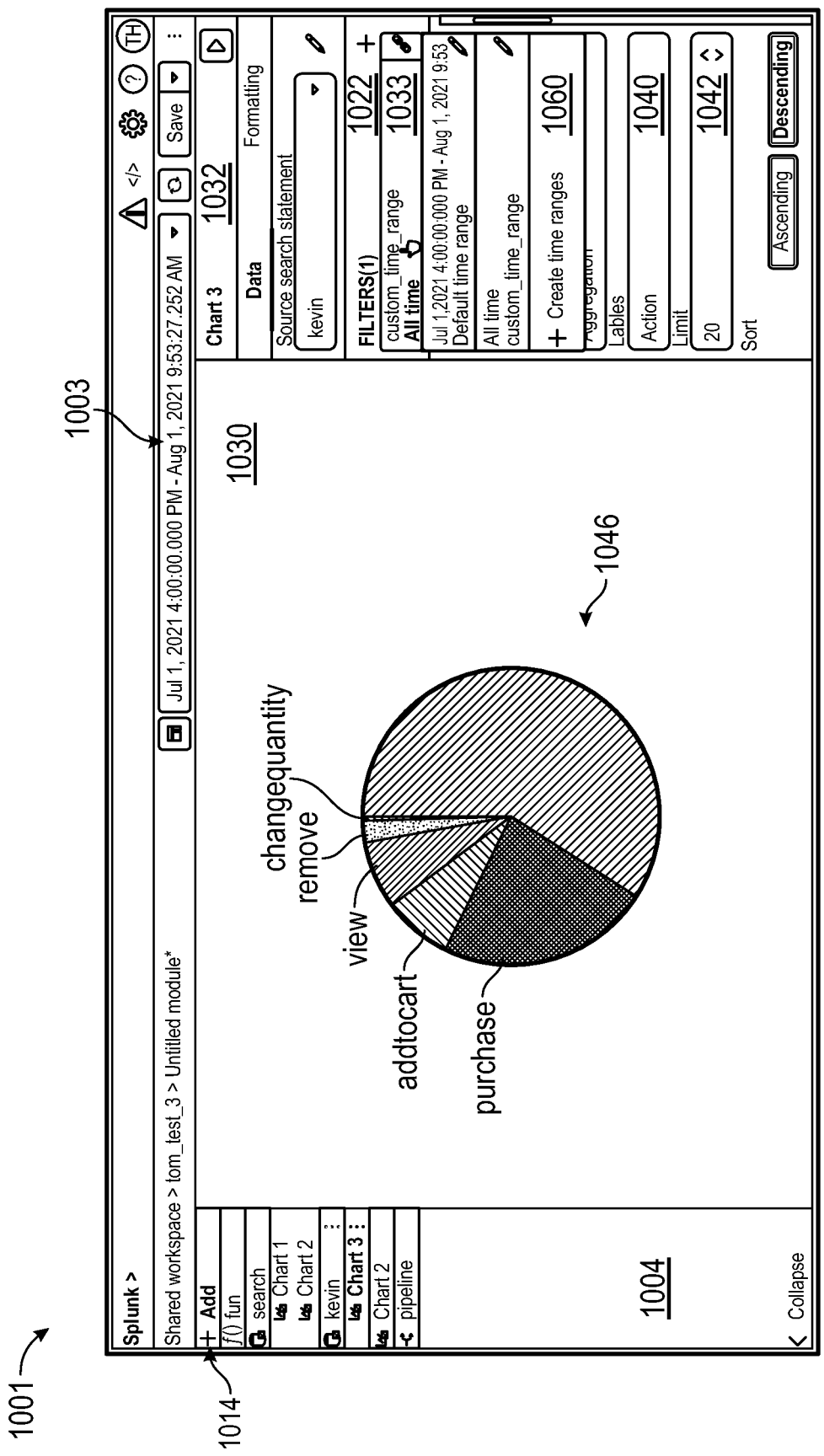

FIG. 10H illustrates an example of the GUI 1001 based on an interaction with the filter token object 1033. In response to the interaction, the user interface system 502 may cause the display of a pop-up window 1060 that enables a user to modify the time range associated with the filter token object 1033. The pop-up window 1060 may include a display of one or more predetermined time ranges, such as a time range associated with the statement 1010D or other statement 1010, or the package time range, or an option to create a custom time range for the chart 1046.

Figure 10I:
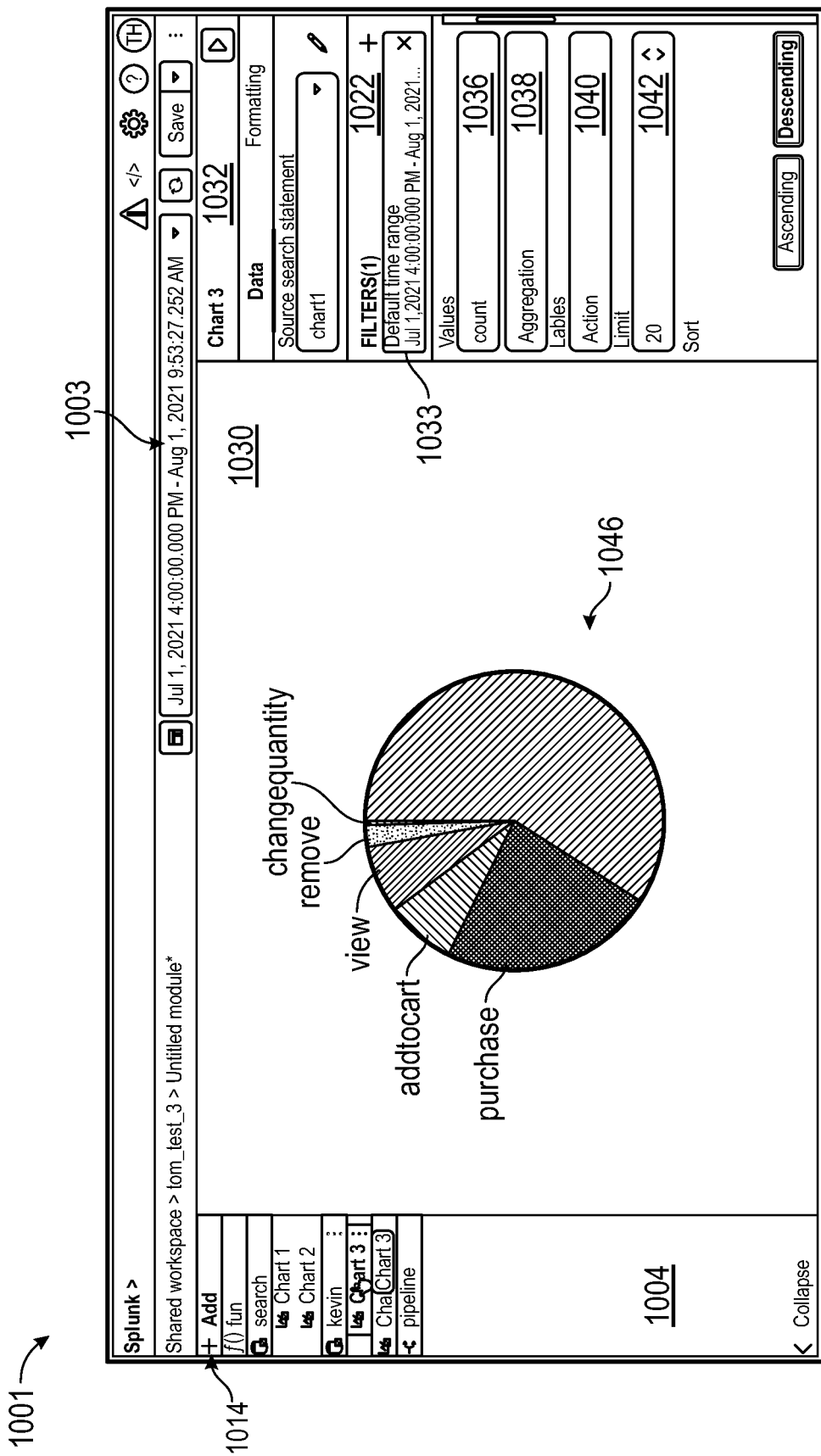

FIG. 10I illustrates an example of the GUI 1001 based on an interaction with the pop-up window 1060 to select a new time range (All time) for the chart 1046. In response to the interaction, the user interface system 502 may generate a search-related command using the statement 1010D and the parameters in the chart parameter panel 1032, append the generated search-related command and the new time range to the data processing package 1009 to form an enriched data processing package 1009, communicate the enriched data processing package 1009 to the data intake and query system 108 for execution, and display the results in the chart 1046.

Thus, the user interface system 502 may append multiple types of data (e.g., search-related statements, time ranges, etc.) to the data processing package 1009 to generate the enriched data processing package 1009, and some of the appended data may apply to other portions of the appended data (e.g., the appended custom time range may apply to the generated search-related command, but not to other search-related commands).

Moreover, the user interface system 502 may generate multiple search-related commands corresponding to different charts (e.g., Chart 1, Chart 2, Chart 3), append the generated search-related commands to the data processing package 1009, determine different time ranges for the different charts, and append the different time ranges to the data processing package 1009. In this way, the user interface system 502 may simplify the GUI 1000 (e.g., simplify the data processing package 1009 that is shown in the package editor panel 1002) and dynamically generate a data processing package 1009 to be sent to the data intake and query system 108.

In some cases, although the time ranges and/or generated search-related commands may not form part of the data processing package 1009, the user interface system 502 and/or semantic processing system 504 may track and/or store them. For example, the user interface system 502 may communicate the properties of the different charts and time ranges associated with the charts or statement 1010 to the semantic processing system 504. The semantic processing system 504 may store the properties as part of the data processing package 524. In certain cases, the user interface system 502 may store the properties of the different charts and time ranges associated with the charts or statement 1010 as part of the data processing metadata 516. In this way, if a session is ended abruptly or a computing device shuts down, the relevant charts may be recreated from the stored data.

The various systems and GUIs described herein may be used to create or modify a search-related statement (e.g., a summarization statement). To illustrate an example data flow for generating a summarization statement (whether or not displayed in a package editor panel) and/or executing a search-related statement using a GUI and one or more GUI windows, consider the following non-limiting examples in reference to FIGS. 11A-11D.

Figure 11A:
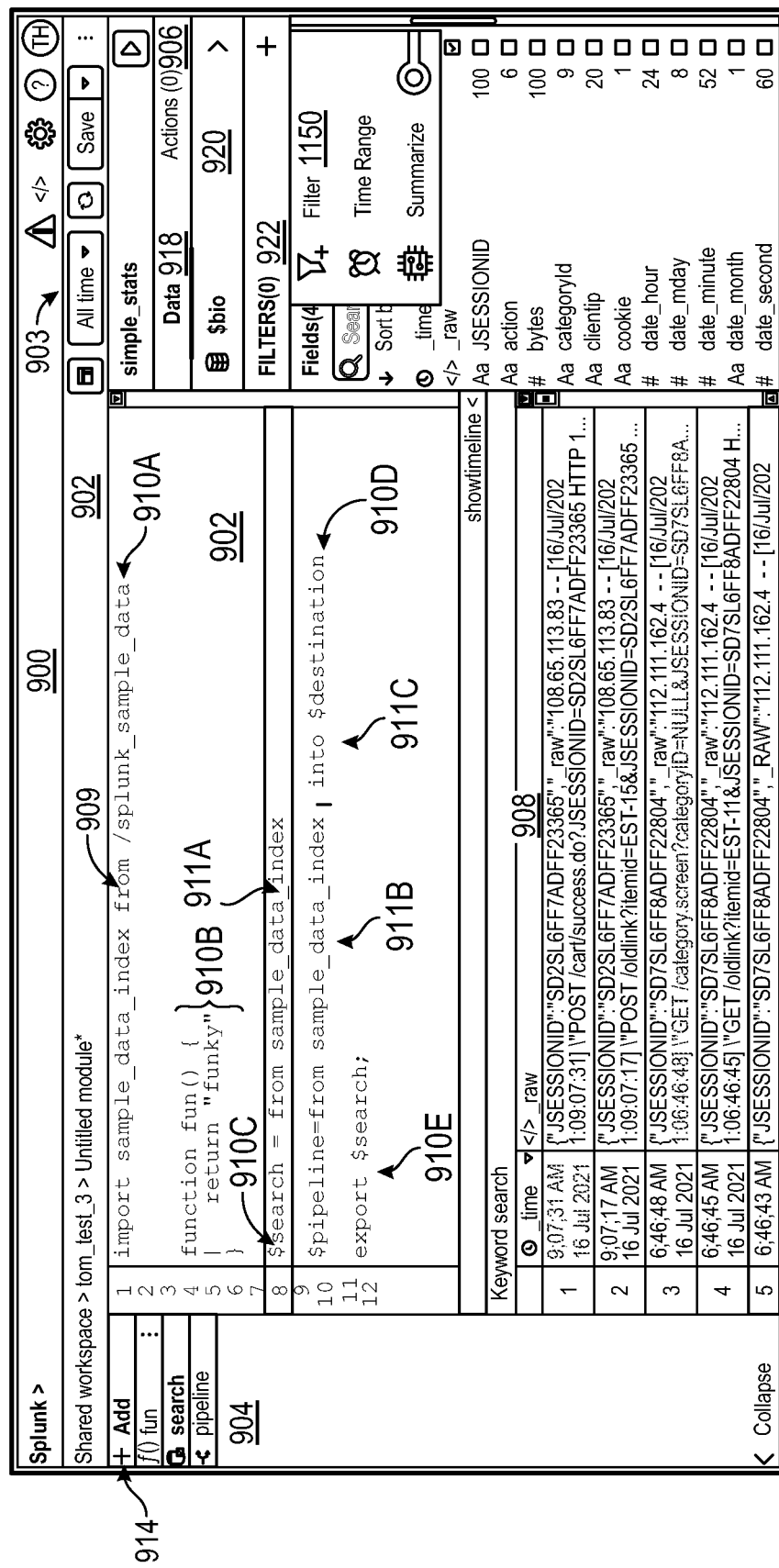

FIG. 11A illustrates another example of the GUI 900 in which a user has interacted (e.g., clicked, hovered, selected, etc.) with a display object associated with the filter section 922 to generate a summarization for data associated with a data source identified by the data source identifier 920 (data source bio). In some cases, a statement 910 may not exist or be displayed that is associated with the data source bio. Put another way, by interacting with the GUI 900, a user may generate a summarization statement (and corresponding filter tokens and/or action models) and/or execute a search-related statement.

In response to the interaction, the user interface system 502 generates a pop-up GUI window 1150 within the GUI 900 (and within the data panel 918) that shows various options by which a user may apply a filter to data associated with the identified data source, including an option to summarize the data (or generate a summarization).

Figure 11B:
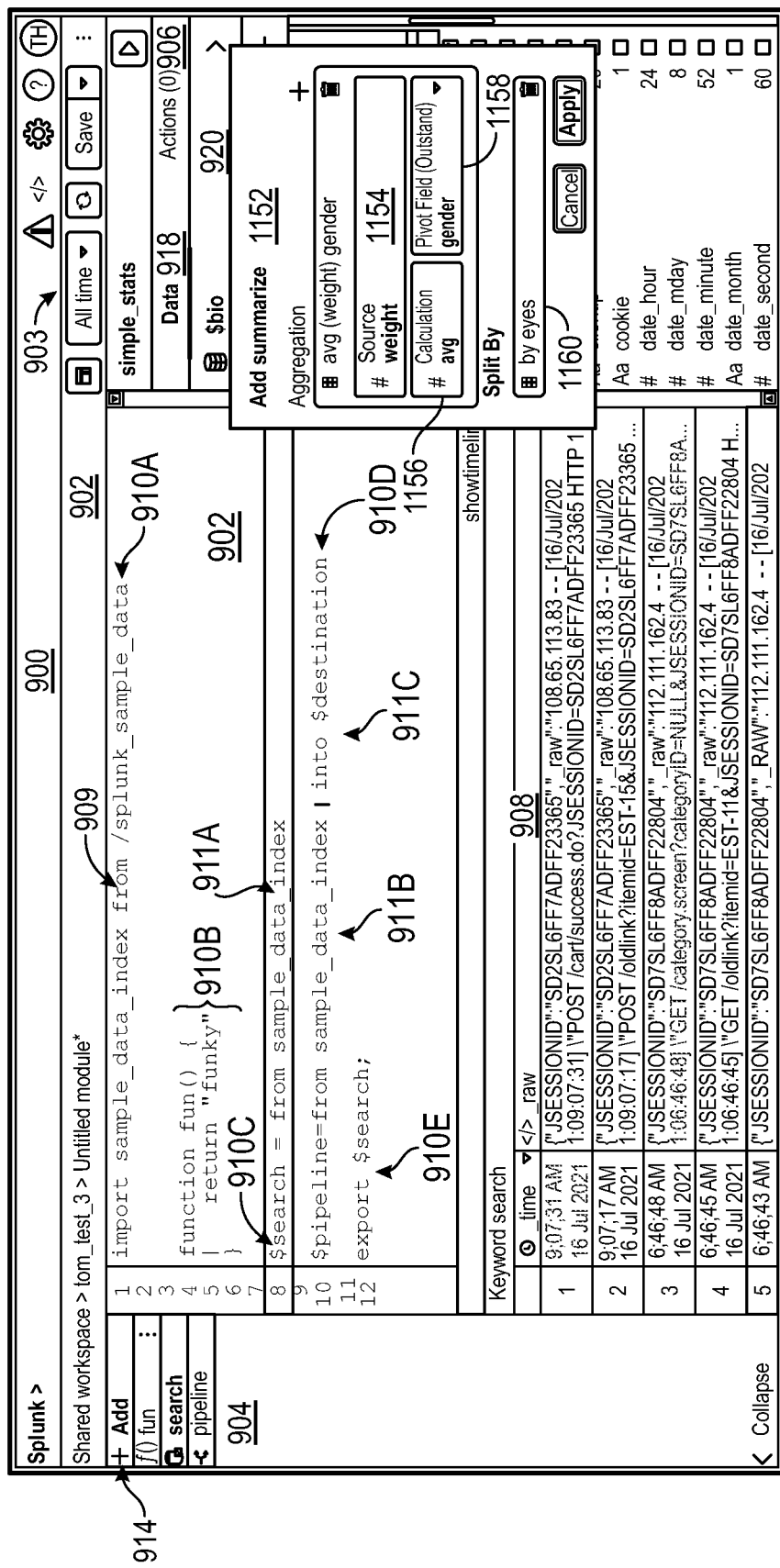

FIG. 11B illustrates an example of the GUI 900 based on an interaction with a display object in the GUI window 1150 to generate a summarization of data associated with the identified data source (bio). In response to the interaction, the user interface system 502 generates a second pop-up GUI window 1152 within the GUI 900 (and removes the first GUI window 1150).

The second GUI window 1152 includes various interactive fields 1154, 1156, 1158, 1160 to enable a user to select functions (e.g., by selecting corresponding command token) and/or data fields to use to generate the summarization. The first three fields 1154, 1156, 1158 are associated with an aggregation of the data and include a source selection interactive field 1154 that enables a user to select a data field (also referred to as a source field) to use in a calculation, a calculation interactive field 1156 that enables a user to select the calculation to perform on the data from the source field, and a pivot field identification interactive field 1158 that enables a user to select a data field to use as the pivot field for the aggregation. The fourth interactive field is a split by interactive field 1160 that enables a user to select a data field to use to further split results of the aggregation.

The data fields made available for selection via the source selection interactive field 1154, pivot field identification interactive field 1158, and/or split by interactive field 1160 may be the same or different, and may be determined from the data of the identified data source (bio) and/or the type of fields. For example, in some cases, the data fields for the source selection interactive field 1154 may be numerical-based (e.g., data fields that have a numerical field value) and the data fields for the pivot field identification interactive field 1158, and/or split by interactive field 1160 may be string-based (e.g., data fields that have characters or strings for field values).

In certain cases, one or more data fields made available for the various interactive fields 1154, 1158, 1160 may be provided based on one or more queries on the data or other information known about the data from the identified data source (bio), such as, metadata associated with the data source (e.g., host, source, sourcetype), data fields found in or extracted from the data (or data fields typically found in data), keywords of the data, numerical values from the data, etc.), regex rules (e.g., indicating field that are extractable from the data), etc. In some cases, the selection of a data field in one interactive field may eliminate the data field from availability in another interactive field. For example, if the user selects the weight field in the pivot field identification interactive field 1158, the weight field may not be available for selection in the split by interactive field 1160.

The command tokens made available for selection via the calculation interactive field 1156 may be selected by an administrator, based on commands that are compatible with a summarization and/or the type of field selected in the source selection interactive field 1154, frequently used commands (based on previously selected command tokens by the user, tenant or other accounts), etc. In some cases, such as when the source selection interactive field 1154 is numerical-based, the command tokens made available for selection via the calculation interactive field 1156 may be limited to command tokens that are compatible with numerical-based fields. In certain cases, the command tokens made available for selection via the calculation interactive field 1156 may be limited to command token associated with aggregate or statistical functions, such as but not limited to mean, median, mode, sum, count, distinct count, standard deviation, minimum, maximum, percentile, variance, etc.

Although four interactive fields are shown in the second GUI window 1152, it will be understood that fewer or more may be used. In some cases, the second GUI window 1152 may include additional interactive field based on the selection in another interactive field. For example, if time is selected for the split by interactive field 1160, the second pop-up GUI window 1152 may include additional interactive fields, such as span options fields, similar to the span options fields 948A, 948B to enable a user to select a time range by which to group the data for the aggregation (e.g., to select a unit of time, and quantity of time units by which to group events).

The second pop-up GUI window 1152, may also display a summary of the aggregation that is to take place (e.g., avg (weight) gender). In the illustrated example, based on the selections in the second pop-up GUI window 1152, the user has selected to determine the average weight by gender for different eye colors.

In response to an interaction with a display object in the second GUI window 1152 that indicates the aggregation is to be performed (e.g., user selects the "Apply" display object), the user interface system 502 may generate a search-related statement using the parameters in the pop-up GUI window 1152, communicate the search-related statement to the semantic processing system 504 to generate actions/statement models for the search-related statement, receive actions/statement models corresponding to the search-related statement and display a filter token corresponding to the actions/statement model in the GUI 900. In certain cases, the generated search-related statement may include multiple query commands. In the illustrated example, the generated search-related statement includes query commands to determine the average weight by gender for different eye colors using data from data source bio. As described herein, the data in the data source bio may include machine data or raw machine data.

In some cases, the user interface system 502 may also append the generated search-related statement (and a time range associated with the generated search-related command) to form an enriched data processing package 909 and communicate the enriched data processing package 909 to the data intake and query system 108 for execution, and display the results in the search results panel 908.

FIG. 11C illustrates an example of the GUI 900 based on completion of the aggregation or summarization (e.g., in response to the user selecting "Apply" in the pop-up GUI window 1152). As described herein, based on the completion of the summarization, the user interface system 502 may update the package editor panel 902 to show a generated summarization statement 910F, update the outline 914 to include an identifier (simple_stats) for the summarization statement 910F and a status indicator indicating that the search and/or data processing for the statement 910F is complete, update the search results panel 908 with results for the summarization statement 910F, and update the data panel 918 based on the 910F and/or the results of the statement 910F.

The statement 910F may have multiple query commands generated based on the selections in the second pop-up GUI window 1152. As described herein, the statement 910F and/or one or more query commands of the statement 910F may be used to generate one or more actions/statement models. The user interface system 502 may use the actions/statement models to generate or display one or more display objects in the GUI 900, such as in the outline 914, the data panel 918, and/or the actions panel 906. For example, based on the actions/statement models, the user interface system 502 may update the outline 914 to include an identifier corresponding to the statement 910F (e.g., "simple_stats" identifier in the outline 914). As another example, the user interface system 502 may update the data panel 918 and/or the actions panel 906 with one or more display objects, such as but not limited to one or more model display objects and/or filter token objects.

In the illustrated example, the user interface system 502 updates the data panel 918 to display a filter token object 1133 corresponding to a statement action model. The statement action model may be generated from the parameters selected in the pop-up GUI window 1152. For example, as the interactive fields enable a user to select the various parameters to use for a summarization statement, the user interface system 502 may be able to generate the statement action model from the received parameters.

In certain cases, the statement action model corresponding to the filter token object 1133 may generated from action models generated from one or more command models of a data processing package model. As described herein, the filter token object 1133 may display a portion of the statement 910F and enable a user to modify and/or remove the search-related statement 910F from the data processing package 909. In some cases, the statement 910F may be omitted from the data processing package 909. In some such cases, the filter token object 1133 may indicate to a user that there is an undisplayed search-related statement that will be executed with the data processing package 909.

Any actions/statement models generated from the statement 910F (or from the summarization parameters received from the user e.g., via the pop-up GUI window 1152) may be used to generate or display one or more model display objects, which may be viewable via the models panel 906. In the illustrated example, the summary of actions associated with the models panel has been updated indicating four actions have been generated that are associated with the "simple_stats" statement 910F.

Figure 11D:
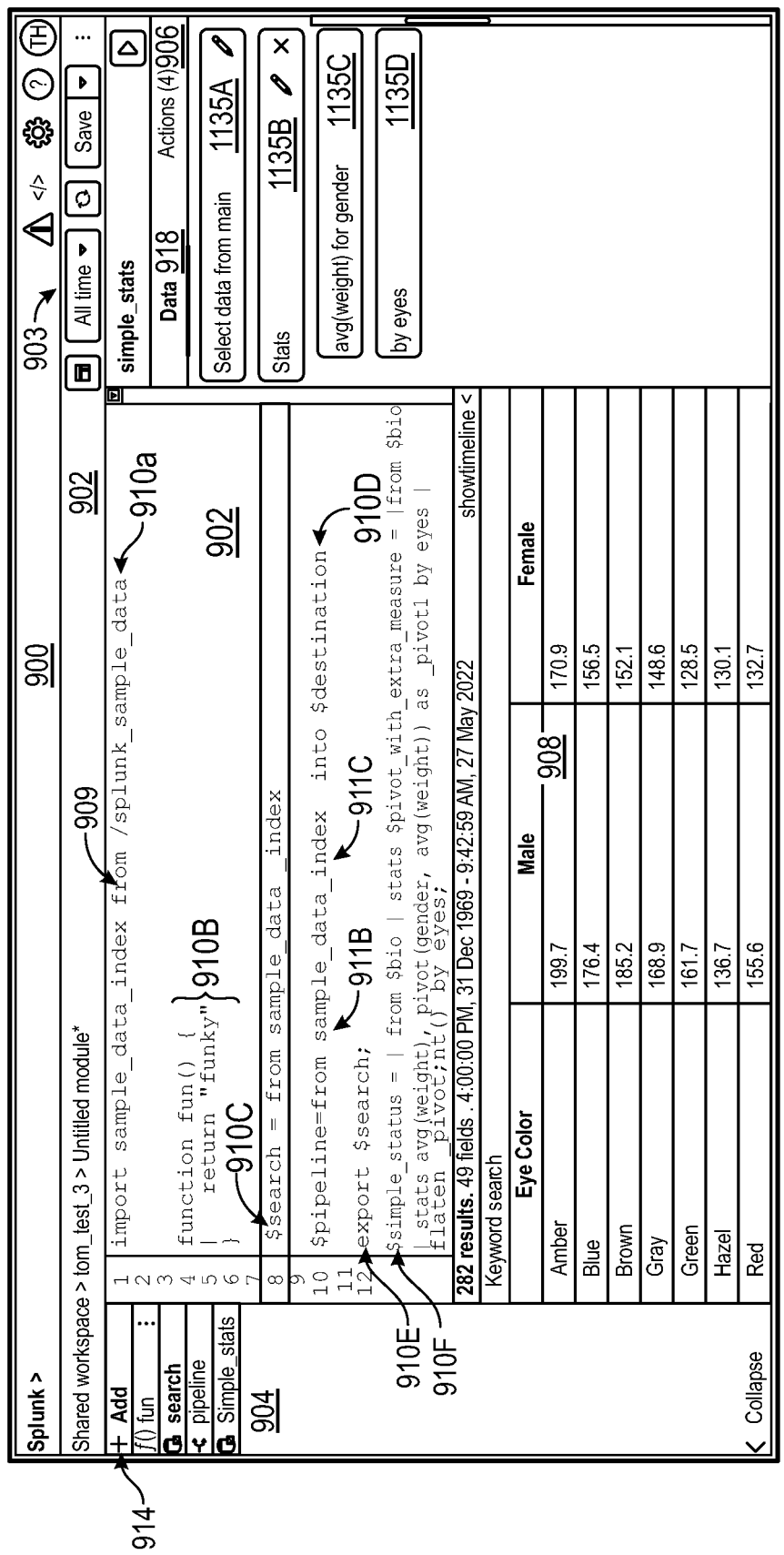

FIG. 11D illustrates an example of the GUI 900 based on an interaction with a display object associated with the actions panel 906 to view the actions panel 906. In response, the GUI 900 is updated to show the actions panel 906. In the actions panel 906, model display objects associated with the parameters received from the user (e.g., via the pop-up GUI window 1152) and/or the generated search-related statement 910F may be displayed. As described herein, a user may interact with the model display objects to modify or remove them. Moreover, as described herein, modifying the model display objects may result in updates to the data processing package 909, the search results panel 908, the actions panel 906, the data panel 918, and/or the outline 914.

In the illustrated example, the actions panel 906 includes four model display objects 1135A, 1135B, 1135C, 1135D. The action model display object 1135A indicates the origin of the data (e.g., identifier for the from which the data is being pulled). This may differ from the data source identifier 920, in that the data source identifier 920 may refer to the identifier for the data in the statement 910F, whereas the identifier in the action model display object 1135A may correspond to a system identifier for the data set from which the data is retrieved. The action model display object 1135B indicates the query command to be performed on the data (stats), the action model display object 1135C indicates the function and data fields used in association with the function to group the data, and the action model display object 1135D indicates the field by which the groups are to be split. It will be understood that fewer or more action model display objects 1135 may be generated depending on the summarization parameters or the statement 910F and/or the manner in which action model display objects 1135 are generated. For example, as described herein, one action model display object 1135 may be generated for one or more query commands and/or multiple action model display object 1135 may be generated for one query command.

5.3. Flow Diagrams

Figure 12:
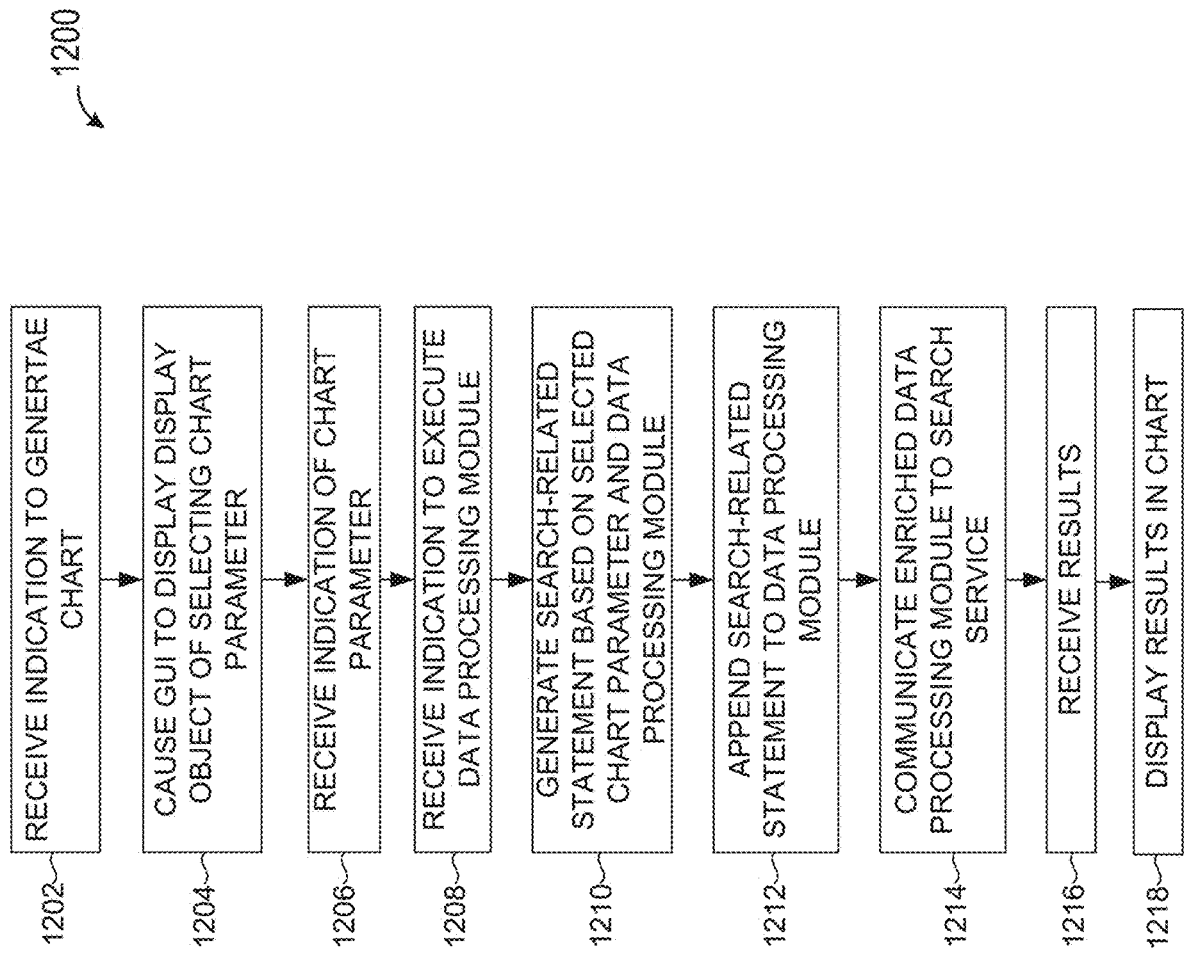
FIG. 12 is a flow diagram illustrating an embodiment of a routine implemented by the user interface system to generate and display a chart based on a data processing package.

FIG. 12 is a flow diagram illustrating an embodiment of a routine 1200 implemented by the user interface system 502 to generate and display a chart based on a data processing package. The data flow illustrated in FIG. 12 is provided for illustrative purposes only. It will be understood that one or more of the steps of the processes illustrated in FIG. 12 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1202, the user interface system 502 receives an indication to generate a chart. As described herein, the user interface system 502 may generate a GUI that includes a data processing package, statements, and various display objects associated with the data processing package, statements, etc. The data processing package and statements may be displayed in a package editor panel of the GUI and the display objects may be included in the package editor panel or other panel of the GUI, such as an outline panel, data panel, action panel, results panel, etc. In some cases, interacting with one of the data objects may be associated with instructions to generate an (interactive) chart. In certain cases, the data objects may be associated with certain search-related statements such that an interaction with the display object indicates that the chart to be generated is associated with (or based on) the search-related statement.

The chart may correspond to data retrieved from a search service, such as the data intake and query system 108. In some cases, the data may include machine data or raw machine data generated by a processing device.

At block 1204, the user interface system 502 causes a GUI to display a display object for selecting a chart parameter for the chart. In some cases, the user interface system 502 causes the GUI to display the display object associated with selecting a chart parameter based on the indication to generate the chart. For example, the user interface system 502 may cause the GUI to display a chart parameter panel that includes one or more interactive fields that enable a user to select parameters (e.g., data fields by selecting a data field identifier, commands by selecting a command token, etc.) to use to generate the chart. The parameters may include, but are not limited to, a chart type, a data field to group data (or events), a data field to split data grouped data, functions or commands to process data, time range of data to be used, etc. The interactive fields may provide space to type parameters or include drop down menus to select parameters, etc. Moreover, the user interface system 502 may review the data or use information or metadata about the data to provide or suggest data fields and/or commands to use on the data. In some cases, the display object for selecting a parameter for the chart may be included in the same or a separate GUI from the GUI used to receive the indication to generate the chart. In certain cases, the display object for selecting a parameter for the chart may be included in a GUI window displayed within the GUI used to receive the indication to generate the chart.

In some cases, based on a selection in on interactive field, the user interface system 502 may cause the GUI to display different or additional interactive fields. For example, different interactive fields may be displayed based on the type of chart selected. As another example, if a time field is selected, the GUI may display additional interactive fields to enable a user to select a unit of time and quantity of the units of time (e.g., a time range) to use to group or split the data.

At block 1206, the user interface system 502 receives an indication of a selection of a chart parameter. As described herein, the user interface system 502 may receive an indication of a selection of a chart parameter as a user enters or selects chart parameters via the GUI. Moreover, the user interface system 502 may receive multiple chart parameters via the GUI.

At block 1208, the user interface system 502 receives an indication to execute the data processing package. As described herein, a display object may be associated with an instruction to execute search-related statements and/or a data processing package. Based on an interaction with such a display object (or other instruction), the user interface system 502 may determine that it is to execute the data processing package. In some cases, the user interface system 502 may automatically initiate execution of the data processing package based on a determination that one or more chart parameters have been received, etc.

At block 1210, the user interface system 502 generates a (second) search-related statement. The second search-related statement may include one or more lines of a query language, one or more query commands, user query parameters, system query parameters, etc.

As described herein, the user interface system 502 may generate the search-related statement in a variety of ways. In some cases, the user interface system 502 may generate the search-related statements based on (or using) the selected chart parameters in the GUI and/or a (first) search-related statement in the data processing package that corresponds to the chart that is to be generated. For example, the user interface system 502 may use the query commands, user query parameters, and/or system query parameters (e.g., command tokens) of the first search-related statement to generate the second search-related statement.

In some cases, the user interface system 502 uses the selected chart parameters to generate one or more query commands, user query parameters, and/or system query parameters. For example, the user interface system 502 may use a command token received via the user interface (e.g., based on user input) to determine what command to generate. Based on the syntax of the command, other received parameters (e.g., data fields, values, or keywords) may be used as arguments for the determined command. Accordingly, using parameter (e.g., command token and data fields, values, or keywords) via a GUI, the user interface system 502 may generate a query command (e.g., a query command to organize, sort, group, or split particular data, etc.) that includes a command token (an example of a system query parameter) and various arguments (some of which may be system query parameters and/or user query parameters) for the command. In like manner, the user interface system 502 may generate additional query commands (e.g., using command tokens, data fields, values, and/or keywords, or other system query parameters or user query parameters received via the user interface).

In some cases, based on one command token and other query parameters, the user interface system 502 may generate multiple query commands. For example, a command token may include or be associated with multiple query commands.

The generated query command(s) may be appended to the first search-related statement to generate the second search-related statement. Accordingly, the second search-related statement may include one or more query commands, system query parameters, user query parameters, etc.

In certain cases, the user interface system 502 uses one or more actions/statement models of the first search-related statement (along with the chart parameters) to generate the second search-related statement. For example, rather than using the first search-related statement itself, the user interface system 502 may use a model associated with or generated from the first search-related statement.

By using the chart parameters to generate the second search-related statement, the user interface system 502 may provide an interactive chart to a user. For example, the user interface system 502 may enable a user to review a chart, make change by changing the chart parameters and generate a new chart without modifying an underlying data processing package. In this way a user may interact with the chart to analyze the underlying data in a variety of ways.

At block 1212, the user interface system 502 appends the generated (or second) search-related statement to the data processing package. In some cases, the user interface system 502 appends the second search-related statement to form an enriched data processing package. The enriched data processing package may differ from the displayed data processing package in that it includes the second search-related statement and/or other commands or instructions to be used by the search service to perform the search. For example, the enriched data processing package may include one or more time ranges. The time ranges may include a package time range (or default time range) and one or more statement time ranges. The statement time ranges may be associated with particular statements of the displayed data processing package and/or particular statements that are generated and appended to the enriched data processing package (e.g., search-related statements in the enriched data processing package but not in the displayed data processing package, such as search-related statements generated from chart parameters). The package time range may be used for search-related statements that do not have a particular statement time range associated with them.

In some cases, the enriched data processing package may also differ from the displayed data processing package in that it may not be saved to a data store or to a non-volatile memory. For example, the enriched data processing package may be generated at search run time (e.g., in response to the user interface system 502 receiving an indication that one or more search-related statements or the displayed data processing package is to be executed). In some such cases, the enriched data processing package may be discarded once it is sent to the search service. In certain cases, the user interface system 502 or other component may save the enriched data processing package (e.g., in the event power is lost) but may not display it to a user.

The enriched data processing package may include additional instructions or commands that are not seen in the displayed data processing package. For example, the enriched data processing package may include instructions or commands identified by an administrator. For example, the administrative commands may provide limits as to how many results are to be obtained using the search service, frequency of search, whether and when a particular user may generate or use an interactive chart, etc. The additional instructions or commands may be appended to the data processing package along with the second search-related statement in preparation for sending the search-related statements or data processing package to the search service for execution. By appending instructions, commands, or limits to the data processing package (to generate the enriched data processing package), the user interface system 502 may enable an administrator to provide an interactive chart to users that limits the users' ability to overload or create other issues for the search service (e.g., run too many or too large searches, share search service resources, etc.).

At block 1214, the user interface system 502 communicates an enriched data processing package to a search service. The user interface system 502 may communicate the enriched data processing package via one or more public or private networks. As described herein, the search service may execute the various search-related statements of the data processing package by processing and executing the searches across one or more data sources.

In some cases, the search service executes each search-related statement as a separate query. In certain cases, the search service may analyze the various search-related statements (and/or metadata associated with the search-related statements) to reduce the number of searches or reduce the size of the searches. For example, the search service may determine that a primary search may be executed to collect a data set from affected data sources and secondary searches may be executed on the results of the primary search (as opposed to repeatedly accessing the data sources by running multiple searches against them). In certain cases, the search service may review the package time range and any statement time ranges to determine a time range to be used to collect the data set from a particular data source. Accordingly, the search service may determine different time ranges for different data sources associated with the data set.

At block 1216, the user interface system 502 receives results from the search service. As described herein, the results may be received in streaming or batch mode. In some cases, the format of the search may be based on the search statements. Moreover, as described herein, the results may include hundreds, thousands, millions, billions or more search results (e.g., events, metrics, traces, etc.).

In some cases, the results may include results from multiple search-related statements. In some such cases, the search service may identify the search-related statement to which the results correspond. For example, the search service may indicate that first results correspond to the first search-related statement and second results correspond to the (generated) second search-related statement. The user interface system 502 may use the indicators or identifiers to determine when and where to display the different results. In some cases, the user interface system 502 displays results based on a selection of a statement or chart that corresponds to the results.

At block 1218, the user interface system 502 displays at least a portion of the result in the chart. In some cases, the user interface system 502 communicates the results to chart generator that generates the chart for display. The chart generator, for example, may include executable instructions to generate the different types of charts with colors, sizes, etc.

Fewer, more, different or different blocks may be used with the routine 1200. For example, in some cases, the user interface system 502 may receive an indication to execute one or more particular search-related statements (e.g., execute only the search-related statement generated from the chart parameters). In some such cases, the user interface system 502 may generate the second search-related statement and communicate the second search-related statement to the search service for execution. In this way, the user interface system 502 may reduce the amount of data communicated to the search service and/or the number of searches executed by the search service.

Figure 13:
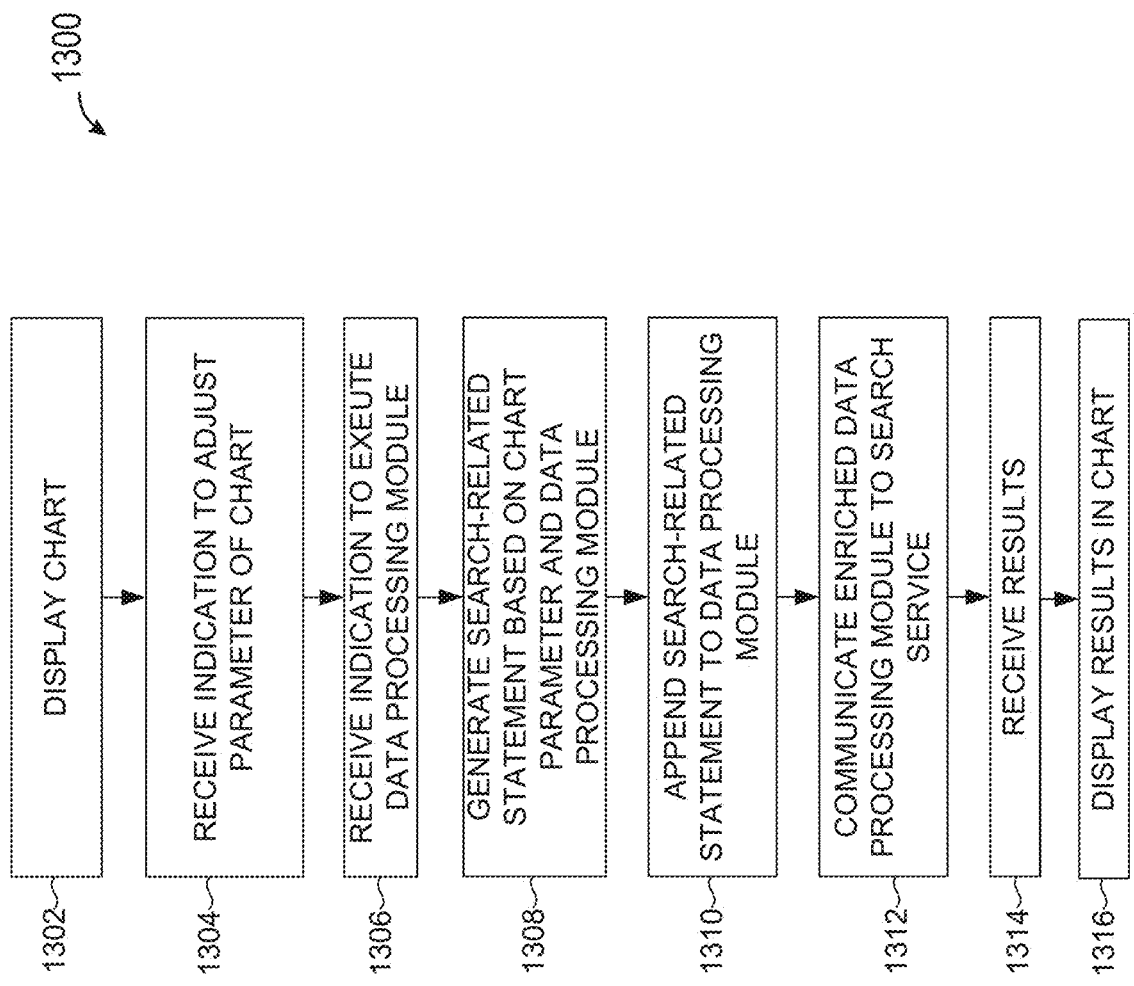
FIG. 13 is a flow diagram illustrating an embodiment of a routine implemented by the user interface system to modify a chart based on a data processing package.

FIG. 13 is a flow diagram illustrating an embodiment of a routine 1300 implemented by the user interface system 502 to modify a chart based on a data processing package. The data flow illustrated in FIG. 13 is provided for illustrative purposes only. It will be understood that one or more of the steps of the processes illustrated in FIG. 13 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1302, the user interface system 502 displays a chart. In some cases, the block 1302 may be similar to block 1218 of FIG. 12. For example, the user interface system 502 may receive results from a search service and display the results in a chart on a GUI. The GUI may include one or more chart parameters as described herein at least with reference to block 1204 of FIG. 12. For example, the GUI may include one or more interactive fields in a parameter panel that enables a user to select parameters for the chart, such as but not limited to chart type, a data field to group data (or events), a data field to split data grouped data, commands or functions to process data, time range of data to be used, etc. Moreover, the GUI may the same or different GUI or one or more GUI windows to display the chart parameters.

At block 1304, the user interface system 502 receives an indication of a selection of a chart parameter, similar to block 1206 of FIG. 12.

At block 1306, the user interface system 502 receives an indication to execute the data processing package, similar to block 1208 of FIG. 12.

At block 1308, the user interface system 502 generates a search-related statement, similar to block 1210 of FIG. 12.

At block 1310, the user interface system 502 appends the generated search statement to the data processing package, similar to block 1212 of FIG. 12.

At block 1312, the user interface system 502 communicates an enriched data processing package to a search service, similar to block 1214 of FIG. 12.

At block 1314, the user interface system 502 receives results from the search service, similar to block 1216 of FIG. 12.

At block 1316, the user interface system 502 displays at least a portion of the result in the chart, similar to block 1218 of FIG. 12.

Fewer, more, or different blocks may be included in the routine 1300. In some cases, any one or any combination of the blocks of routine 1200 may be included in the routine 1200 or vice versa.

Figure 14:
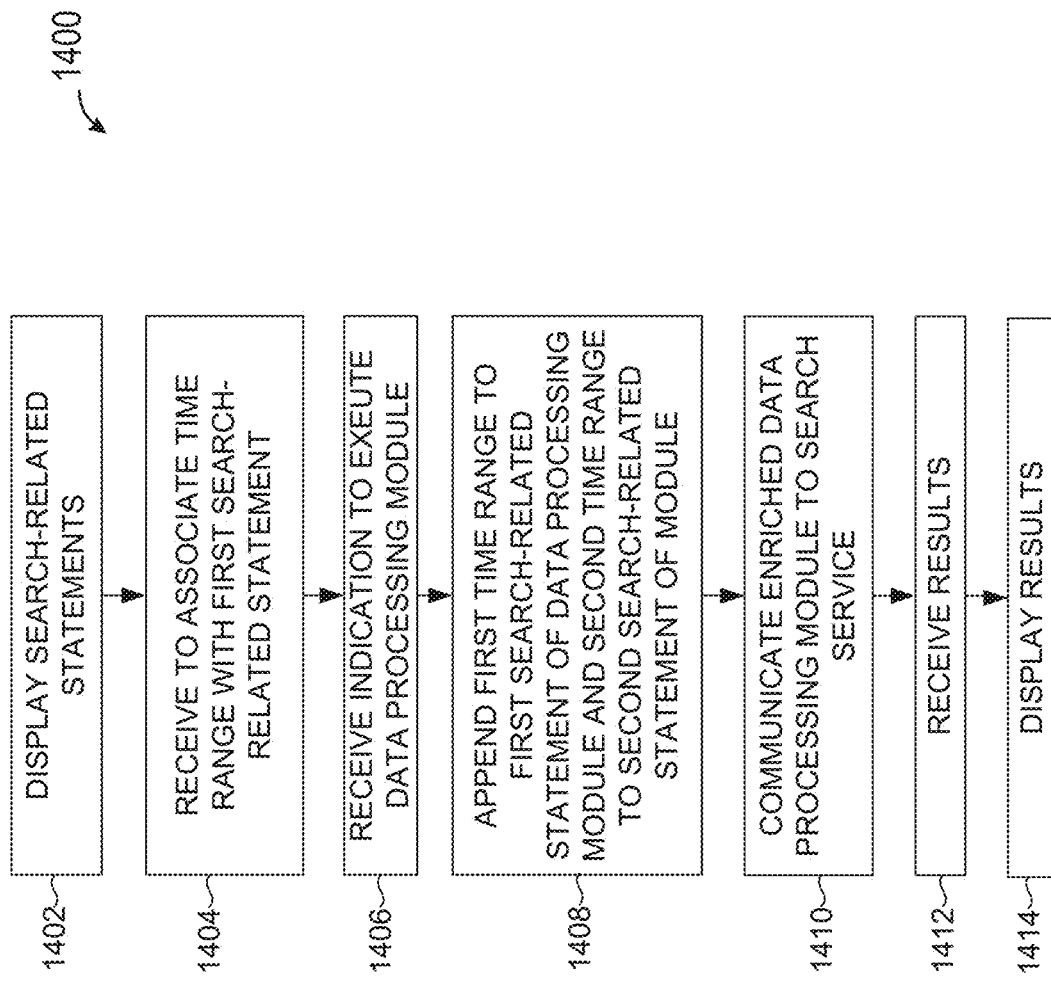
FIG. 14 is a flow diagram illustrating an embodiment of a routine implemented by the user interface system to adjust a time range associated with a search-related statement of a data processing package.

FIG. 14 is a flow diagram illustrating an embodiment of a routine 1400 implemented by the user interface system 502 to adjust a time range associated with a search-related statement of a data processing package. The data flow illustrated in FIG. 14 is provided for illustrative purposes only. It will be understood that one or more of the steps of the processes illustrated in FIG. 14 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1402, the user interface system 502 displays search-related statements. As described herein, the user interface system 502 may display search-related statements on a GUI, e.g., on a package editor panel. As described herein, the search-related statements may include one or more query commands, user query parameters, system query parameters, etc.

At block 1404, the user interface system 502 receives an indication to associate a (first) time range with a first search-related statement. As described herein, the user interface system 502 may generate a GUI that includes a data processing package, statements, and/or a chart, and various display objects associated with the data processing package, statements, and/or chart, etc. The data processing package and the statements may be displayed in a package editor panel of the GUI. The chart may be displayed separately and/or in a chart panel of the GUI (or a different GUI). The associated display objects may be included in the package editor panel, chart panel or other panel of the GUI, such as an outline panel, data panel, action panel, results panel, chart parameter panel, etc. In some cases, interacting with one of the data objects may be associated with instructions to adjust a time range associated with a particular statement. In certain cases, the display objects may be associated with certain search-related statements such that an interaction with the display object indicates that a time range associated with the search-related statement is to be adjusted or that a particular time range is to be associated with the search-related statement.

As described herein, the statement associated with the time range to be adjusted may be displayed in the GUI and/or may correspond to a to-be generated statement (e.g., a statement generated using chart parameters and/or a statement from a data processing package). Accordingly, the statement associated with the time range may or may not be displayed in the GUI.

In some cases, in response to an initial indication that a time range is to be modified, the GUI may provide a user with one or more display objects, GUIs or GUI windows to indicate select the (updated) time range to use for (or associate with) the statement. For example, as described herein at least with reference to FIGS. 10A-10I, the user interface system 502 may generate one or more GUIs or GUI windows that include interactive fields that enable a user to associate a time range with a statement in a displayed data processing package and/or associate a time range with a chart (and the corresponding statement that is generated using the chart parameters).

In some cases, by associating a time range with a statement, the user interface system 502 changes the time range for the statement from an inherited time range (e.g., default or package time range) to a time range specific to the statement. Accordingly different statements in a data processing package may be associated with different time ranges.

Similarly, by modifying a time range associated with a chart, the user interface system 502 may change the time range for the chart from an inherited time range (e.g., package time range or statement time range) to a time range specific to the chart. Accordingly, a chart may have a different time range associated with it (and used to generate results for it) than the statement to which the chart is associated. Moreover, different charts associated with the same statement of a data processing package may have different time ranges associated with them.

In some cases, a statement may be associated with different time ranges. For example, a statement associated with multiple charts may be associated with a statement time range and one or more chart time ranges (time ranges associated with statements generated using chart parameters). In some such cases, the search service may use one time range when executing a query corresponding to the statement itself, and use other time ranges when executing queries associated with the charts of the statement (e.g., the charts that use the statement to obtain results that are displayed in the chart).

At block 1406, the user interface system 502 receives an indication to execute the data processing package, similar to block 1208 of FIG. 12.

At block 1408, the user interface system 502 appends a first time range to the first search-related statement and a second time range to the second search-related statement. As described herein, the first time range may correspond to a modified time range for the search-related statement. The second time range may correspond to an inherited or default or package time range associated with the second search-related statement and/or the second time range may correspond to a statement time range associated with the second search-related statement (e.g., a time range that deviates from the default or package time range). In cases, where the second time range is a statement time range, the second time range may be adjusted in a manner similar to the first time range as described herein at least with blocks 1404 and 1406.

In some cases, the first search-related statement may be a to-be-generated child statement. For example, the first search-related statement may correspond to a chart (e.g., child statement generated using a parent statement from the data processing package and chart parameters) and the second search-related statement may be the parent search-related statement used to generate the child search-related statement. In some such cases, the chart may use a time range that is different from the time range associated with the parent search-related statement to which the chart is related.

In certain cases, the first and second time ranges may be the same. For example, as described herein, a chart may inherit the time range associated with the (to-be-parent) search-related statement in the data processing package. The same time range may be appended to the child search-related statement generated using the parent search-related statement in the data processing package and the chart parameters.

Some cases, the first time range may be larger than the second time range (or vice versa). For example, the child search-related may use a larger time range than the parent search-related statement. In some cases, using a larger time range for the child search-related statement may cause the search service to execute a separate search. For example, if the first time range is smaller than the second time range, the search service may execute one search and use the result for the parent search-related statement and the child search-related statement, whereas if the first time range is larger than the second time range, the search service may execute one search for the parent search-related statement and a second search for the child search-related statement. In certain cases, the search service may analyze the first and second time range and execute one primary search based on the combination of the first and second time range (e.g., time range generated from the extrema of the first and second time range) and process the results of the primary search based on the first search-related statement and the second search-related statement.

Accordingly, it will be understood that in some cases, the user interface system 502 may generate a search-related statement, append the generated search-related statement to a data processing package, and append a time range to the data processing package that is to be associated with (e.g., used during query execution for) the generated search-related statement.

As described herein, the user interface system 502 may append the first and second time range to the first and second search-related statements, respectively, based on an indication to execute a data processing package and/or a search-related statement. In some cases, the indication to execute the data processing package and/or search-related statement may correspond to an interaction with a display object associated with executing the data processing package or search-related statement (e.g., a "Execute Search" button). In certain cases, the indication to execute a data processing package and/or a search-related statement may be based on the user interface system 502 determine that chart parameters have been completed, that the parameters for the new time range have been properly selected, etc.

As described herein, in some cases, the user interface system 502 may append the time ranges (and one or more generated statements) to a data processing package to generate an enriched data processing package. The enriched data processing package may or may not be stored, may or may not be displayed, and/or may be stored separately from the displayed data processing package.

At block 1410, the user interface system 502 communicates an enriched data processing package to a search service, similar to block 1214 of FIG. 12.

At block 1412, the user interface system 502 receives results from the search service, similar to block 1216 of FIG. 12.

At block 1414, the user interface system 502 displays at least a portion of the results. As described herein, the results may be displayed in the GUI or another GUI, via a results panel, in a chart, etc.

Fewer, more, or different blocks may be used with the routine 1400. In some cases, rather than an indication that a time range associated with a statement is to be changed, the user interface system 502 may receive an indication that a time range associated with a chart is to be adjusted. In some such cases, the user interface system 502 may associate the change in the time range with a statement that is generated using the chart parameters. For example, when the user interface system 502 receives an indication to generate or modify a chart or execute a data processing package or statement associated with the chart, the user interface system 502 may generate a search-related statement using the statement associated with the chart and the chart parameters and the append the modified time range to generated search-related statement. In some such cases, the user interface system 502 may not display the statement to which the time range is appended as that statement may not have been generated at the time that the user interface system 502 receives the indication to adjust a time range associated with a statement.

Figure 15:
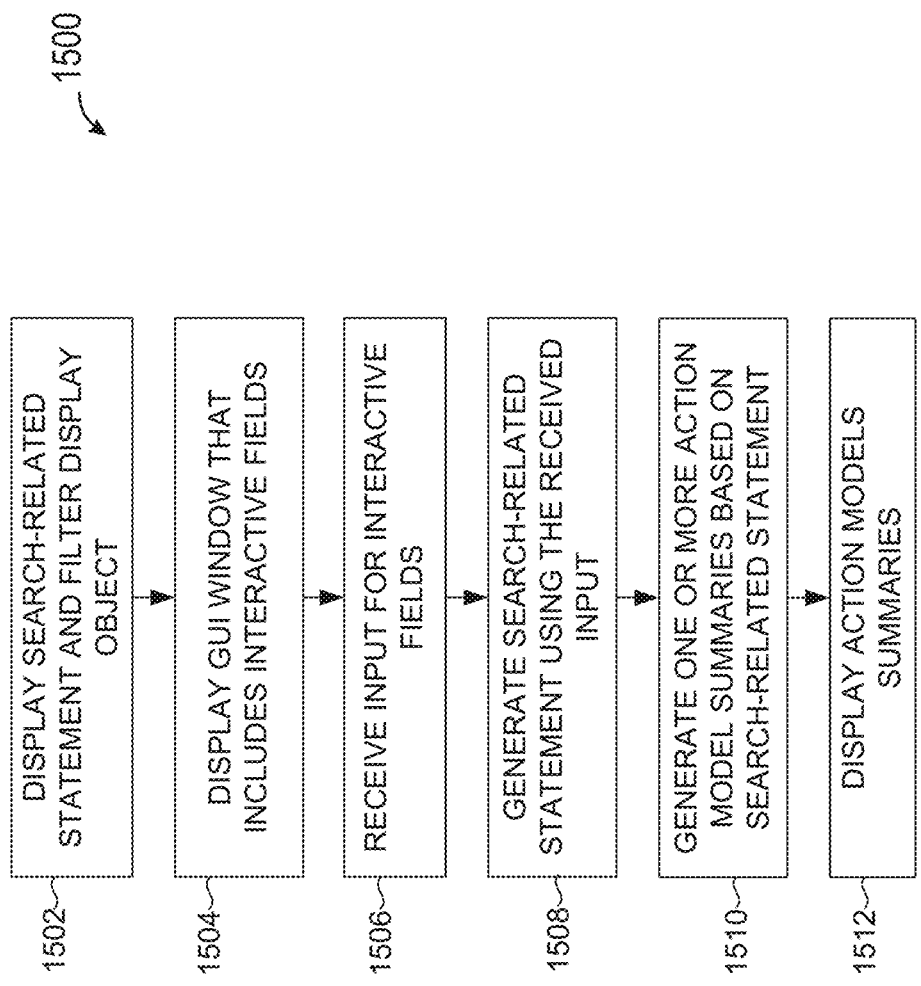
FIG. 15 is a flow diagram illustrating an embodiment of a routine implemented by the user interface system to display model display objects associated with a search-related statement of a data processing package.

FIG. 15 is a flow diagram illustrating an embodiment of a routine 1500 implemented by the user interface system 502 to display model display objects associated with a search-related statement of a data processing package. The data flow illustrated in FIG. 15 is provided for illustrative purposes only. It will be understood that one or more of the steps of the processes illustrated in FIG. 15 may be removed or that the ordering of the steps may be changed. Furthermore, for the purposes of illustrating a clear example, one or more particular system components are described in the context of performing various operations during each of the data flow stages. However, other system arrangements and distributions of the processing steps across system components may be used.

At block 1502, the user interface system 502 displays search-related statements and a filter display object. As described herein, the user interface system 502 may display search-related statements on a GUI, e.g., on a package editor panel. The search-related statements may include one or more query commands, user query parameters, system query parameters, etc. In addition, the GUI may include one or more a filter display object associated with a particular search-related statement. The filter display object may be displayed in a package editor panel, data panel, outline panel, etc. and be associated with an instruction to initiate the creation of a search-related statement associated with data summarization aggregation, also referred to herein as a data aggregation-related statement.

At block 1504, the user interface system 502 displays a graphical user interface window associated with the data aggregation-related statement. In some cases, the user interface system 502 displays the GUI window in response to an interaction with the filter display object.

The GUI window associated with the data aggregation-related statement may include one or more interactive fields to enable a user to select data fields and/or functions or commands to generate a data aggregation-related statement. In some cases, the GUI window may include one or interactive fields associated with an aggregation data field to enable a user to select a data field by which data is to be aggregated, a function interactive field to enable a user to select a function or command to apply to the data as part of the aggregation, a pivot by interactive field to enable a user to select a data field used as a pivot for the data, a split by interactive field to enable a user to select a data field used to split groups of data, and/or a span by interactive field to enable a user to select a unit of time and a quantity of units of time by which to group data.

As described herein, in some cases, the user interface system 502 may add or remove interactive fields to the GUI window depending on the fields or functions/commands selected. For example, different commands may use different inputs or a different quantity of fields. Accordingly based on the selected function or command, the user interface system 502 may add or remove interactive fields for the GUI window. As another example, different data fields may have different sub-fields or options. For example, if a time field is selected, the user interface system 502 may add one or more span by interactive fields to enable the user to select the unit of time and quantity of units by which to group data (by time).

At block 1506, the user interface system 502 receives inputs for the interactive fields of the GUI window. As described herein, the user interface system 502 may receive inputs via the GUI window.

At block 1508, the user interface system 502 generates a search-related statement using the received inputs. As described herein, the various inputs may correspond to system query parameters (e.g., command tokens), user query parameters (e.g., data fields, keywords, values, etc.), etc. that correspond to query commands. The user interface system 502 may use a command token to identify the command that is to be generated and use it knowledge of query commands and the other inputs (e.g., user query parameters) to insert the other inputs as arguments for the command. The user interface system 502 can use the one or more commands as the search-related statement. In certain cases, as described herein, the user interface system 502 may communicate the inputs to the semantic processing system 504, which may generate the search-related statements.

At block 1510, the user interface system 502 generates one or more model display objects. As described herein, the model display objects may be generated from a data processing package model 526, data processing package model metadata 516 (including a data processing package model 522), statement model, and/or action model 520. For example, each model display object may correspond to one or more query commands in a search-related statement.

At block 1512, the user interface system 502 displays the model display objects. As described herein, the model display objects may be displayed in a variety of ways. In some cases, the model display objects are displayed as filter token objects. For example, model display objects that correspond to a (entire) search-related statement may be displayed as a filter token object. In some cases, model display objects corresponding to different query commands of the aggregation-related statement may be displayed on the GUI.

Fewer, more, different blocks may be used. In some cases, the user interface system 502 may enable a user to modify the data processing package using the model display objects and/or filter token objects.

6.0. Terminology

Computer programs typically comprise one or more instructions set at various times in various memory devices of a computing device, which, when read and executed by at least one processor, will cause a computing device to execute command tokens involving the disclosed techniques. In some embodiments, a carrier containing the aforementioned computer program product is provided. The carrier is one of an electronic signal, an optical signal, a radio signal, or a non-enriched computer-readable storage medium.

Any or all of the features and functions described above may be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

Conditional language, such as, among others, "may," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Furthermore, use of "e.g.," is to be interpreted as providing a non-limiting example and does not imply that two things are identical or necessarily equate to each other.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements may be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Conjunctive language such as the phrase "at least one of X, Y and Z," unless specifically stated otherwise, is understood with the context as used in general to convey that an item, term, etc. may be either X, Y or Z, or any combination thereof. Thus, such conjunctive language is not generally intended to imply that certain embodiments require at least one of X, at least one of Y and at least one of Z to each be present. Further, use of the phrase "at least one of X, Y or Z" as used in general is to convey that an item, term, etc. may be either X, Y or Z, or any combination thereof.

In some embodiments, certain operations, acts, events, or functions of any of the algorithms described herein may be performed in a different sequence, may be added, merged, or left out altogether (e.g., not all are necessary for the practice of the algorithms). In certain embodiments, operations, acts, functions, or events may be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems may be distributed across multiple machines, networks, and other computing resources. Two or more components of a system may be combined into fewer components. Various components of the illustrated systems may be implemented in one or more virtual machines or an isolated execution environment, rather than in dedicated computer hardware systems and/or computing devices. Likewise, the data repositories shown may represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown may communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-enriched computer-readable memory that may direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention may be modified, if necessary, to employ the systems, functions, and concepts of the various references described above to provide yet further implementations of the invention. These and other changes may be made to the invention in light of the above Detailed Description. While the above description describes certain examples of the invention, and describes the best mode contemplated, no matter how detailed the above appears in text, the invention may be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112 (f) (AIA), other aspects may likewise be embodied as a means-plus-function claim, or in other forms, such as being embodied in a computer-readable medium. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right to pursue additional claims after filing this application, in either this application or in a continuing application.

The invention claimed is:

1. A method, comprising:
    displaying, via a graphical user interface, a plurality of search-related statements of a data processing package, wherein each search-related statement of the plurality of search-related statements comprises one or more executable query commands of a query language identifying a respective set of data and a manner of processing the respective set of data;
    receiving, via the graphical user interface, an indication to associate a first time range with a first search-related statement of the plurality of search-related statements of the data processing package;
    receiving an indication to execute the data processing package;
    based on the indication to execute the data processing package and the indication to associate the first time range with the first search-related statement, appending the first time range to the data processing package in association with the first search-related statement and appending a second time range to the data processing package in association with a second search-related statement of the plurality of search-related statements to form an enriched data processing package;
    communicating the enriched data processing package to a search service, wherein the search service uses at least the first time range to identify the respective set of data of the first search-related statement for processing and uses at least the second time range to identify the respective set of data of the second search-related statement for processing;
    receiving results from the search service; and
    displaying, via the graphical user interface, at least a portion of the results.

2. The method of claim 1, wherein receiving an indication to execute the data processing package comprises receiving an indication that a user interacted with a display object associated with executing a search.

3. The method of claim 1, wherein the second time range is different than the first time range and the second time range corresponds to a time range of the data processing package.

4. The method of claim 1, wherein the first search-related statement in included in the plurality of search-related statements displayed via the graphical user interface.

5. The method of claim 1, further comprising based on the indication to execute the data processing package, generating the first search-related statement based on the second search-related statement.

6. The method of claim 1, further comprising based on the indication to execute the data processing package, generating the first search-related statement using the second search-related statement and a plurality of search parameters received via the graphical user interface.

7. The method of claim 1, wherein the first time range is the same as the second time range.

8. The method of claim 1, wherein the first time range is larger than the second time range.

9. The method of claim 1 further comprising associating the second time range with a third search-related statement of the data processing package to form the enriched data processing package.

10. The method of claim 1, further comprising, in response to communicating the enriched data processing package to the search service, discarding the enriched data processing package.

11. A computing system, comprising:
    memory; and
    one or more processing devices coupled to the memory and configured to:
    display, via a graphical user interface, a plurality of search-related statements of a data processing package, wherein each search-related statement of the plurality of search-related statements comprises one or more executable query commands of a query language identifying a respective set of data and a manner of processing the respective set of data;
    receive, via the graphical user interface, an indication to associate a first time range with a first search-related statement of the plurality of search-related statements of the data processing package;
    receive an indication to execute the data processing package;
    based on the indication to execute the data processing package and the indication to associate the first time range with the first search-related statement, append the first time range to the data processing package in association with the first search-related statement and append a second time range to the data processing package in association with a second search-related statement of the plurality of search-related statements to form an enriched data processing package;

communicate the enriched data processing package to a search service, wherein the search service uses at least the first time range to identify the respective set of data of the first search-related statement for processing and uses at least the second time range to identify the respective set of data of the second search-related statement for processing;

receive results from the search service; and display, via the graphical user interface, at least a portion of the results.

12. The computing system of claim 11, wherein the second time range is different than the first time range and the second time range corresponds to a time range of the data processing package.

13. The computing system of claim 11, wherein the first search-related statement in included in the plurality of search-related statements displayed via the graphical user interface.

14. The computing system of claim 11, wherein the one or more processing devices are further configured to, based on the indication to execute the data processing package, generate the first search-related statement based on the second search-related statement.

15. The computing system of claim 11, wherein the one or more processing devices are further configured to, based on the indication to execute the data processing package, generate the first search-related statement using the second search-related statement and a plurality of search parameters received via the graphical user interface.

16. The computing system of claim 11, wherein the first time range is the same as the second time range.

17. The computing system of claim 11, wherein the first time range is larger than the second time range.

18. The computing system of claim 11, wherein the one or more processing devices are further configured to associate the second time range with a third search-related statement of the data processing package to form the enriched data processing package.

19. The computing system of claim 11, wherein the one or more processing devices are further configured to, in response to communicating the enriched data processing package to the search service, discard the enriched data processing package.

20. Non-transitory computer-readable media comprising computer-executable instructions that, when executed by a computing system, cause the computing system to:

display, via a graphical user interface, a plurality of search-related statements of a data processing package, wherein each search-related statement of the plurality of search-related statements comprises one or more executable query commands of a query language identifying a respective set of data and a manner of processing the respective set of data;

receive, via the graphical user interface, an indication to associate a first time range with a first search-related statement of the plurality of search-related statements of the data processing package;

receive an indication to execute the data processing package;

based on the indication to execute the data processing package and the indication to associate the first time range with the first search-related statement, append the first time range to the data processing package in association with the first search-related statement and append a second time range to the data processing package in association with a second search-related statement of the plurality of search-related statements to form an enriched data processing package;

communicate the enriched data processing package to a search service, wherein the search service uses at least the first time range to identify the respective set of data of the first search-related statement for processing and uses at least the second time range to identify the respective set of data of the second search-related statement for processing;

receive results from the search service; and display, via the graphical user interface, at least a portion of the results.

* * * * *